(12) United States Patent
Saito

(10) Patent No.: US 11,726,712 B2
(45) Date of Patent: Aug. 15, 2023

(54) MEMORY SYSTEM WITH WRITE MODES BASED ON AN INTERNAL STATE OF A MEMORY CONTROLLER

(71) Applicant: Kioxia Corporation, Tokyo (JP)

(72) Inventor: Yoshiki Saito, Kawasaki (JP)

(73) Assignee: Kioxia Corporation, Tokyo (JP)

( * ) Notice: Subject to any disclaimer, the term of this patent is extended or adjusted under 35 U.S.C. 154(b) by 50 days.

(21) Appl. No.: 17/344,230

(22) Filed: Jun. 10, 2021

(65) Prior Publication Data

US 2022/0083273 A1   Mar. 17, 2022

(30) Foreign Application Priority Data

Sep. 17, 2020   (JP) ................................. 2020-156369

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC .... G06F 3/0659; G06F 3/0604; G06F 3/0679; G06F 3/061; G06F 3/0688
See application file for complete search history.

(56) References Cited

U.S. PATENT DOCUMENTS

| 10,359,954 B2 | 7/2019 | Zhou et al. | |
| 2015/0213896 A1* | 7/2015 | Lieber | G06F 3/061 |
| | | | 711/103 |
| 2016/0092129 A1* | 3/2016 | Agarwal | G11C 29/52 |
| | | | 714/764 |
| 2016/0098216 A1* | 4/2016 | Huang | G06F 11/076 |
| | | | 714/37 |
| 2016/0162215 A1* | 6/2016 | Jayaraman | G06F 3/0611 |
| | | | 711/103 |

(Continued)

FOREIGN PATENT DOCUMENTS

JP   2018-156263 A   10/2018

OTHER PUBLICATIONS

Cai et al., "HOOP: Efficient Hardware-Assisted Out-of-Place Update for Non-Volatile Memory", 2020 ACM/IEEE 47th Annual International Symposium on Computer Architecture (ISCA), 2020, pp. 584-596, DOI: 10.1109/ISCA45697.2020.00055, https://conferences.computer.org/isca/pdfs/ISCA2020-4QIDegUf3KiwUXfV0KdCm/466100a584/466100a584.pdf.

*Primary Examiner* — Charles Rones
*Assistant Examiner* — Tong B. Vo
(74) *Attorney, Agent, or Firm* — Oblon, McClelland, Maier & Neustadt, L.L.P.

(57) ABSTRACT

According to one embodiment, a memory system includes a non-volatile memory and a controller. The non-volatile memory includes first and second memory areas. The controller is configured to, when receiving a write command from the host, determine a write method. The controller is configured to, when a first method is determined, write the data to the first memory area. The controller is configured to, when a second method is determined, write the data to the second memory area. The first method is a write method of writing the data to a physical address associated with the logical address designated in the write command. The second method is a write method of writing the data to a physical address designated by the controller.

43 Claims, 41 Drawing Sheets

(56) References Cited

U.S. PATENT DOCUMENTS

| | | | | |
|---|---|---|---|---|
| 2017/0315925 | A1* | 11/2017 | Yeh | G06F 12/0246 |
| 2018/0107592 | A1* | 4/2018 | Hashimoto | G06F 3/0659 |
| 2018/0217751 | A1* | 8/2018 | Agarwal | G11C 16/10 |
| 2018/0267715 | A1 | 9/2018 | Matsudaira et al. | |
| 2018/0349041 | A1 | 12/2018 | Zhou et al. | |
| 2019/0042451 | A1 | 2/2019 | Leone et al. | |
| 2019/0087089 | A1* | 3/2019 | Yoshida | G06F 3/0658 |
| 2019/0095116 | A1* | 3/2019 | Igahara | G06F 3/0634 |
| 2019/0205257 | A1* | 7/2019 | Kim | G06F 12/0804 |
| 2021/0026548 | A1* | 1/2021 | Kang | G06F 12/0246 |
| 2021/0286541 | A1* | 9/2021 | Kucherov | G06F 3/061 |
| 2021/0311660 | A1* | 10/2021 | Saxena | G06F 16/13 |
| 2021/0334211 | A1* | 10/2021 | Duan | G11C 16/0483 |
| 2021/0405885 | A1* | 12/2021 | Kim | G06F 3/0673 |
| 2022/0004496 | A1* | 1/2022 | Ha | G06F 12/1009 |
| 2022/0066939 | A1* | 3/2022 | Fisher | G06F 9/30101 |

* cited by examiner

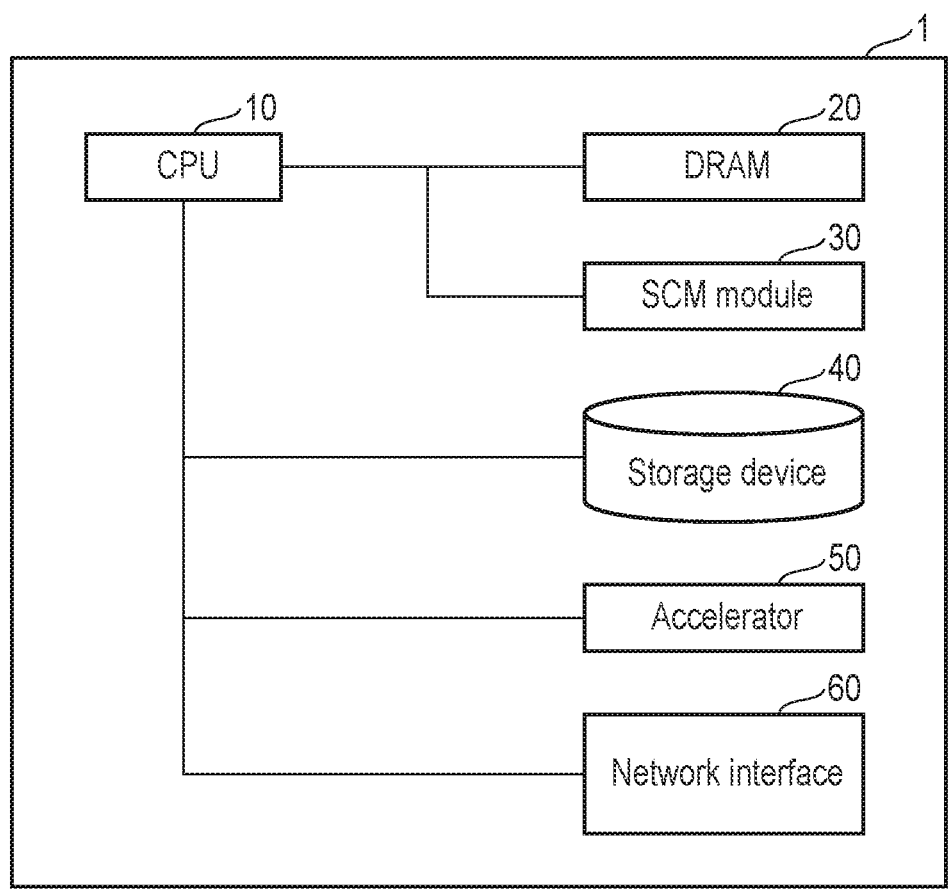
F I G. 1

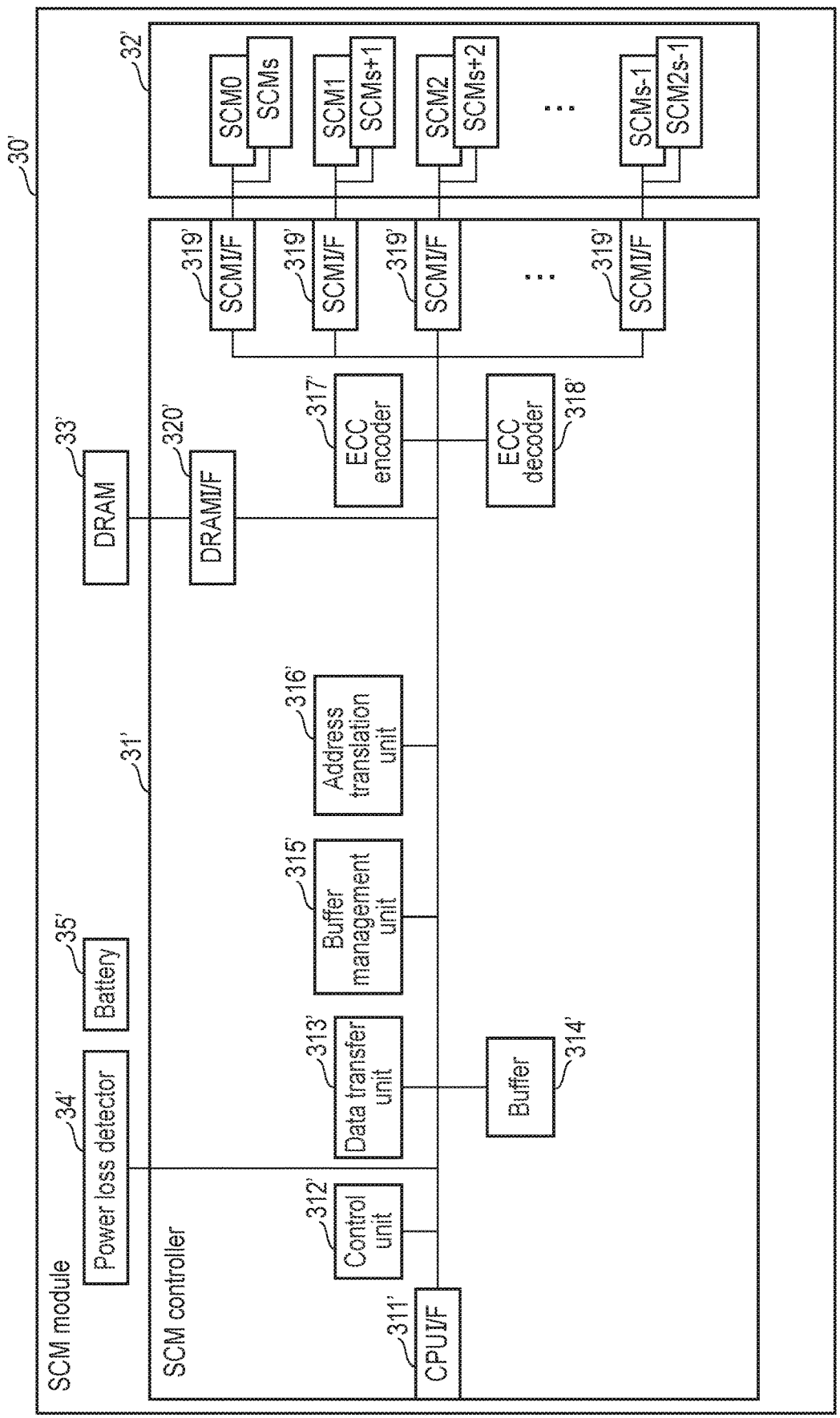
F I G. 2

FIG. 3

| Index | Valid | SCM physical address |
|---|---|---|
| 0x0000000 | 1 | 0x0001000 |
| 0x0000001 | 1 | 0x0001001 |
| 0x0000002 | 1 | 0x0001002 |
| 0x0000003 | 0 | 0x0001003 |
| ⋮ | ⋮ | ⋮ |
| 0x1DFFFFE | 0 | 0x1FFFFFE |
| 0x1DFFFFF | 1 | 0x1FFFFFF |
F I G. 4
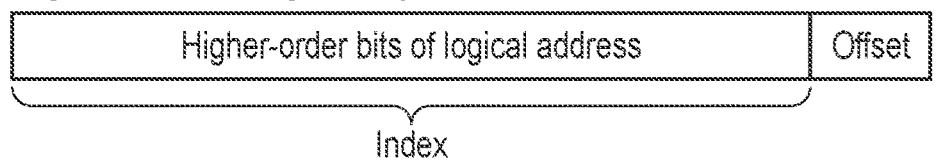
F I G. 5
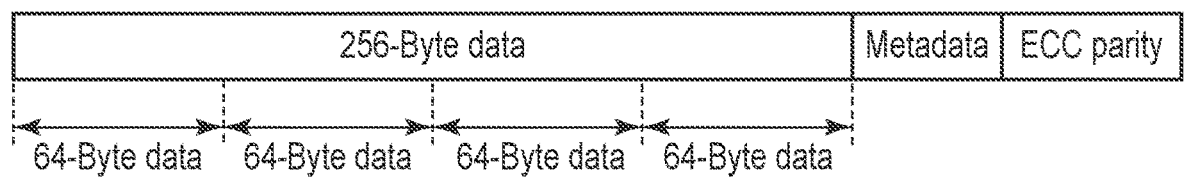
F I G. 6

| Valid | Logical address higher-order bits | Data management number 0 | | Data management number 1 | | Data management number 2 | | Data management number 3 | |
|---|---|---|---|---|---|---|---|---|---|
| | | Ready | Buffer area entry number | Ready | Buffer area entry number | Ready | Buffer area entry number | Ready | Buffer area entry number |
| ... | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |

F I G. 9

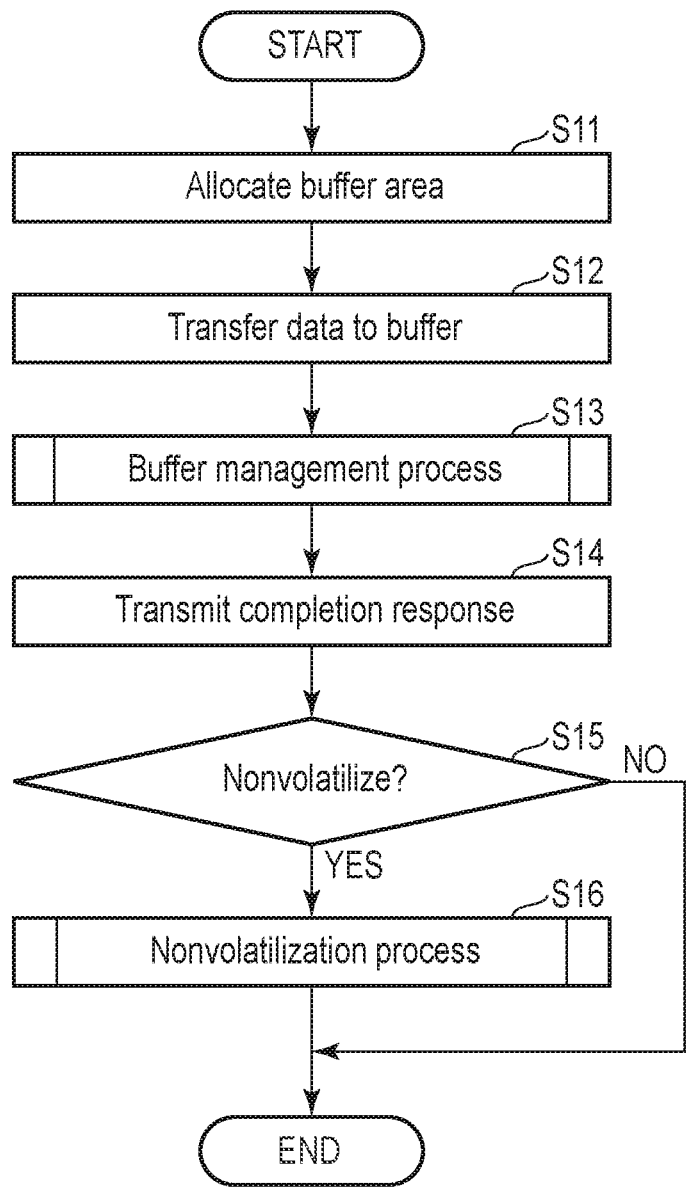
F I G. 11

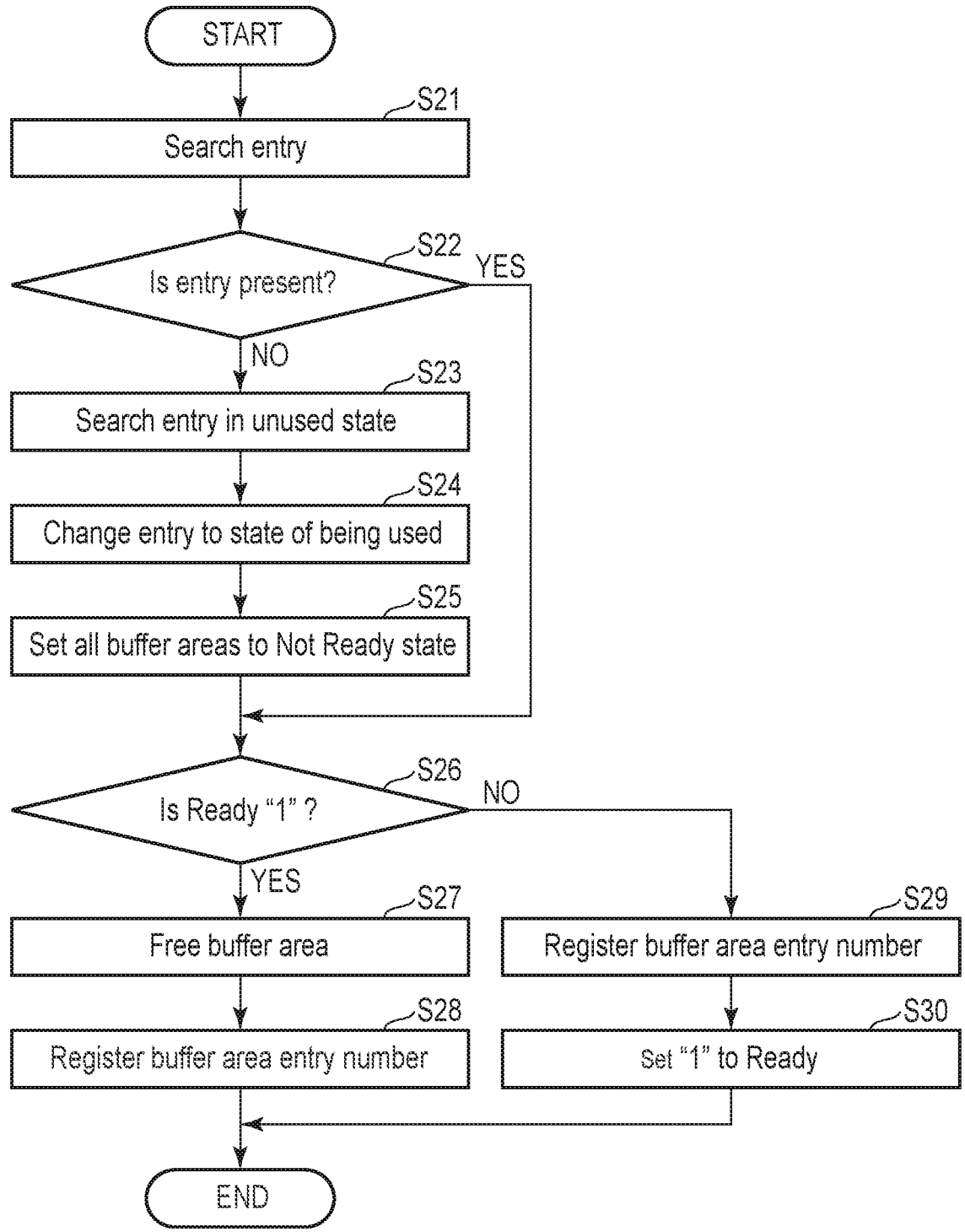
F I G. 12

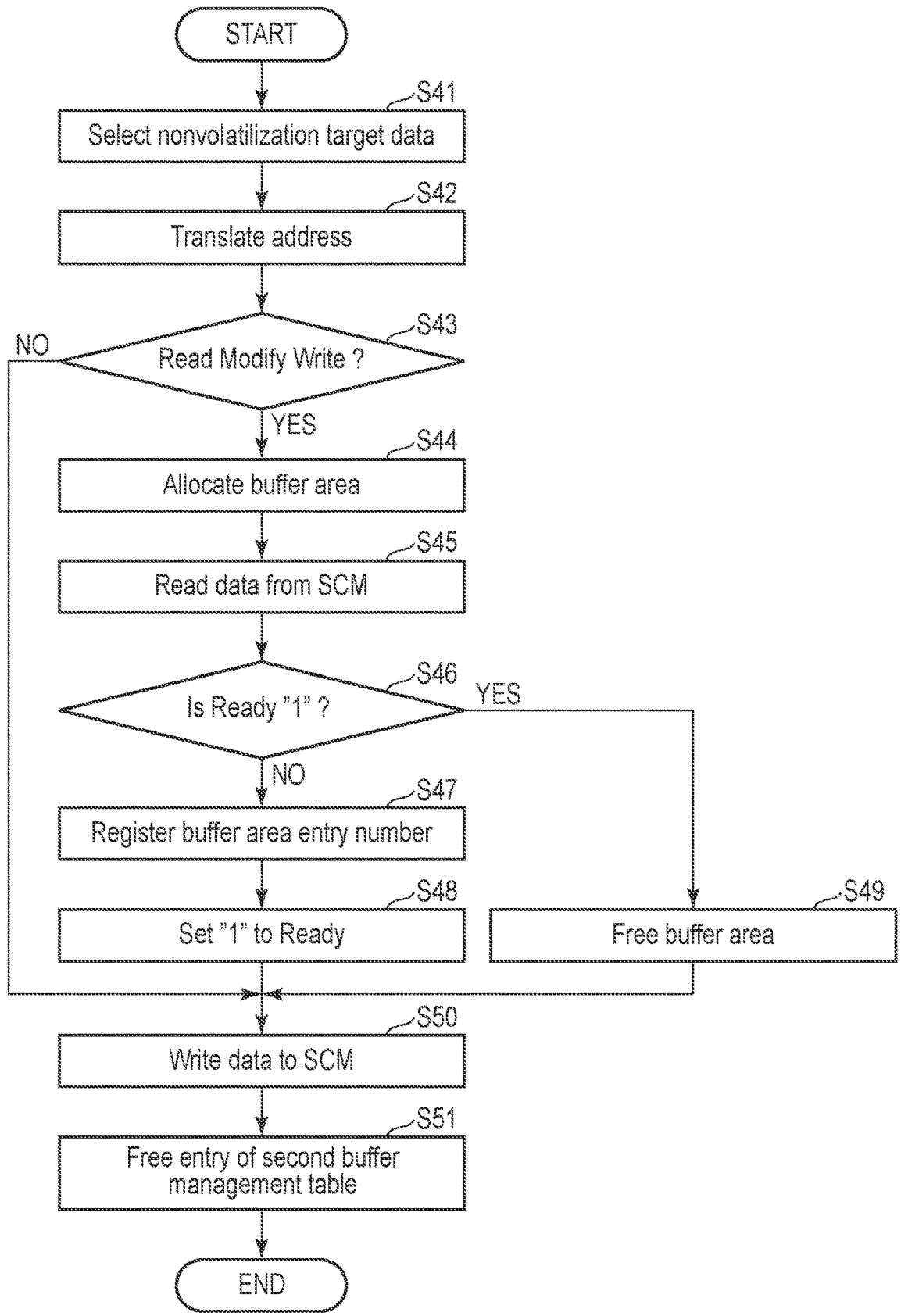
F I G. 13

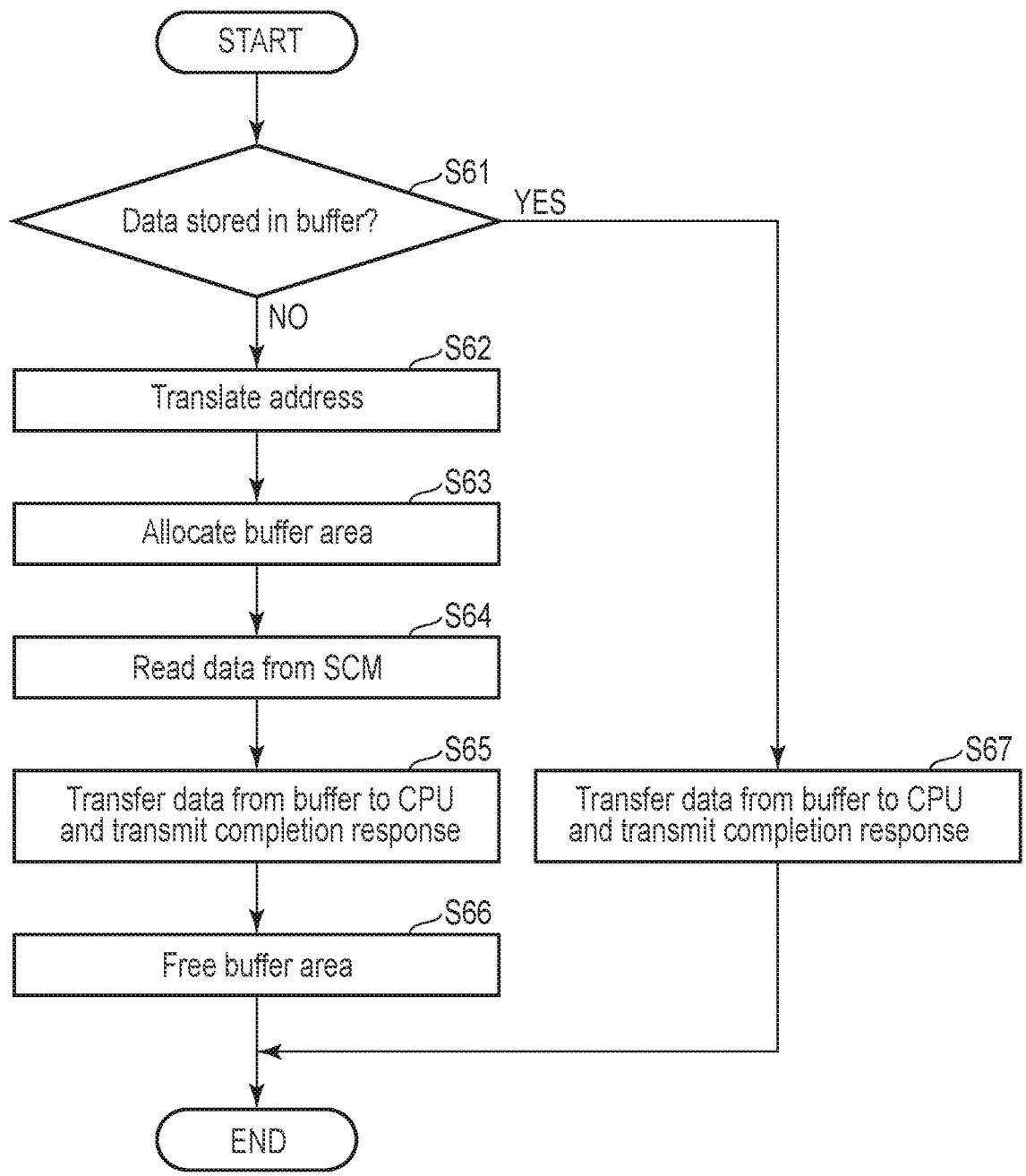
F I G. 14

| Physical address | Write count |
|---|---|
| SCM0/Bank0/Page0 | 100 |
| SCM0/Bank0/Page1 | 50 |
| SCM0/Bank0/Page2 | 3000 |
| SCM0/Bank0/Page3 | 2 |
| ⋮ | ⋮ |
| SCM0/Bank0/Page8 | 1 |
| ⋮ | ⋮ |
| SCM0/Bank0/PageP-1 | 300 |
| SCM0/Bank1/Page0 | 123 |
| SCM0/Bank1/Page1 | 456 |
| ⋮ | ⋮ |
| SCM1/Bank0/Page0 | 100 |
| ⋮ | ⋮ |

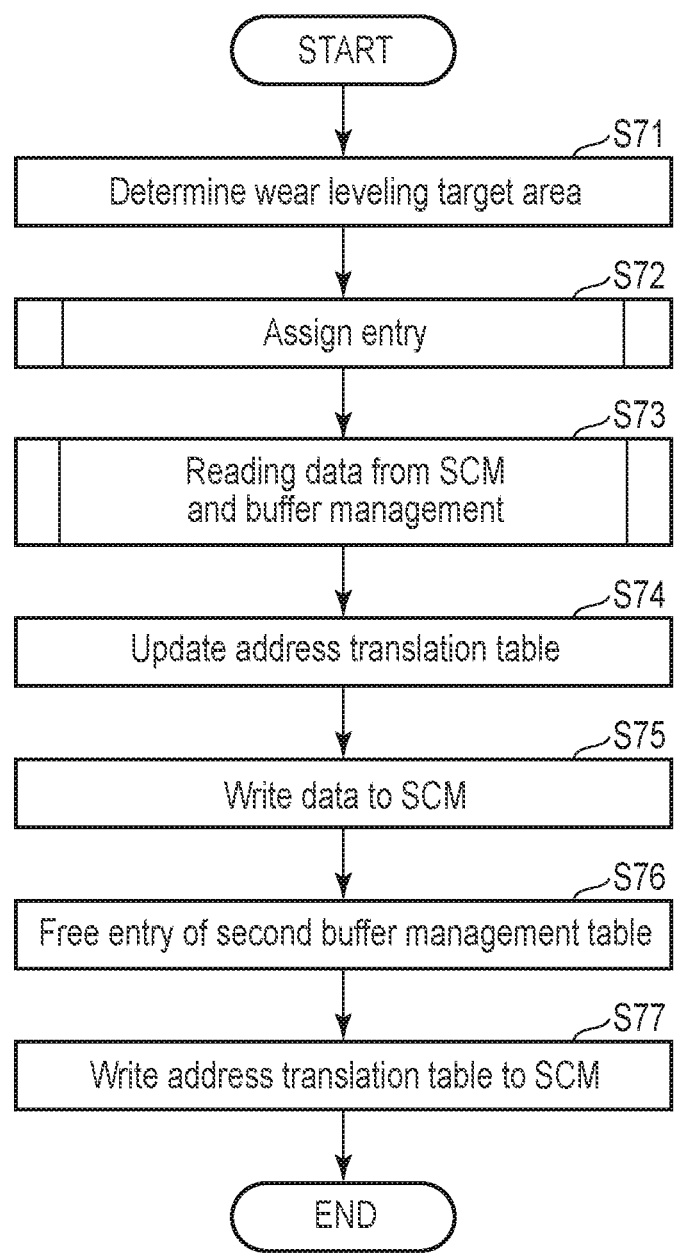
F I G. 17

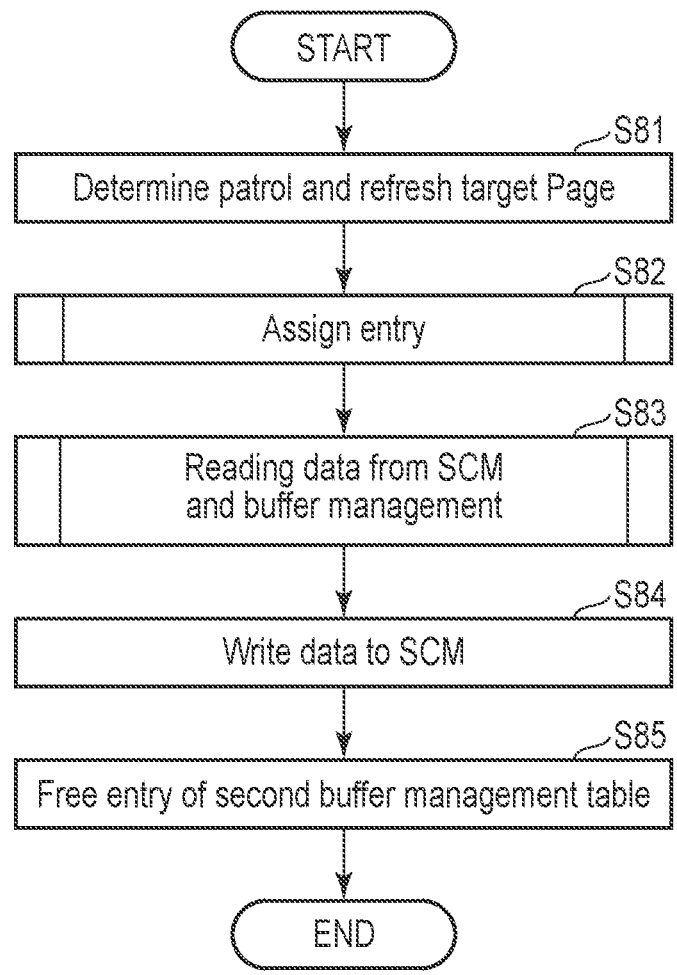
F I G. 18

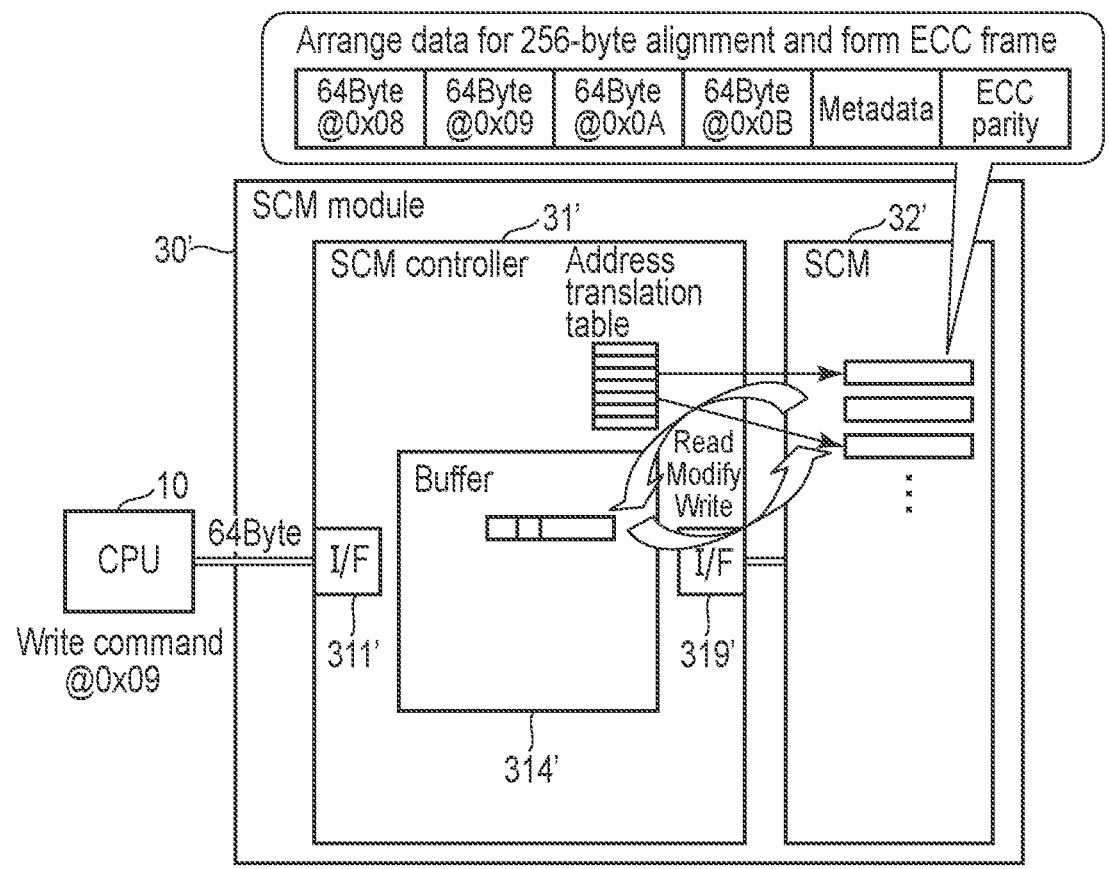
F I G. 20

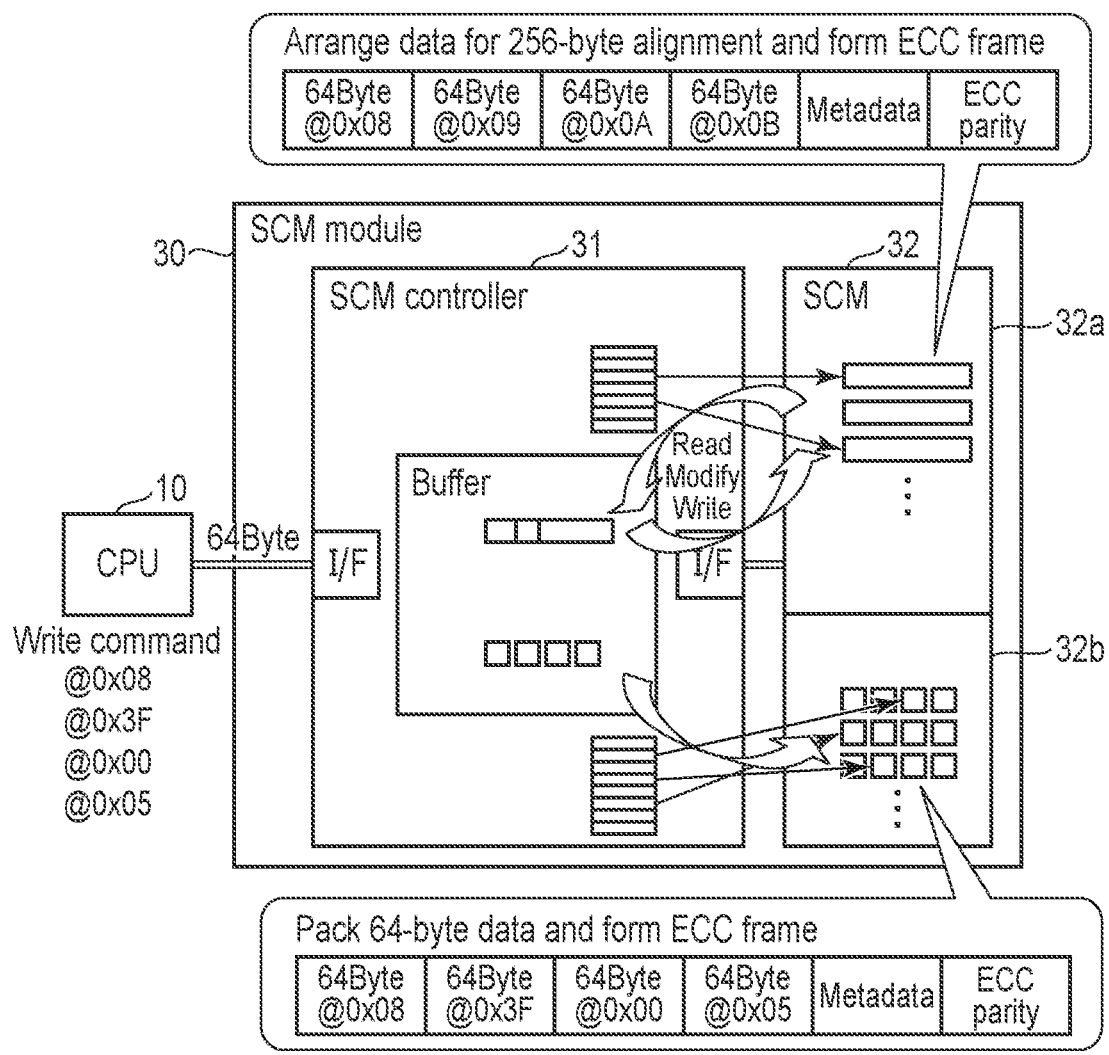
F I G. 21

FIG. 23

|  | Head pointer | ... |
|---|---|---|
|  | Tail pointer | ... |
F I G. 25
| Index | Number of registrations | Valid | Tag | SCM physical address | Valid | Tag | SCM physical address | Valid | Tag | SCM physical address | ... |
|---|---|---|---|---|---|---|---|---|---|---|---|
| 0x00 | ... | ... | ... | ... | ... | ... | ... | ... | ... | ... | ... |
| 0x01 | ... | ... | ... | ... | ... | ... | ... | ... | ... | ... | ... |
| 0x02 | ... | ... | ... | ... | ... | ... | ... | ... | ... | ... | ... |
| 0x03 | ... | ... | ... | ... | ... | ... | ... | ... | ... | ... | ... |
| 0x04 | ... | ... | ... | ... | ... | ... | ... | ... | ... | ... | ... |
| ⋮ | ⋮ | ⋮ | ⋮ | ⋮ | ⋮ | ⋮ | ⋮ | ⋮ | ⋮ | ⋮ | ⋮ |
F I G. 26
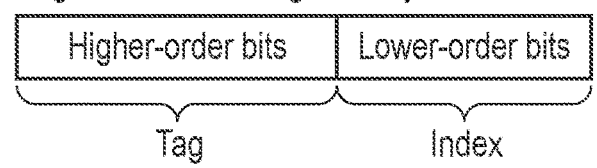
F I G. 27

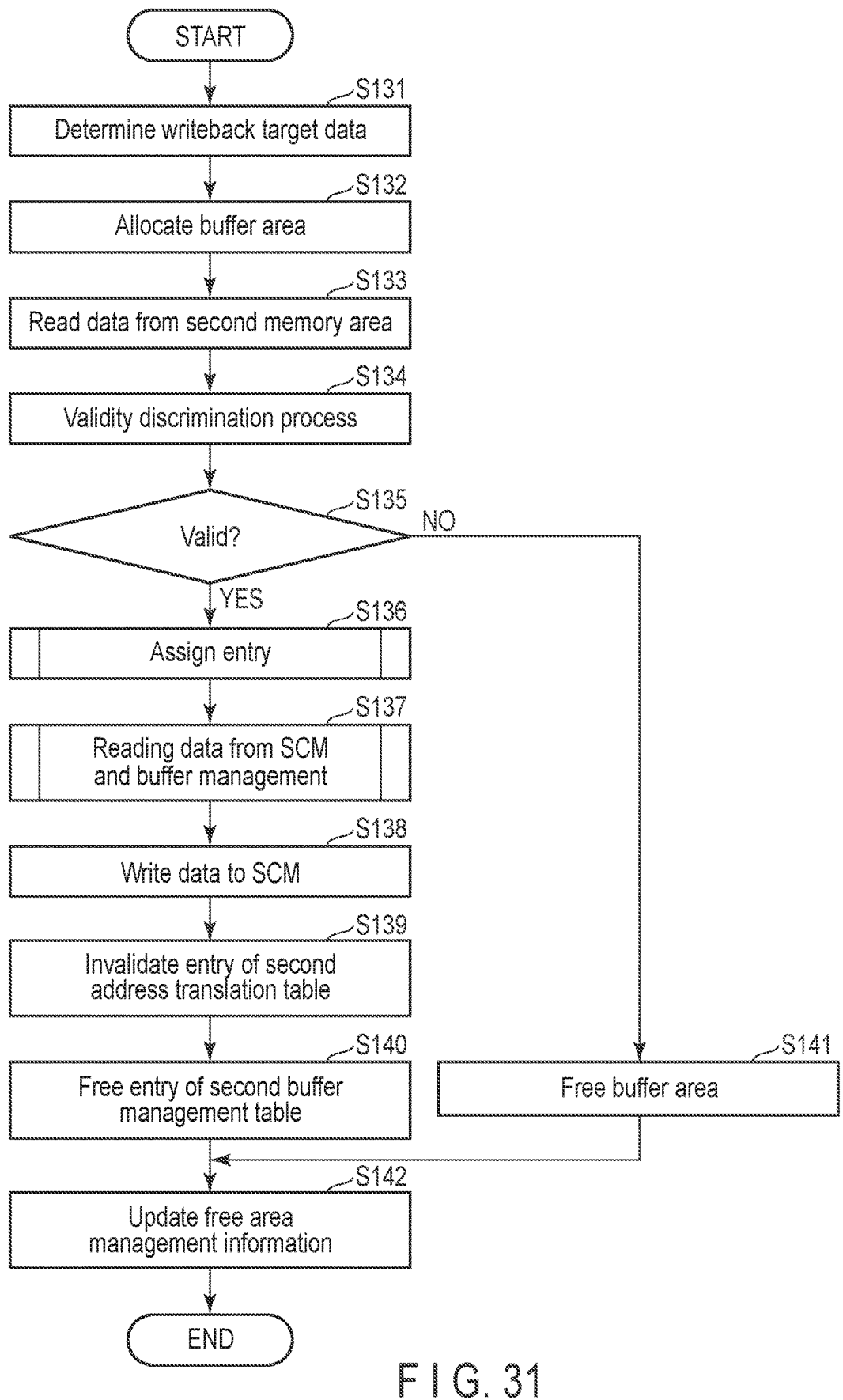
F I G. 31

| Logical address | Invalidation flag | SCM physical address |
|---|---|---|
| ... | ... | ... |
| ... (Head) | ... | ... |
| ⋮ | ⋮ | ⋮ |
| ... (Tail) | ... | ... |
| ... | ... | ... |

F I G. 33

Second address translation table (to be updated)

| Logical address | SCM physical address |
|---|---|
| 0x1000 | 0xA000 |
| 0x2000 | 0xB000 |
| 0x3000 | 0xC000 |
| 0x4000 | 0xD000 |
| ⋮ | ⋮ |

Table update log

| Logical address | Invalidation flag | SCM physical address |
|---|---|---|
| 0x2000 | 0 | 0xBBBB |
| 0x3000 | 1 | n/a |
| 0x2000 | 0 | 0xBCDE |
| ⋮ | ⋮ | ⋮ |

Second address translation table (updated)

| Logical address | SCM physical address |
|---|---|
| 0x1000 | 0xA000 |
| 0x2000 | 0xBCDE |
| 0x3000 | (Invalid) |
| 0x4000 | 0xD000 |
| ⋮ | ⋮ |

F I G. 34

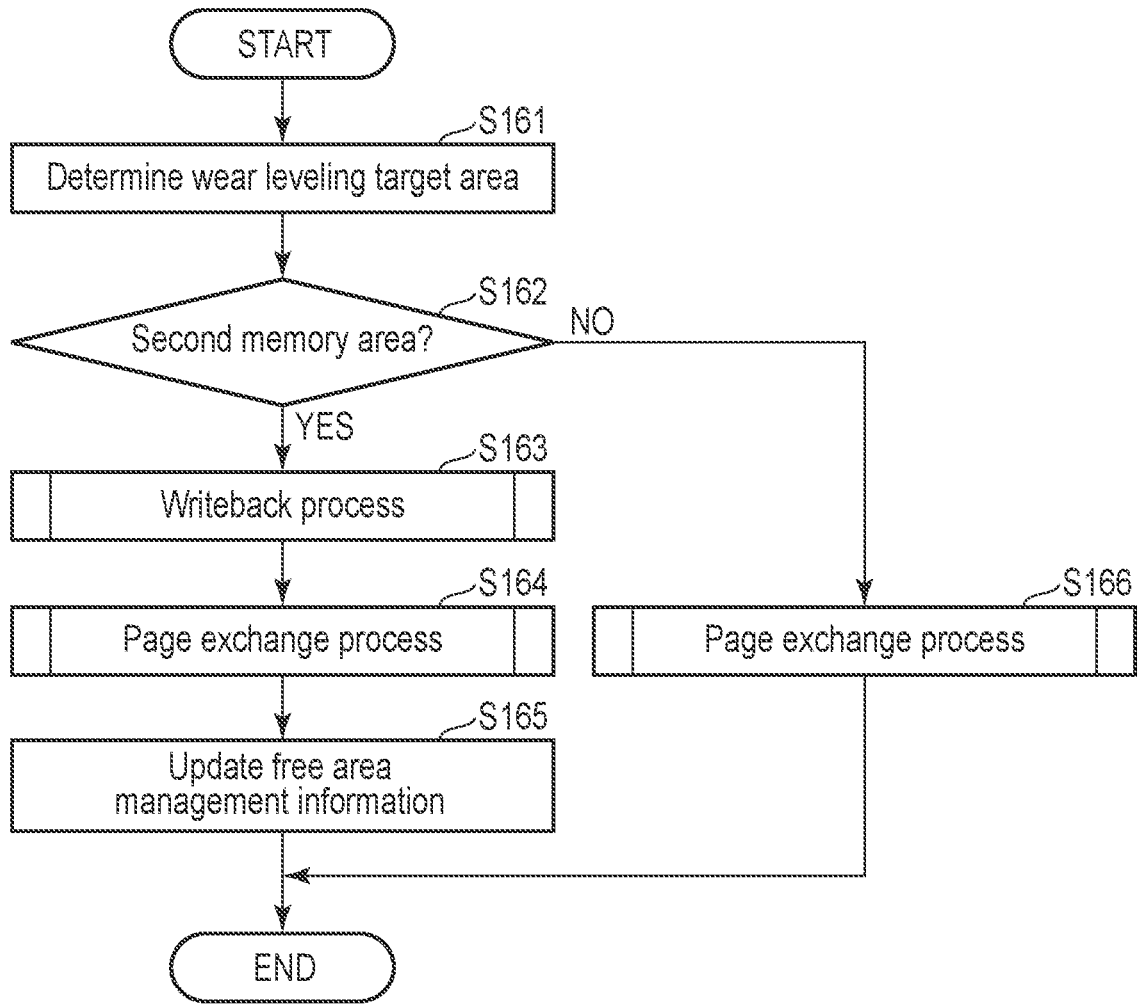
F I G. 35

F I G. 38

| Head/Tail pointer | Higher-order bits | Offset | Bank number |

F I G. 39

| Chunk numbers | Starting Page numbers of chunks |
|---|---|
| 0x00 | PageP-4 |
| 0x01 | Page4 |

F I G. 40

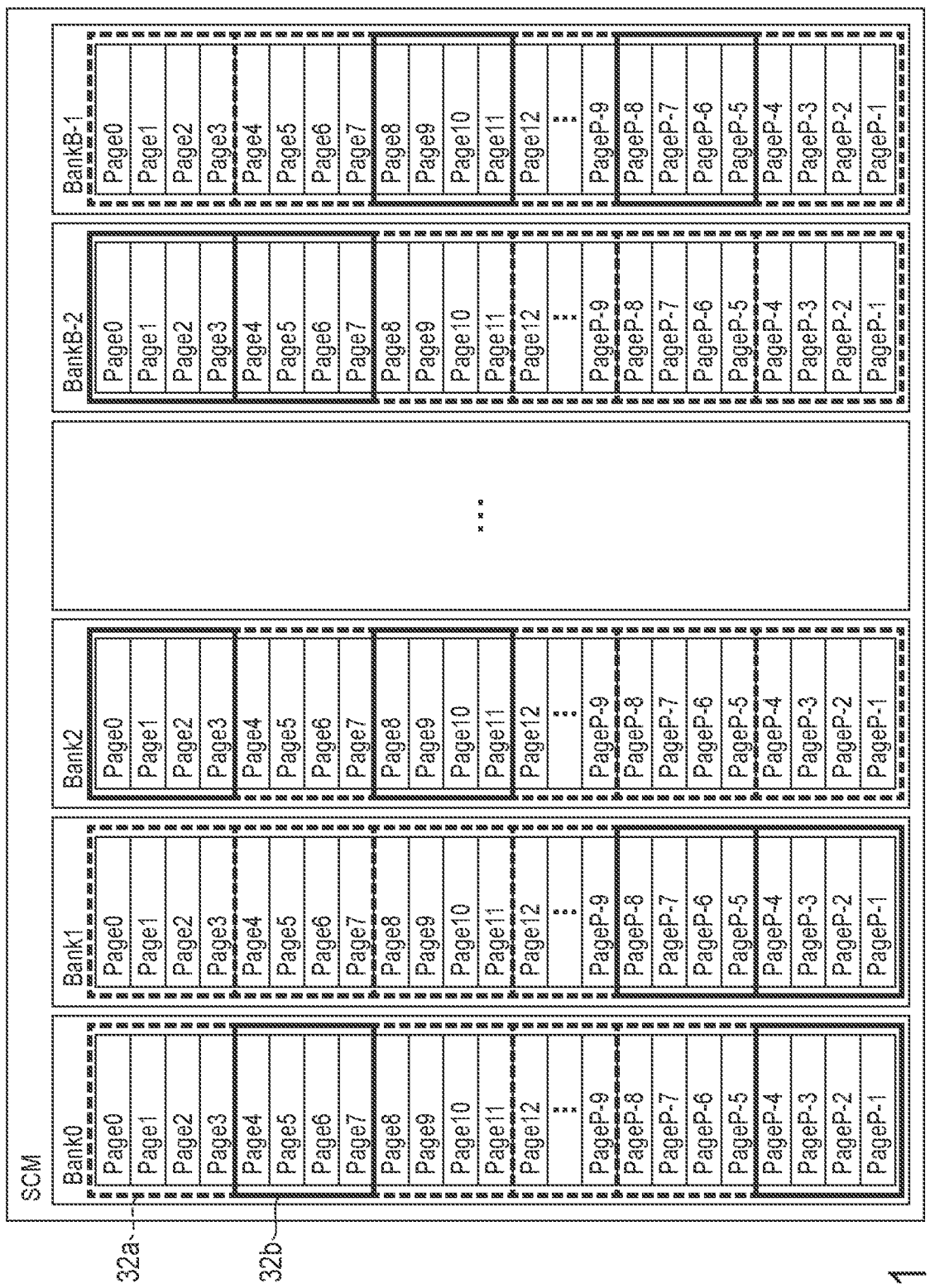
F I G. 41

| | Starting Page numbers of chunks | | | | |
|---|---|---|---|---|---|
| | Bank0 | Bank1 | Bank2 | ... | BankB-1 |
| 0x00 | PageP-4 | PageP-8 | Page0 | ... | Page8 |
| 0x01 | Page4 | PageP-4 | Page8 | ... | PageP-8 |

F I G. 42

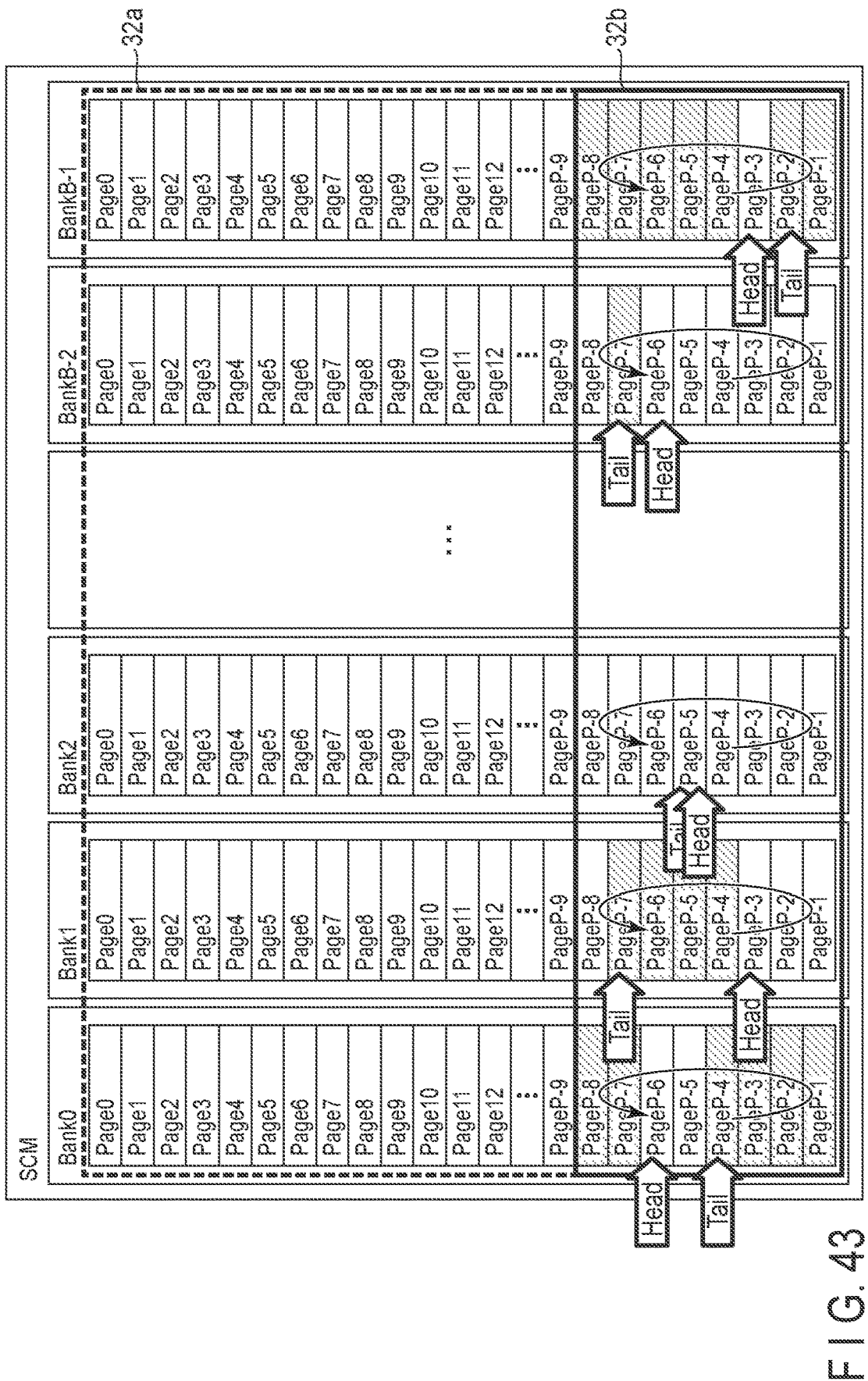
F I G. 43

|  | Bank0 | Bank1 | Bank2 | ... | BankB-1 |
|---|---|---|---|---|---|
| Head pointer | ... | ... | ... | ... | ... |
| Tail pointer | ... | ... | ... | ... | ... |

F I G. 44

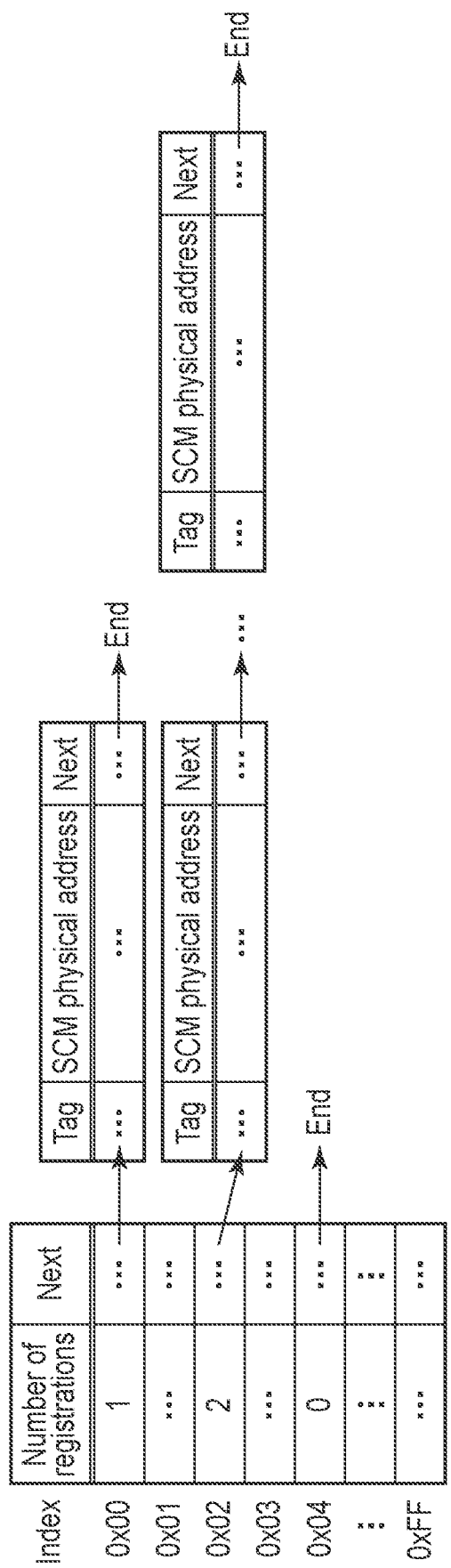
F I G. 49

| Index | Number of registrations | Valid | Tags | SCM physical addresses | Buffer valid | Buffer area entry numbers | Valid | Tags | SCM physical addresses | Buffer valid | Buffer area entry numbers | Valid | Tags | SCM physical addresses | Buffer valid | Buffer area entry numbers | ... |
|---|---|---|---|---|---|---|---|---|---|---|---|---|---|---|---|---|---|
| 0x00 | ... | ... | ... | ... | ... | ... | ... | ... | ... | ... | ... | ... | ... | ... | ... | ... | ... |
| 0x01 | ... | ... | ... | ... | ... | ... | ... | ... | ... | ... | ... | ... | ... | ... | ... | ... | ... |
| 0x02 | ... | ... | ... | ... | ... | ... | ... | ... | ... | ... | ... | ... | ... | ... | ... | ... | ... |
| 0x03 | ... | ... | ... | ... | ... | ... | ... | ... | ... | ... | ... | ... | ... | ... | ... | ... | ... |
| 0x04 | ... | ... | ... | ... | ... | ... | ... | ... | ... | ... | ... | ... | ... | ... | ... | ... | ... |
| ... | ... | ... | ... | ... | ... | ... | ... | ... | ... | ... | ... | ... | ... | ... | ... | ... | ... |

F I G. 50

MEMORY SYSTEM WITH WRITE MODES BASED ON AN INTERNAL STATE OF A MEMORY CONTROLLER

CROSS-REFERENCE TO RELATED APPLICATIONS

This application is based upon and claims the benefit of priority from Japanese Patent Application No. 2020-156369, filed Sep. 17, 2020, the entire contents of which are incorporated herein by reference.

FIELD

Embodiments described herein relate generally to a memory system.

BACKGROUND

Recently, a computer system including a memory system (SCM module) including a non-volatile memory referred to as a storage class memory (hereinafter SCM) is well known.

Such a memory system can be used as a main memory or a storage device since the memory system has middle characteristics between a main memory such as a dynamic random access memory (DRAM) and a storage device such as a solid state drive (SSD).

However, latency in SCM is long at random write of writing data in a non-contiguous order based on the addresses designated by CPU, and SCM is required to improve the write performance.

BRIEF DESCRIPTION OF THE DRAWINGS

FIG. 1 is a diagram illustrating an example of a configuration of a computer system including a memory system according to an embodiment.

FIG. 2 is a block diagram illustrating an example of a configuration of an SCM module in a comparative example of the embodiment.

FIG. 3 is a block diagram illustrating an example of an internal structure of the SCM chip in the comparative example of the embodiment.

FIG. 4 is a diagram illustrating an address translation table in the comparative example of the embodiment.

FIG. 5 is a diagram illustrating use of a higher-order bit of a logical address as an index in the comparative example of the embodiment.

FIG. 6 is a diagram illustrating a data structure of the data stored in the SCM in the comparative example of the embodiment.

FIG. 9 is a diagram illustrating an example of a second buffer management table in the comparative example of the embodiment.

FIG. 11 is a flowchart illustrating an example of a processing procedure of a write process in the comparative example of the embodiment.

FIG. 12 is a flowchart illustrating an example of a processing procedure of a buffer management process in the comparative example of the embodiment.

FIG. 13 is a flowchart illustrating an example of a processing procedure of a nonvolatilization process in the comparative example of the embodiment.

FIG. 14 is a flowchart illustrating an example of a processing procedure of a read process in the comparative example of the embodiment.

FIG. 17 is a flowchart illustrating an example of a processing procedure of the wear leveling process in the comparative example of the embodiment.

FIG. 18 is a flowchart illustrating an example of a processing procedure of a patrol and refresh process in the comparative example of the embodiment.

FIG. 20 is a diagram illustrating an outline of an operation of the SCM module in the comparative example of the embodiment.

FIG. 21 is a diagram illustrating an outline of an operation of the SCM module according to the embodiment.

FIG. 23 is a diagram illustrating an example of first and second memory areas within the SCM chip in the embodiment.

FIG. 25 is a diagram illustrating an example of a free area management table in the embodiment.

FIG. 26 is a diagram illustrating an example of a second address translation table in the embodiment.

FIG. 27 is a diagram illustrating use of a lower-order bit of a logical address as an index and use of a higher-order bit of the logical address as a tag in the embodiment.

FIG. 31 is a flowchart illustrating an example of a processing procedure of a writeback process in the embodiment.

FIG. 33 is a diagram illustrating a management method of a table update log in the embodiment.

FIG. 34 is a diagram illustrating an outline of updating the second address translation table using the table update log in the embodiment.

FIG. 35 is a flowchart illustrating an example of a processing procedure of a wear leveling process in the embodiment.

FIG. 38 is a diagram illustrating another example of the first and second memory areas within the SCM chip in the embodiment.

FIG. 39 is a diagram illustrating a Head pointer and a Tail pointer in the embodiment.

FIG. 40 is a diagram illustrating an example of a chunk management table in the embodiment.

FIG. 41 is a diagram illustrating yet another example of the first and second memory areas within the SCM chip in the embodiment.

FIG. 42 is a diagram illustrating another example of the chunk management table in the embodiment.

FIG. 43 is a diagram illustrating another example of the method of managing a free area of the second memory area in the embodiment.

FIG. 44 is a diagram illustrating another example of the free area management table in the embodiment.

FIG. 49 is a diagram illustrating another example of a list referred to as the second address translation table in the embodiment.

FIG. 50 is a diagram illustrating yet another example of the second address translation table in the embodiment.

DETAILED DESCRIPTION

Figure 7:
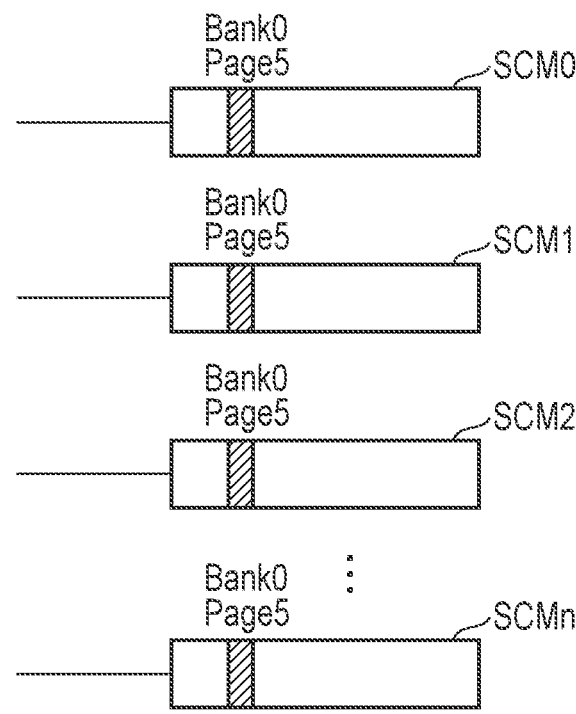
FIG. 7 is a diagram illustrating an example of physical arrangement of the data stored in the SCM in the comparative example of the embodiment.

Various embodiments will be described hereinafter with reference to the accompanying drawings.

In general, according to one embodiment, a memory system connectible to a host is provided. The memory system includes a non-volatile memory and a controller controlling the non-volatile memory. The non-volatile memory includes first and second memory areas. The controller is configured to, when receiving a write command in which data to be written to the non-volatile memory and a logical address for the host to access the data is designated, from the host, determine a write method of writing the data based on an internal state of the controller or a state of the non-volatile memory. The controller is configured to, when a first method is determined as the write method, write the data to the first memory area by the first method. The controller is configured to, when a second method is determined as the write method, write the data to the second memory area by the second method. The first method is a write method of writing the data to a physical address associated with the logical address designated in the write command when the data is written to the first memory area.

The second method is a write method of writing the data to a physical address designated by the controller as a write destination of the data, irrespective of the logical address, when the data is written to the second memory area.

FIG. 1 illustrates an example of a configuration of a computer system including a memory system according to the embodiment.

As illustrated in FIG. 1, a computer system 1 includes a CPU 10, a DRAM 20, an SCM module 30, a storage device 40, an accelerator 50, a network interface 60, and the like. Incidentally, the memory system according to the embodiment is implemented as the SCM module 30 illustrated in FIG. 1.

The CPU 10 controls operations of the entire computer system 1 and operates as a host for, for example, the SCM module 30, the storage device 40, and the like. Incidentally, the CPU 10 may be built in, for example, a personal computer, a server device, a cellular telephone, an imaging device, a mobile terminal such as a tablet computer or a smartphone, a game console, or a vehicle-mounted terminal such as a car navigation system. Incidentally, only one CPU 10 is illustrated in FIG. 1. However, the CPU 10 may be connected to a plurality of other CPUs.

The DRAM 20 is connected to the CPU 10 via a memory bus and is used as a main memory in the computer system 1.

The SCM module 30 is a memory system including a non-volatile memory referred to as a storage class memory (SCM). The SCM module 30 has intermediate performance of the DRAM 20 and the storage device 40. More specifically, the storage capacity of the SCM module 30 is larger than that of DRAM and its access speed to the SCM module 30 is higher than the storage device 40. In addition, the SCM module 30 is persistent unlike the DRAM 20. With this performance, the SCM module 30 can be used as a main memory or can be used as an auxiliary storage device. In FIG. 1, the SCM module 30 is connected to the CPU 10 via the memory bus. However, the SCM module 30 may be connected to the CPU 10 via, for example, the other bus, a switch, or a network.

In the embodiment, write commands (write requests), read commands (read requests), and the like are issued from the CPU 10 to the SCM module 30. The access unit from the CPU 10 to the SCM module 30 is set to 64 bytes. Incidentally, a detailed configuration of the SCM module 30 will be described later.

The storage device 40 is, for example, an auxiliary storage device implemented as SSD and is connected to the CPU 10 via PCI Express bus or the like.

The accelerator 50 is a device which improves (accelerates) a processing speed in the computer system 1.

The network interface 60 is an interface which allows the computer system 1 to execute communication with an external device or the like via a network.

Incidentally, the configuration of the computer system 1 illustrated in FIG. 1 is a mere example. In the computer system 1, at least a part of the components may be omitted or the other component may be added.

It has been described that the CPU 10 issues the write command or the read command. However, the accelerator 50 or the network interface 60 connected to the SCM module 30 can also issue the write command or the read command.

The SCM module according to a comparative example of the embodiment will be hereinafter described before describing the SCM module (memory system) 30 according to the embodiment.

FIG. 2 is a block diagram illustrating an example of a configuration of an SCM module (memory system) 30' according to a comparative example of the embodiment.

As illustrated in FIG. 2, the SCM module 30' includes an SCM controller 31', an SCM 32' and a DRAM 33'.

The SCM controller 31' includes a CPU interface (I/F) 311', a control unit 312', a data transfer unit 313', a buffer 314', a buffer management unit 315', an address translation unit 316', an ECC encoder 317', an ECC decoder 318', SCM interfaces (I/Fs) 319', and a DRAM interface (I/F) 320'.

Incidentally, all or several parts of function units in the SCM controller 31' according to the comparative example of the embodiment may be implemented by, for example, hardware, software, or a combination of hardware and software.

The CPU interface 311' is an interface circuit configured to execute communication between the CPU 10 and the SCM module 30'. More specifically, the CPU interface 311' receives various commands from the CPU 10. Various commands from the CPU 10 include the above-described write command and the read command, and the like.

The control unit 312' includes a function of controlling the function of the SCM module 30'. The control unit 312' includes, for example, a CPU and the like to execute a control program (firmware) loaded on the DRAM 33'. The operation of the control unit 312' is controlled by this control program.

When the write command is received by the above-described CPU interface 311', data is written to the SCM 32' based on the write command. The data transfer unit 313' transfers the data to the SCM 32' via the SCM interface 319'. In addition, when the read command is received by the CPU interface 311', data is read from the SCM 32' based on the read command. The data transfer unit 313' transfers the data to the CPU 10 via the CPU interface 311'.

Incidentally, the data written to the SCM 32' based on the write command and the data read from the SCM 32' based on the read command are temporarily stored (buffered) in the buffer 314'. In the embodiment, the buffer 314' is assumed to be implemented by a volatile memory with higher performance compared to the SCM 32'. Incidentally, the buffer 314' may be implemented by the DRAM 33'.

The buffer management unit 315' executes allocating and freeing a buffer area (hereinafter referred to as a buffer area) of the buffer 314', management of the data stored in the buffer 314' (hereinafter referred to as buffer management), and the like.

When the CPU 10 (host) accesses the SCM module 30' (to write or read data), a logical address is designated. Correspondence between the logical address designated by the CPU 10 (i.e., the logical address used when the CPU 10 accesses the SCM module 30') and a physical address indicative of a physical location in the SCM 32' accessed with the logical address is managed by an address translation table.

Incidentally, in the embodiment and the comparative example of the embodiment, the "address translation table" may be data for managing the correspondence between the logical address and the physical address or may have a data structure (tree structure or the like) different from a table format. The other data referred to as a table in the embodiment and the comparative example of the embodiment may be configured similarly.

The address translation unit 316' translates, for example, the logical address designated in the write request or the read request from the CPU10 into the physical address by referring to the address translation table. The SCM controller 31' can access the SCM 32' based on the physical address translated by the address translation unit 316'.

Incidentally, a SCM cell (memory cell) wears when repeating data write. For this reason, a wear leveling process to be described later is executed to extend a product life of the SCM module 30'. In this case, the correspondence between the logical address and the physical address is changed. The change of the correspondence is managed on the address translation table. Incidentally, some types of SCM wear by repeating data read. In the following descriptions, it is assumed that the weariness of the SCM is recognized based on the number of times of data write, for convenience.

The ECC encoder 317' and the ECC decoder 318' configure an error correcting code (ECC) circuit for detecting and correcting one or more errors included in the data. The ECC encoder 317' executes a process (ECC encoding process) of generating a parity for error correction (ECC parity) for the data when the data is written to the SCM 32'. When the data is read from the SCM 32', the ECC decoder 318' detects one or more errors included in the data based on the parity generated for the data and executes a process (ECC decoding process) of correcting the detected error.

In addition, for example, the error correcting process of the ECC decoding process may sometimes be failed. However, detailed descriptions of the process and the like in this case will be omitted in the embodiment and the comparative example of the embodiment.

The SCM interface 319' is a memory control circuit configured to control the SCM 32'. The SCM controller 31' is electrically connected to the SCM 32' via the SCM interface 319'.

The DRAM interface (I/F) 320' is a DRAM control circuit configured to control the DRAM 33'.

The SCM 32' includes a plurality of SCM chips. A plurality of memory cells (memory elements) are incorporated in each of the SCM chips. The SCM 32' may be an SCM having a two-dimensional structure or may be an SCM having a three-dimensional structure. Incidentally, in the comparative example, the SCM 32' is the SCM having a two-dimensional structure. The same applies to the embodiment to be described below.

In the example illustrated in FIG. 2, the SCM 32' includes 2s SCM chips SCM0 to SCM2s−1. In this case, the SCM controller 31' includes s SCM interfaces 319'. Two SCM chips are connected to each of the SCM interface 319'.

It has been described that the SCM 32' includes a plurality of SCM chips. However, the SCM 32' may include a plurality of SCM packages. In addition, the SCM 32' may include a single SCM chip or a single SCM package. In the comparative example and the like, it is assumed that a plurality of SCM chips (SCM packages) are arranged side by side.

The DRAM 33' is a volatile memory and is used as, for example, a temporary buffer or the like for software run by the SCM controller 31' (control unit 312'). In addition, the address translation table may be stored (cached) in the DRAM 33'. In this case, the entire address translation table or a part of the address translation table may be stored in the DRAM 33'. In the comparative example and the like, however, the entire address translation table is assumed to be stored in the DRAM 33' for convenience. Incidentally, the SCM module 30' may include a static random access memory (SRAM) or the like instead of the DRAM 33'.

In addition, the SCM module 30' may further include a power loss detector 34' and a battery 35' as illustrated in FIG. 2.

The power loss detector 34' detects the power loss when the power is supplied from an outside of the SCM module 30'. Incidentally, the power loss detected by the power loss detector 34' includes unexpected power loss and the surprised power removal.

When the power loss is detected by the power loss detector 34', the battery 35 supplies the power to the SCM module 30'. The SCM module 30' can thereby continue the operation even in a case where the power loss occurs.

Figure 3:
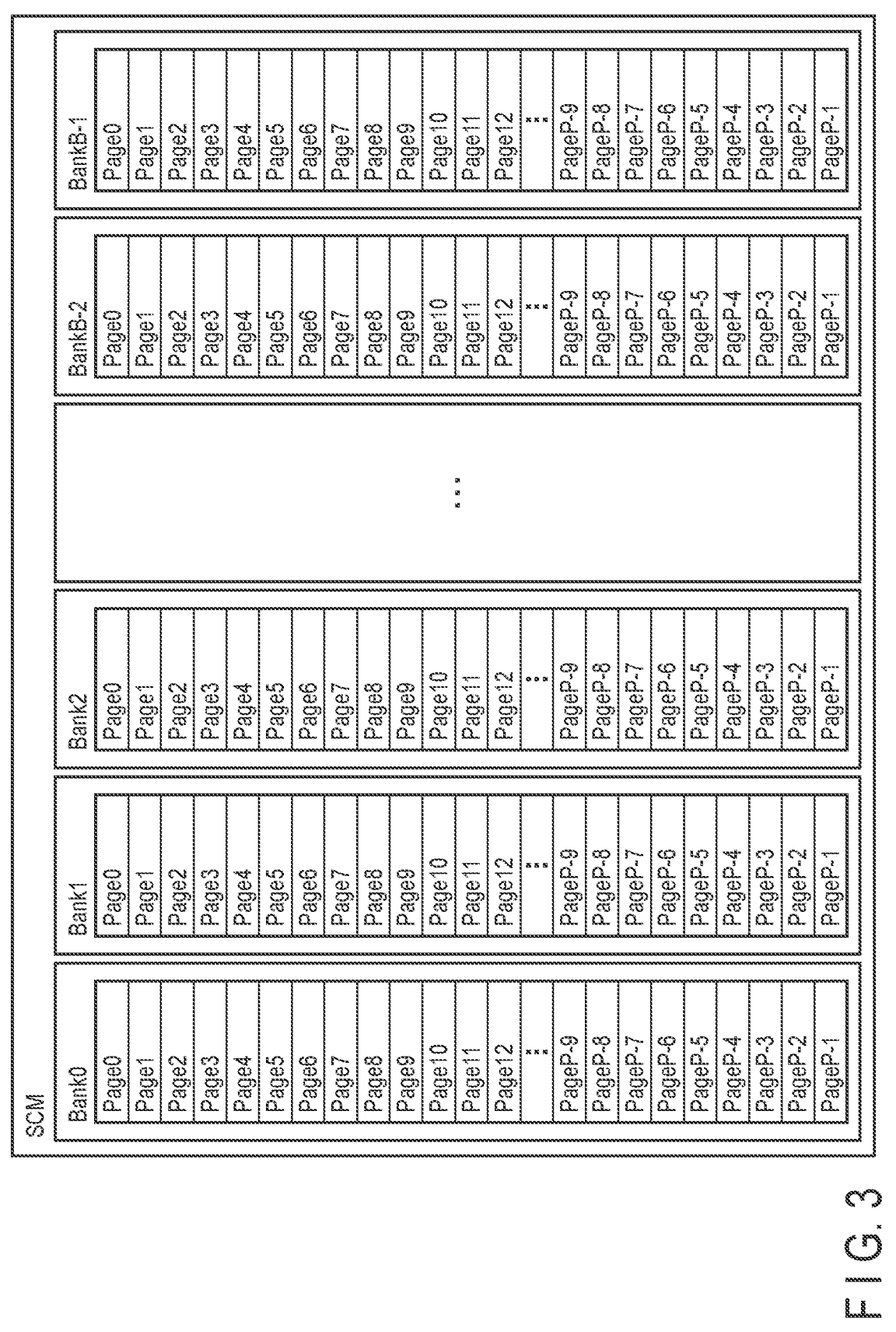

Next, an example of an internal structure of the SCM module 30' illustrated in FIG. 2 will be described with reference to FIG. 3. In FIG. 3, an internal structure of one of SCM chips provided in the SCM module 30' will be described. The other SCM chips have the same internal structure.

The SCM 32' includes a plurality of banks partitioned in a unit of being accessed in parallel from the SCM controller 31' (i.e., the outside of the SCM 32'). In the example illustrated in FIG. 3, the SCM 32' (i.e., one SCM chip) includes Bank 0 to Bank B−1.

In addition, each of Bank 0 to Bank B−1 provided in the SCM 32' is divided into a plurality of pages. In the example illustrated in FIG. 3, each of Bank 0 to Bank B−1 is divided into P pages (Pages 0 to P−1).

The page includes the memory cell. The data is written in the unit of a page in the SCM module 30' (or the SCM 32'). Incidentally, the size of the data which can be written to one page is, for example, 8 bytes, 16 bytes, 32 bytes, or the like. When the data is written in the unit of a page, the SCM chip number, the bank number (identifier for identifying the bank), and the page number (identifier for identifying the page) are specified.

In addition, when the data written in the unit of a page is accessed, the SCM chip number, the bank number (identifier for identifying the bank), and the page number (identifier for identifying the page) are also specified.

Incidentally, in the above SCM 32', the data can be written in the In-Place Update (Write) method. The In-Place Update (Write) method is a method of writing the data to a desired page. More specifically, for example, when the data based on the write command are written to the SCM 32', the method writes (overwrites) the data to a physical address associated with a logical address designated in the write command.

The address translation table will be described below with reference to FIG. 4. As illustrated in FIG. 4, a physical address (SCM physical address) and Valid are stored in association with index, in the address translation table.

The index is a value derived from the logical address designated by the CPU 10. In addition, in an SCM module which can designate a namespace and a partition, the index may be a value derived from the namespace and partition designated by the CPU 10 and the logical address. More specifically, the CPU 10 designates the logical address and the identification numbers of the namespace, or designates the logical address and the identification number of the partition, when accessing the SCM module 30. The SCM module 30 manages a starting index number of each namespace or a starting index number of each partition, and acquires the starting index number with the identification numbers of the namespace or the identification numbers of the partition designated by the CPU 10. Furthermore, the index used in the address translation table is derived by adding an offset of the index derived from the logical address designated by the CPU 10 to the starting index number.

The physical address (SCM physical address) is a physical address in the SCM 32' accessed based on the associated index. Incidentally, according to the physical address, the SCM chip number, the bank number, and the page number to be accessed can be recognized.

Valid is indicative of validity or invalidity of information of each entry of the address translation table. Incidentally, Valid "1" indicates that the information of the entry is valid and Valid "0" indicates that the information of the entry is invalid. Invalidity of the information of entry indicates that the data corresponding to the index (logical address) are not present in the SCM 32'.

According to the above-described address translation table, the physical address (SCM physical address) can be acquired by referring to the logical address designated by the CPU 10 as the index.

When the access unit of the CPU 10 is assumed to be 64 bytes as described above, the correspondence between the logical addresses and the physical addresses is desirably managed in the access unit (64-byte unit) of the CPU 10. However, when the correspondence between the logical addresses and the physical addresses is managed in the unit of 64 bytes, the size (capacity) of the address translation table becomes larger.

Incidentally, the address translation table is stored in the SCM 32' and is non-volatilized. However, when referring to the address translation table, the address translation table is cached in, for example, the DRAM 33'. In this case, when the size of the address translation table is made larger, a large-capacity DRAM 33' (memory) is required, which severely affects the costs of the SCM module 30'. Furthermore, for example, a plurality of DRAM packages for large capacity may not be mounted on the substrate.

For this reason, in the SCM module 30' according to the comparative example of the embodiment, the correspondence between the logical addresses and the physical addresses in the address translation table is managed in larger units. In this example, the correspondence is not managed in a unit of 64 bytes, but a unit of 256 bytes. Incidentally, the management unit of the address translation table is a unit of wear leveling to be described later.

In this case, higher-order bits (i.e., a part other than the offset of lower-order 2 bits) of the logical address (in a unit of 64 bytes) designated by the CPU 10 illustrated in FIG. 5 are used as the index in the address translation table.

According to this, the correspondence of four contiguous logical addresses that are indicated by the index and 2-bit offset and which are 256-byte aligned and the physical address can be managed (i.e., the correspondence between the logical addresses and physical addresses can be managed for each 256-byte data) by one entry of the address translation table.

Incidentally, (the indexes derived from) the logical addresses and the physical addresses described with reference to FIG. 4 are mere examples. The logical addresses and the physical addresses may be optionally simplified in the following descriptions.

The data structure of the data (ECC frame) stored in the SCM 32' will be simply described with reference to FIG. 6.

In the comparative example of the embodiment, the correspondences between the logical addresses and the physical addresses are managed in the 256-byte unit, and the size of the data of the ECC frame is set to the same size. The 256-byte data is stored in the SCM 32' as a single ECC frame to which the metadata and the ECC parity are added.

The 256-byte data is composed of four 64-byte data that is the access unit of the CPU 10. The logical addresses of the four 64-byte data constituting the 256-byte data are contiguous and the 256-byte data are 256-byte aligned.

The metadata is the data on the 256-byte data configuring the ECC frame and includes, for example, the index (i.e., the part other than the offset of the logical address designated by the CPU 10) referred to in the address translation table when the 256-byte data is written. In addition, the metadata may include, for example, information indicating whether each of the four 64-byte data of the 256-byte data composing the ECC frame is valid or not.

The ECC parity is the parity for error correction which is composed for the metadata and the 256-byte data composing the ECC frame.

In the SCM 32', the data sometimes cannot be correctly read due to various factors (for example, leaving the data for a long time after writing the data, or the like). Therefore, ECC protection is executed for the four 64-byte data and the metadata by adding the ECC parity. Incidentally, to execute correction using the ECC parity, the entire ECC frame including the 256-byte data, the metadata, and the ECC parity needs to be read. For this reason, for example, the entire ECC frame needs to be read from SCM 32' to acquire the desired 64-byte data. In addition, when writing to the only 64-byte data, a Read Modify Write process to be described later is required.

Incidentally, the above-described ECC frame (the four 64-byte data, metadata, and ECC parity) is assumed to be written to an area (i.e., Page 5 of Bank0) in each of SCM0 to SCMn that are common with respect to the Bank number (in this example, 0) and the Page number (in this example, 5) as illustrated in FIG. 7. When the single ECC frame is physically arranged (i.e., interleaved and arranged on the page in each of a plurality of SCM chips provided in the SCM 32'), the four 64-byte data, metadata, and ECC parity can be read together and the ECC frame can be acquired.

According to the physical address stored in the above-described address translation table, for example, it can be recognized that, for example, the ECC frame (the four 64-byte data, metadata, and ECC parity) is written to Page 5 of Bank0 in each of SCM0 to SCMn. In fact, however, the logical address designated by the CPU 10 corresponds the unit of 64 bytes. In this case, the 64-byte data which are to be accessed by the CPU 10, of the ECC frame (256-byte data) written to Page 5 of Bank0 of SCM0 to SCMn, can be specified by lower-order 2 bits (offset) of the logical address.

Incidentally, the physical arrangement of the data described with reference to FIG. 7 is a mere example. When the group of the page to which the single ECC frame is written is appropriately recognized, the other arrangement can be adopted.

In addition, the data designated by the CPU 10 in the write command is written to the SCM 32'. In addition to the data, the system management information is also stored in the SCM 32'. The system management information includes the above-described address translation table, firmware, and parameter set values of the functions (function blocks) included in the SCM controller 31', and the like. Incidentally, the system management information may be stored in a predetermined area (fixed area) of the SCM 32'.

Next, an outline of buffer management in the comparative example of the embodiment will be described. In the comparative example of the embodiment, for example, when a write command is received from the CPU 10, the data written to the SCM 32' based on the write command is temporarily stored in the buffer 314'. Similarly, for example, when a read command is received from the CPU 10, the data read from the SCM 32' based on the read command is temporarily stored in the buffer 314'.

Thus, to store the data in the buffer 314', allocation and releasing of the buffer area need to be appropriately executed. The buffer area (i.e., free area of the buffer 314') is managed by using a first buffer management table illustrated in FIG. 8.

Figure 8:
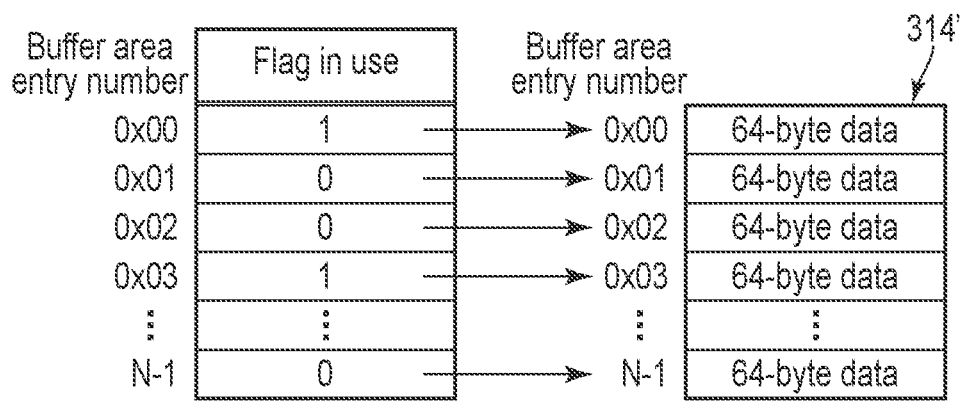
FIG. 8 is a diagram illustrating an example of a first buffer management table in the comparative example of the embodiment.

As illustrated in FIG. 8, the first buffer management table stores a flag in use in association with the buffer area entry number.

The buffer area entry number is the number assigned to the buffer area. Incidentally, in the comparative example of the embodiment, 64-byte data is stored in the buffer area assigned one buffer area entry number. In other words, the data is managed in units of 64 bytes in the buffer 314'.

The flag in use is a flag indicating whether the buffer area assigned the corresponding buffer area entry number is being used or not. Incidentally, in the example illustrated in FIG. 8, the flag in use "1" indicate that the buffer area is being used while the flag in use "0" indicates that the buffer area is not being used.

According to the first buffer management table, when the write command or the read command is received from the CPU 10, the buffer area (i.e., free area) assigned the buffer area entry number associated with the flag in use "0" can be allocated to the data corresponding to the command.

Incidentally, for example, when the data temporarily stored in (the buffer area in) the buffer 314' is written to the SCM 32' based on the write command or when the data temporarily stored in (the buffer area in) the buffer 314' is transmitted to the CPU 10 based on the read command, the buffer area in which the data is stored is released and allocated to the other data. When the number of the buffer area entry numbers (i.e., the number of entry) is large, much time is required to search the buffer area (free area) released from the first buffer management table. To reduce the latency of allocation of the buffer area, the buffer area entry number assigned to the released buffer area may be subjected to queuing in advance. According to this, the buffer area entry number can be acquired from the head of the queue at the allocation of the buffer area, and the buffer area assigned the buffer area entry number can be allocated.

The free area of the buffer 314' is managed by using the first buffer management table as described above. The data stored in the buffer 314' is managed by the second buffer management table illustrated in FIG. 9. Incidentally, in the second buffer management table, the data stored in the buffer 314' is managed in units of 256 bytes in accordance with the above-described ECC frame.

As illustrated in FIG. 9, the second buffer management table stores Valid, logical address higher-order bits, and data management numbers 0 to 3 in association with one another.

Valid indicates whether the entry of the second buffer management table including the Valid is valid (used) or invalid (unused). Incidentally, Valid "1" indicates that the entry is valid and Valid "0" indicates that the entry is invalid.

The logical address higher-order bits corresponds to the index stored in the above-described address translation table. That is, the logical address higher-order bits is indicative of the four contiguous logical addresses that are indicated by the logical address higher-order bits and 2-bit offset and which are 256-byte aligned.

The data management numbers 0 to 3 correspond to the data (i.e., the four 64-byte data) accessed with the four contiguous logical addresses that are indicated by the logical address higher-order bits and 2-bit offset and which are 256-byte aligned, respectively. That is, the data management numbers 0 to 3 correspond to lower-order 2 bits (offset) of the logical address designated by the CPU 10.

More specifically, the data management number 0 corresponds to the data accessed with a starting logical address of the four contiguous logical addresses that are indicated by the logical address higher-order bits and 2-bit offset and which are 256-byte aligned. The data management number 1 corresponds to the data accessed with a second logical address of the contiguous logical addresses in which the four alignments indicated by the logical address higher-order bits and 2-bit offset are arranged parallel. The data management number 2 corresponds to the data accessed with a third logical address of the four contiguous logical addresses in which alignments indicated by the logical address higher-order bits and 2-bit offset are arranged parallel. The data management number 3 corresponds to the data accessed with a fourth logical address of the four contiguous logical addresses in which alignments indicated by the logical address higher-order bits and 2-bit offset are arranged parallel.

In addition, each of the data management numbers 0 to 3 is associated with Ready and the buffer area entry number. Ready indicates whether the data corresponding to each of the data management numbers 0 to 3 is in Ready state or not. Incidentally, Ready "1" indicates that the data corresponding to each of the data management numbers 0 to 3 is in the Ready state, and Ready "0" indicates that the data corresponding to each of the data management numbers 0 to 3 is not in the Ready state (i.e., in Not Ready state). Incidentally, the Ready state is indicative of a state in which the data corresponding to each of the data management numbers 0 to 3 is stored in the buffer area and the data is accessible.

The buffer area entry number is the number assigned to the buffer area where the data corresponding to each of the data management numbers 0 to 3 is stored.

For example, when the data accessed with the starting logical address, of the data accessed with the four contiguous logical addresses in which the alignments indicated by the logical address higher-order bits and 2-bit offset are arranged parallel, is stored in the buffer area assigned the buffer area entry number "0x00", "1" is set to Ready of the data management number 0 associated with the logical address higher-order bits and "0x00" is set to the buffer area entry number of the data management number 0, in the second buffer management table.

In contrast, when it is assumed that data other than the data accessed with the starting logical address, of the aligned data accessed with the four successive logical addresses, is not stored in the buffer area, "0" is set to Ready of the data management numbers 1 to 3 associated with the logical address higher-order bits.

Incidentally, in the second buffer management table illustrated in FIG. 9, the number of entries including the same logical address higher-order bits is one at the maximum.

An example of a processing procedure of the SCM module 30' according to the comparative example of the embodiment will be described below with reference to a flowchart of FIG. 10. Incidentally, to simplify the descriptions, the SCM controller 31' is assumed to process the commands one by one.

First, when the command is transmitted from the CPU 10, the command is received by the CPU interface 311'. The command received by the CPU interface 311' is received by, for example, the control unit 312' (step S1).

The command received by the control unit 312' (i.e., the command transmitted from the CPU 10) includes, for example, the write command, the read command, and the like.

For this reason, the control unit 312' discriminates whether the command received in step S1 is the write command or not (step S2).

When it is determined that the command received in step S1 is the write command (YES in step S2), a write process based on the write command is executed under control of, for example, the control unit 312', in the SCM controller 31' (step S3). Incidentally, details of the write process executed in step S3 will be described later.

In contrast, when it is determined that the command received in step S1 is not the write command (NO in step S2), the control unit 312' determines whether the received command is the read command or not (step S4).

When it is determined that the command received in step S1 is the read command (YES in step S4), a read process based on the read command is executed under control of, for example, the control unit 312', in the SCM controller 31' (step S5). Incidentally, details of the read process executed in step S5 will be described later.

In contrast, when it is determined that the command received in step S1 is not the read command (NO in step S4), a process based on the command (i.e., a command other than the write command and the read command) is executed under control of, for example, the control unit 312', in the SCM controller 31' (step S6). Incidentally, the command other than the write command and the read command is, for example, a command to instruct change of various settings in SCM module 30' (hereinafter referred to as a setting change command). When the command received in step S1 is the setting change command, a setting change process based on the setting change command is executed under control of, for example, the control unit 312', in the SCM controller 31'. Incidentally, in the setting change process, for example, the firmware update, change of the operation mode of the SCM module 30', and the like are executed.

Next, an example of a processing procedure of the write process (i.e., the process in step S3 illustrated in FIG. 10) executed in the SCM module 30' according to the comparative example of the embodiment will be described with reference to a flowchart of FIG. 11.

Figure 10:
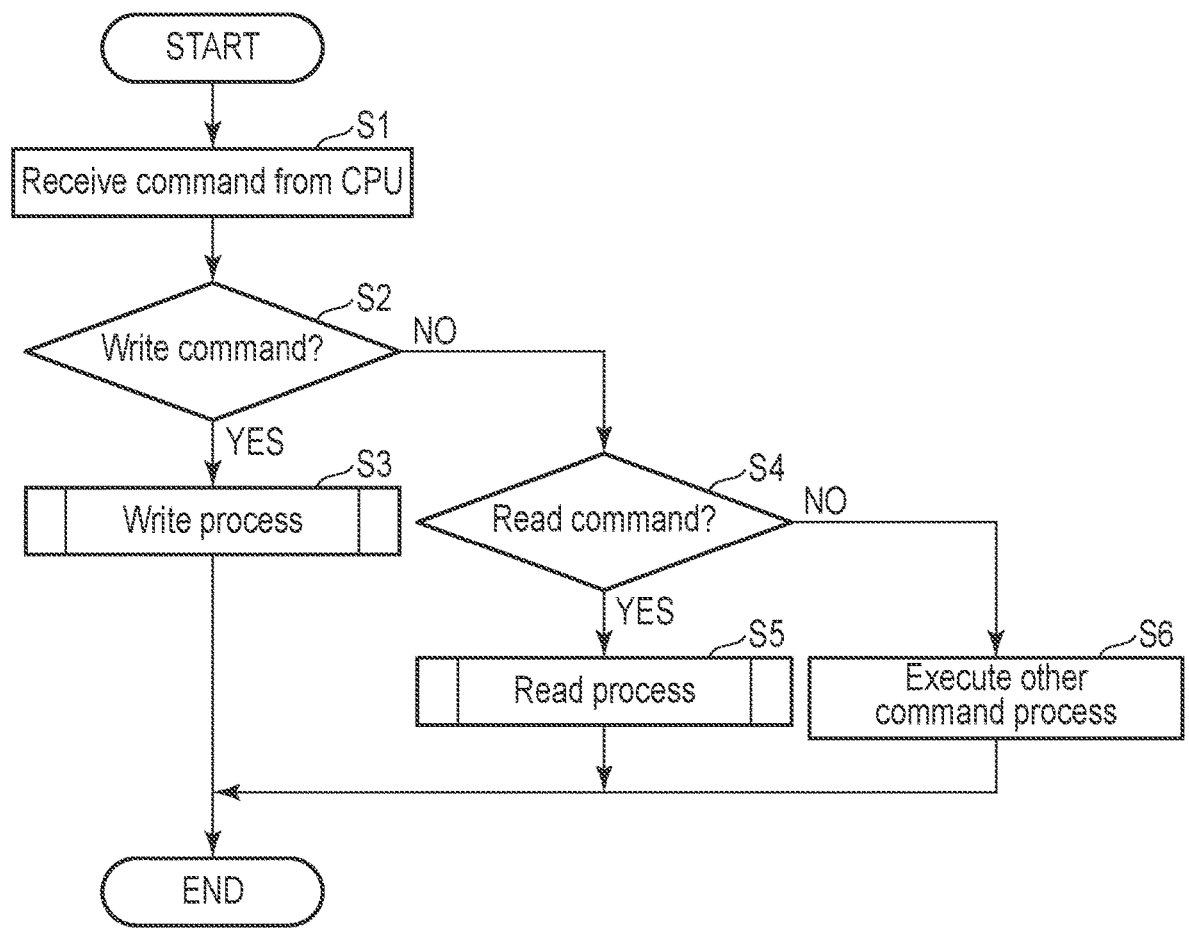
FIG. 10 is a flowchart illustrating an example of a processing procedure of the SCM module in the comparative example of the embodiment.

The write process is executed when the command received in step S1 illustrated in FIG. 10 is the write command. The buffer management unit 315' allocates the buffer area to the data designated in the write command (hereinafter referred to as write target data) (step S11).

More specifically, the buffer management unit 315' searches the buffer area entry number (i.e., the entry in the unused state) stored in the first buffer management table in association with the flag in use "0" by referring to the first buffer management table. The buffer management unit 315' sets the flag in use stored in the first buffer management table in association with the found buffer area entry number to "1 (i.e., the state of being used)".

Incidentally, it has been described that the buffer area is allocated in the write process executed after receiving the write command. However, since it takes long latency in some cases to search the buffer area (free area) after the write command is received from the CPU 10, for example, multiple buffer areas can be allocated together before the command is received.

Next, the data transfer unit 313' transfers the write target data to the buffer 314' (step S12). By executing the process of step S12, the write target data is stored in the buffer area in step S11 (i.e., the buffer area assigned the buffer area entry number acquired from the first buffer management table).

After the process of step S12 is executed, the buffer management unit 315' executes a process of managing the write target data stored in the buffer area, in the second buffer management table (hereinafter referred to as a buffer management process) (step S13). Incidentally, details of the buffer management process will be described later.

After the process of step S13 is executed, the control unit 312' transmits a response (completion response) to the write command received in step S1 illustrated in FIG. 10 to the CPU 10 (step S14). Incidentally, after the process of step S14 is executed, the other command from the CPU 10 can be received (or processed) in the SCM module 30'.

Since the buffer 314' is implemented by a volatile storage device as described above, the data stored in the buffer 314' needs to be non-volatilized by storing to the SCM 32'.

For this reason, it is discriminated whether the data stored in the buffer 314' needs to be non-volatilized or not (step S15). In step S15, for example, when (the capacitance of) the free area of the buffer 314' is smaller than a predetermined value, it is discriminated that the data stored in the buffer 314' is non-volatilized. Incidentally, the free area of the buffer area can be recognized by referring to the first buffer management table.

In addition, in step S15, for example, when the number of entries including Valid "1" stored in the second buffer management table is a predetermined number or more, it may be discriminated that the data stored in the buffer 314' is non-volatilized. Furthermore, in step S15, when all the data corresponding to the data management numbers 0 to 3 stored in the second buffer management table in association with the same logical address higher-order bits are stored in the buffer 314' (i.e., when the 256-byte data managed in the second buffer management table are present together), the data stored in the buffer 314' may be discriminated to be non-volatilized. In addition, in step S15, it may be discriminated that the data stored in the buffer 314' are non-volatilized at the timing at which the access load to the SCM module 30' from the CPU 10 is low.

When it is discriminated that the data stored in the buffer 314' are non-volatilized (YES in step S15), a process of non-volatilizing the data (hereinafter referred to as a non-volatilization process) is executed (step S16). Incidentally, details of the non-volatilization process will be described later.

In contrast, when it is discriminated that the data stored in the buffer 314' are not non-volatilized (NO in step S15), the write process illustrated in FIG. 11 is ended.

In the example illustrated in FIG. 11, when it is discriminated in step S15 that the data stored in the buffer 314' are non-volatilized, the process of step S16 is executed. However, when the data stored in the buffer 314' is to be non-volatilized immediately, the process of step S15 may be omitted.

Next, an example of the processing procedure of the above-described buffer management process (i.e., the process of S13 illustrated in FIG. 11) will be described with reference to a flowchart of FIG. 12.

First, assignment of the entry of the second buffer management table is executed. In this case, the buffer management unit 315' executes the process of searching the entry stored in the second buffer management table, based on the logical address (hereinafter referred to as a target logical address) designated in the write command received in step S1 illustrated in FIG. 10 (step S21). In step S21, the entry including the Valid "1" and the higher-order bits of the target logical address (i.e., the entry in which Valid is "1" and which includes the logical address higher-order bits matching the higher-order bits of the target logical address) is searched in the second buffer management table.

It is discriminated whether the entry is present in the second buffer management table or not, based on the result of executing the process in step S21 (step S22). In step S22, it is discriminated that the entry is present in the second buffer management table when the entry is found (hit) in step S21, and it is discriminated that the entry is not present in the second buffer management table when the entry is not found (not hit) in step S21.

When it is discriminated that the entry is not present (NO in step S22), the buffer management unit 315' searches the entry including Valid "0" (i.e., entry in the unused state) from the second buffer management table (step S23).

After the process of step S23 is executed, the buffer management unit 315' changes the entry found in step S23 to the state of being used (step S24). In this case, "1" is set to Valid included in the entry acquired in step S23 and the higher-order bits of the target logical address are set to the logical address higher-order bits.

Incidentally, the entry acquired in step S23 includes the data management numbers 0 to 3 and Ready is associated with each of the data management numbers 0 to 3. "0" is set to Ready associated with each of the data management numbers 0 to 3 as the initial value. Thus, (the data corresponding to) all the data management numbers 0 to 3 associated with the higher-order bits of the target logical address (logical address higher-order bits) are set to Not Ready state (step S25).

In contrast, when it is discriminated that the entry is present (YES in step S22), the above-described processes of steps S23 to S25 are not executed.

That is, in the above-described entry assignment of the second buffer management table, the process of using the entry is executed when the entry (corresponding entry) is found in step S21 or the process of assigning a new entry is executed when the entry is not found in step S21.

Next, a process of registering the write target data stored in the buffer area in the second buffer management table by executing the process of step S12 illustrated in FIG. 11 is executed.

According to the lower-order bits (2-bit offset) of the target logical address designated in the above-described write command, the data management number corresponding to the write target data (i.e., data designated in the write command), of the data management numbers 0 to 3 included in the entry found in step S21 or S23, can be specified.

In this case, the buffer management unit 315' discriminates whether Ready associated with the data management number corresponding to the write target data is "1" (i.e., whether the data corresponding to the data management number is in the Ready state) or not (step S26).

When it is discriminated that Ready associated with the data management number corresponding to the write target data is "1" (YES in step S26), the data is stored in the buffer area assigned the buffer area entry number associated with the data management number (i.e., the data is in the Ready state).

Ready associated with the data management number corresponding to the write target data is "1", which means overwriting the data of the buffer area associated with the data management number. In this case, the data stored in the buffer area (i.e., the data already buffered) is unnecessary and may be discarded. Therefore, the buffer management unit 315' frees the buffer area assigned the buffer area entry number associated with the above data management number (step S27). In this case, the buffer management unit 315' sets "0" to the flag in use which is stored in the first buffer management table in association with the buffer area entry number associated with the data management number corresponding to the write target data (i.e., sets the entry including the buffer area entry number to the unused state).

After the process of step S27 is executed, the buffer management unit 315' registers the buffer area entry number assigned to the buffer area where the write target data is stored by executing the above process of step S12 illustrated in FIG. 11, in the buffer area entry number associated with the data management number corresponding to the write target data (step S28).

In contrast, when it is discriminated that Ready associated with the data management number corresponding to the write target data is not "1" (i.e., Ready is "0") (NO in step S26), the buffer management unit 315' registers the buffer area entry number assigned to the buffer area where the write target data is stored by executing the above process of step S12 illustrated in FIG. 11, in the buffer area entry number associated with the data management number (step S29).

In addition, the buffer management unit 315' sets "1" to Ready associated with the data management number corresponding to the write target data (step S30). The write target data stored in the buffer 314' (buffer area) is thereby set to the Ready state.

According to the above buffer management process illustrated in FIG. 12, since the data designated in the write command (i.e., the data from the CPU 10) is the latest data at any time, the data is registered in the second buffer management table under no conditions.

Next, an example of the processing procedure of the above-described non-volatilization process (i.e., the process of S16 illustrated in FIG. 11) will be described with reference to a flowchart of FIG. 13. Incidentally, the non-volatilization process is indicative of a process of writing the data stored in the buffer 314' to the SCM 32'.

First, the buffer management unit 315' selects the data to be non-volatilized (hereinafter referred to as non-volatilization target data) by referring to the second buffer management table (step S41).

Incidentally, in step S41, for example, the buffer management unit 315' can select the data first stored in the buffer 314' (i.e., the oldest data), from among the data stored in the buffer 314', as the non-volatilization target data.

In addition, in step S41, when there is the entry in which the four of the 64-byte data is already buffered, the 256-byte data may be selected as the non-volatilization target data. Incidentally, the "entry in which the four of the 64-byte data is already buffered" is indicative of the entry in which Valid is "1" and Ready of each of the data management numbers 0 to 3 associated with the same logical address higher-order bits is "1".

Next, the address translation unit 316' translates the target logical address (i.e., the logical address designated in the write command received in step S1 illustrated in FIG. 10) into the physical address by referring to the above address translation table as illustrated in FIG. 4 (step S42). In this case, the address translation unit 316' acquires the physical address (hereinafter referred to as a target physical address) stored in the address translation table in association with the higher-order bits (i.e., index) of the target logical address.

After the process of step S42 is executed, the control unit 312' discriminates whether the Read Modify Write process is necessary or not when writing the target data to the SCM 32' (step S43).

In the comparative example of the embodiment, the data is written to the SCM 32' in the In-Place Update method. In the address translation table as described above, the data is managed in the unit of 256-byte data accessed with the four contiguous logical addresses which are 256-byte aligned. The 256-byte data is stored in the SCM 32' as the ECC frame to which the metadata and the ECC parity are added. Incidentally, the ECC parity in the ECC frame is generated based on the 256-byte data and the metadata in the ECC frame.

For this reason, for example, when 64-byte non-volatilization target data is written to the SCM 32' by merely using the target physical address translated from the target logical address, the 256-byte data managed in the SCM 32' are updated and the error cannot be corrected using the ECC parity in the ECC frame.

In this case, 256-byte data configuring the same ECC frame are read with the target physical address translated from the target logical address in step S42, a part of the 256-byte data (i.e., 64-byte data) is changed to the non-volatilization target data, and new metadata and new ECC parity are assigned to the data. That is, to write the 64-byte non-volatilization target data to the SCM 32' (i.e., non-volatilize the data), the data need to be written to the SCM 32' in units of 256-byte data assigned the new metadata and new ECC parity. The process of reading the 256-byte data, updating the ECC frame, and writing the data to the SCM 32' is indicative of the Read Modify Write process.

Therefore, for example, when a part of the 256-byte data accessed with the four contiguous logical addresses which are aligned to configure the ECC frame is to be non-volatilized, it is discriminated in step S43 that the Read Modify Write process is required.

In contrast, when the target data is the 256-byte data accessed with the four contiguous logical addresses which are 256-byte aligned to configure the ECC frame (i.e., the four 64-byte data) and the 256-byte data is buffered, the Read Modify Write process is not required since the ECC frame can be configured with the 256-byte data and written to the SCM 32'.

When it is discriminated that the Read Modify Write process is required (YES in step S43), the buffer management unit 315' allocates the buffer area to the 256-byte data read with the target physical address translated from the target logical address in step S42 (i.e., the 256-byte data configuring the same ECC frame) (step S44). Incidentally, the process of allocating the buffer area is the same as the process in step S11 illustrated in FIG. 11 and detailed descriptions are omitted.

Next, the control unit 312' reads the 256-byte data configuring the same ECC frame from the SCM 32' by using the target physical address (step S45).

In step S45, the data is read from the SCM 32' via the SCM interface 319'. The data is subjected to ECC decoding process by the ECC decoder 318' and transferred from the SCM 32' to the buffer 314' via ECC decoder 318' by the data transfer unit 313', under control of the control unit 312'. The data read from the SCM 32' are thereby stored in the buffer area allocated in step S44.

Incidentally, when the Bank regarded as the target physical address is in the Busy state at the time when the process of step S45 is executed, the process of step S45 is executed after standing by until the Bank is in the Ready state. Incidentally, the expression that "the Bank is in the Busy state" is indicative of a state in which, for example, the process of writing data to or reading data from one of the Pages in the Bank cannot be executed for the reason that the process of writing the other data to or reading the other data from one of the Pages in the Bank is being executed, or the like. The expression may be indicative of at least a state in which the write command or the read command cannot be received from the outside. In contrast, the expression that "the Bank is in the Ready state" is indicative of a state in which the process of writing data to or reading data from one of the Pages in the Bank can be executed (i.e., the write command or the read command can be received).

Next, the buffer management unit 315' executes a process of registering the non-volatilization target data stored in the buffer area, in the second buffer management table. In this case, since the data stored in the buffer 314' corresponds to the latest data from the CPU 10, overwriting the data with the old data read from the SCM 32' needs to be prevented.

In this case, the following processes of steps S46 to S49 are executed for each 64-byte data included in the 256-byte data read from the SCM 32' in step S45. In the following descriptions, the four 64-byte data included in the 256-byte data read from the SCM 32' in step S45 are referred to as the first to the fourth data. Incidentally, the first to the fourth data are assumed to correspond to the data management numbers 0 to 3 stored in the second buffer management table.

First, the buffer management unit 315' discriminates whether Ready associated with the data management number 0 stored in the second buffer management table in association with (the logical address higher-order bits matching) the higher-order bits of the target logical address is "1" or not (step S46).

When it is discriminated that Ready is not "1" (i.e., Ready is "0") (NO in step S46), the buffer management unit 315' registers the buffer area entry number assigned to the buffer area where the first data is stored by executing the above process of step S45, in the buffer area entry number associated with the data management number 0 and the higher-order bits of the target logical address in the second buffer management table (step S47).

In addition, the buffer management unit 315' sets "1" to Ready associated with the data management number 0 and the higher-order bits of the target logical address in the second buffer management table. The first data stored in the buffer 314' (buffer area) is thereby set to the Ready state.

In contrast, when it is discriminated that Ready is "1" (YES in step S46), the buffer management unit 315' frees the buffer area where the first data is stored (step S49). Incidentally, the process of freeing the buffer area is the same as the process in step S27 illustrated in FIG. 12 and detailed descriptions are omitted.

The processes of steps S46 to S49 are executed when the first data read from the SCM 32' is valid (i.e., when the data has been previously written from the CPU 10). However, when the first data is invalid (i.e., when the first data has not been written from the CPU 10), the first data may be discarded without executing the process of step S46. Whether the first data is valid or invalid can be discriminated based on the metadata included in the ECC frame.

The processes of steps S46 to S49 are executed for the first data. The processes are also executed for the second to the fourth data in the same manner. Incidentally, when the processes of steps S46 to S49 are executed for the data overwritten with the target data (i.e., the data designated in the write command), it is discriminated in step S46 that Ready is "1" and the process of step S49 is executed since the target data is already stored in the buffer 314' (buffer area) by executing the process of step S12 illustrated in FIG. 11.

By executing such processes, the first to the fourth data are registered in the second buffer management table as long as a condition that the data accessed with the same logical address is not stored in the buffer 314' is satisfied.

Next, the control unit 312' writes to the SCM 32' the 256-byte data stored in the buffer area assigned the buffer area entry number associated with the data management numbers 0 to 3 stored in the second buffer management table in association with the higher-order bits of the target physical address (i.e., the four 64-byte data including the target data), by using the target physical address (step S50).

In step S50, the data is written to the SCM 32' via the SCM interface 319'. The data is subjected to ECC encoding process by the ECC encoder 317' and transferred from the buffer 314' to the SCM 32' via the ECC encoder 317' by the data transfer unit 313', under control of the control unit 312'.

Incidentally, when the Bank regarded as the target physical address is in the Busy state at the time when the process of step S50 is executed, the process of step S50 is executed after standing by until the SCM chip or the Bank becomes the Ready state.

After the process of step S50 is executed, the buffer management unit 315' frees the entry in the second buffer management table (step S51). In step S51, Valid of the entry including the higher-order bits of the target logical address is set to "0" in the second buffer management table. In addition, it is assumed that, for example, after the process of step S50 is executed, a new write command designating the same logical address with the non-volatilization target data received from the CPU 10 is processed and then the process of step S51 is executed. In this case, the data designated in the new write command is stored in the buffer 314'. However, the data stored in the buffer 314' (the latest data) is lost by executing the process of step S51. For this reason, the logical address to access the data stored in non-volatilization target Page is managed in advance. When the write command in which the logical address is designated is received, the process of the write command is set to be awaited. More specifically, when the write command is received during the non-volatilization process, the data designated in the write command is stored in the buffer 314' but the registration in the second buffer management table is awaited. According to this, registration to the second buffer management table can be executed after ending the non-volatilization process, and losing the data designated in the write command by the process of step S51 can be avoided.

Incidentally, when the process of step S51 is executed, all the buffer areas assigned the buffer area entry numbers associated with the data management numbers 0 to 3 included in the entry freed in step S51 are freed.

In contrast, when it is discriminated in step S43 that the Read Modify Write process is unnecessary (NO in step S43), the processes of steps S50 and S51 may be executed for the non-volatilization target data selected in step S41.

In the above-described write process, the SCM module 30' (SCM controller 31') stores the data designated in the write command in the buffer 314' and transmits a response to the write command to the CPU 10, and operates to execute the Read Modify Write process as needed. According to this, the data designated in the write command can be appropriately non-volatilized.

Next, an example of a processing procedure of the read process (i.e., the process in step S5 illustrated in FIG. 10) executed in the SCM module 30' according to the comparative example of the embodiment will be described with reference to a flowchart of FIG. 14.

The read process is executed when the command received in step S1 illustrated in FIG. 10 is the read command. The buffer management unit 315' discriminates whether the data (hereinafter referred to as read target data) accessed with the logical address (hereinafter referred to as target logical address) designated in the read command is stored in the buffer 314' or not (step S61).

The process of step S61 will be specifically described below. First, the buffer management unit 315' searches the entry including the Valid "1" and the logical address higher-order bits matching the higher-order bits of the target logical address, in the second buffer management table. When the entry is found, the buffer management unit 315' specifies one of the data management numbers 0 to 3 including the entry, based on the lower-order 2 bits (offset) of the target logical address, and discriminates whether the Ready associated with the specified data management number is "1" or not. When the Ready associated with the specified data management number is "1", the buffer management unit 315' discriminates that the read target data is stored in the buffer 314'.

In contrast, when the entry including the Valid "1" and the logical address higher-order bits matching the higher-order bits of the target logical address is not present in the second buffer management table (i.e., when the entry is not found in the second buffer management table) or when the Ready associated with the data management number specified by the lower-order 2 bits of the target logical address is not "1" (but "0"), the buffer management unit 315' discriminates that the read target data is not stored in the buffer 314'.

When it is discriminated that the read target data is not stored in the buffer 314' as described above (NO in step S61), the address translation unit 316' translates the target logical address into the physical address (hereinafter referred to as the target physical address) by referring to the address translation table (step S62). Incidentally, the process of translating the target logical address into the target physical address is the same as the process in step S42 illustrated in FIG. 13 and detailed descriptions are omitted.

After the process of step S62 is executed, the buffer management unit 315' allocates the buffer area to the 256-byte data (i.e., the 256-byte data configuring the same ECC frame) read with the target physical address translated from the target logical address in step S62 (step S63). Incidentally, the process of allocating the buffer area is the same as the process in step S11 illustrated in FIG. 11 and detailed descriptions are omitted.

Next, the control unit 312' reads the 256-byte data configuring the same ECC frame from the SCM 32' by using the target physical address (step S64). The process of reading the data from the SCM 32' is the same as the process in step S45 illustrated in FIG. 13 and detailed descriptions are omitted.

After the process of step S64 is executed, the 256-byte data (i.e., the four 64-byte data) read from the SCM 32' in step S64 are stored in the buffer 314'. The data transfer unit 313' acquires the 64-byte data (i.e., read target data) specified based on the lower-order 2 bits of the target logical address from the 256-byte data. In this case, the data transfer unit 313' transfers the data acquired from the buffer 314' to the CPU 10 and transmits the completion response to the CPU 10 (step S65). Incidentally, the read target data is transferred (transmitted) to the CPU 10 via the CPU interface 311'.

After the process of step S65 is executed, the buffer management unit 315' frees the buffer area where the 256-byte data read from the SCM 32' in step S64 are stored. Incidentally, the process of freeing the buffer area is the same as the process in step S27 illustrated in FIG. 12 and detailed descriptions are omitted. After the process of step S66 is executed, the read process is ended.

In contrast, when it is discriminated that the read target data is stored in the buffer 314' (YES in step S61), the read target data is stored in the buffer area assigned the buffer area entry number associated with the data management number specified by the lower-order 2 bits of the target logical address included in the entry including the Valid "1" and the higher-order bits of the target logical address. For this reason, the data transfer unit 313' acquires the read target data stored in such a buffer area from the buffer 314'. In this case, the data transfer unit 313' transfers the data acquired from the buffer 314' to the CPU 10 and transmits the completion response to the CPU 10 (step S67). After the process of step S67 is executed, the read process is ended.

In the read process, as described above, the SCM module 30' (SCM controller 31') operates to return the latest data (i.e., 64-byte data) in response to the read command from the CPU 10. That is, when the read target data (i.e., the data accessed with the logical address designated in the read command) is stored in the buffer 314', the read target data stored in the buffer 314' is returned to the CPU 10. When the read target data is not stored in the buffer 314', the read target data read from the SCM 32' is returned to the CPU 10.

Incidentally, although omitted in the comparative example of the embodiment, for example, when a cache area is set in the DRAM 33' and when the read data is stored in the cache area, the read target data may be returned from the cache area (read cache) to the CPU 10.

In addition, although descriptions are omitted in FIG. 14, when the read target data is not present in the buffer 314' or the SCM 32' (i.e., when data has not been previously written from the CPU 10 to the target logical address), a process of returning an error to the CPU 10 may be executed.

It is known that when writing the data to a specific Page of the SCM 32' is repeated, a memory cell included in the Page wears. The data written to the memory cell where such weariness is accumulated cannot be read correctly.

For this reason, for example, when writing the data (write access) from the CPU 10 has high locality, the memory cell included in a specific Page may wear, which is a factor of shortening the product lifetime of the SCM module 30'.

Thus, in the comparative example of the embodiment, in order to attempt improvement of endurance and longer lifetime of the SCM module 30', the wear leveling process of changing the correspondence between the logical address and the physical address based on the number of times of writing the data to the physical address (Page) is executed.

Figures 15, 16:
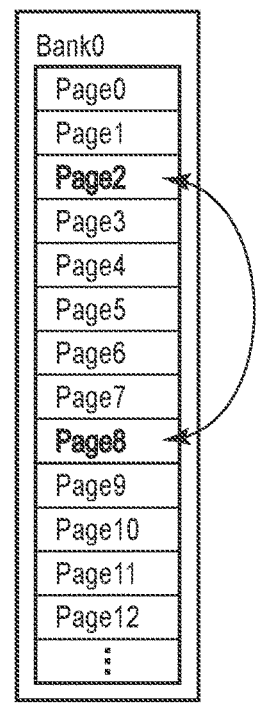
FIG. 15 is a diagram illustrating an example of a write count management table in the comparative example of the embodiment.
FIG. 16 is a diagram illustrating an outline of a wear leveling process in the comparative example of the embodiment.

An outline of the wear leveling process will be described below with reference to FIG. 15 and FIG. 16. FIG. 15 illustrates an example of a write count management table for managing a write count of the data for each physical address (Page specified by SCM chip number, Bank number, and Page number). The write count management table is stored in, for example, the SCM 32' as the system management information.

According to the example illustrated in FIG. 15, for example, the write count of the data of SCM0/Bank0/Page2 (i.e., Page specified by SCM chip number 0, Bank number 0, and Page number 2) is 3,000. The write count (frequency) of the data to the Page is more than the other Page.

In this case, SCM0/Bank0/Page2 at which the data write count is large is swapped for the other Page as illustrated in FIG. 16. Since the write count of the data to SCM0/Bank0/Page8 is small in the example illustrated in FIG. 15, replacing SCM0/Bank0/Page2 with SCM0/Bank0/Page8 is illustrated in FIG. 16. Incidentally, although not illustrated, when SCM0/Bank0/Page2 is swapped for the other Page, SCMx/

Bank0/Page2 (for example, SCM1/Bank0/Page2, SCM2/Bank0/Page2, and the like) are also swapped for the other Page.

For example, "replacing the first Page with the second Page" is indicative of changing the correspondence (updating the address translation table) such that the first Page corresponds to the second logical address and the second Page corresponds to the first logical address, in a case where the first Page (physical address) corresponds to the first logical address and the second Page (physical address) corresponds to the second logical address.

In this case, for example, when SCM0/Bank0/Page2 corresponds to the first logical address and SCM0/Bank0/Page8 corresponds to the second logical address, the address translation table is updated such that SCM0/Bank0/Page2 corresponds to the second logical address and SCM0/Bank0/Page8 corresponds to the first logical address.

According to this, when the write count of the data of SCM0/Bank0/Page2 is increased by designating the first logical address at a high frequency by the CPU 10, the first logical address is designated by the CPU 10 at the same frequency but the data is written to SCM0/Bank0/Page8, by changing the correspondence between the logical address and the physical address and replacing the Pages. Increase in the write count of the data of SCM0/Bank0/Page2 can be therefore suppressed.

Incidentally, executing the wear leveling process in Page unit (i.e., replacing one Page with the other Page) has been described for convenience of descriptions. However, the unit of the wear leveling process may be a plurality of Pages.

Next, an example of the processing procedure of the wear leveling process will be described with reference to a flowchart of FIG. 17. For example, the wear leveling process may be executed at the above-described write process, after the write process, or at predetermined timing. The wear leveling process in the comparative example of the embodiment (i.e., the process illustrated in FIG. 17) is assumed to be executed after the write process. In addition, the wear leveling process executed (started) on the assumption that a sufficient area in an unused state exists in the buffer area illustrated in FIG. 8 and the buffer management table illustrated in FIG. 9. When the sufficient area does not exist, preparation of the sufficient area is awaited or the sufficient area is prepared by evicting and writing the data in the buffer to the SCM 32'. A patrol and refresh process to be described later will be executed in the same manner. In the embodiment to be described below, the processes will be executed in the same manner.

First, the control unit 312' determines two areas that are targets of the wear leveling process (hereinafter referred to as first and second wear leveling target areas) (step S71). Each of the first and second wear leveling target areas may be a single area (Page) or a plurality of areas (i.e., a plurality of Pages). The first and second wear leveling target areas can be determined by referring to, for example, the above-described write count management table. The first wear leveling target area determined in step S71 is the Page where, for example, the write count of data is large, and the second wear leveling target area is the Page where, for example, the write count of data is small.

When the first and second wear leveling target areas determined in step S71 are swapped, the data written to the first wear leveling target area and the data written to the second wear leveling target area also need to be swapped.

In this case, allocation of the entry of the second buffer management table is executed in the SCM controller 31' (step S72). Incidentally, the process of step S72 is a process corresponding to the processes of steps S21 to S25 illustrated in FIG. 12 and detailed descriptions are omitted.

Next, reading the data from the SCM 32' and the buffer management are executed in the SCM controller 31' (step S73). Incidentally, the process of step S73 is a process corresponding to the processes of steps S44 to S49 illustrated in FIG. 13 and detailed descriptions are omitted. The processes of steps S72 and S73 are executed for each of the first and second wear leveling target areas.

Next, the control unit 312' updates the address translation table (step S74). Incidentally, for example, the address translation table is stored in the SCM 32' as the system management information. However, when referring to the address translation table, the address translation table is transferred (cached) to, for example, the DRAM 33'. For this reason, in step S74, the address translation table is updated (changed) in the DRAM 33'. In this case, the control unit 312' acquires the logical address by referring to the metadata of the ECC frame composed of the data stored in the first wear leveling target area. Similarly, the control unit 312' acquires the logical address by referring to the metadata of the ECC frame composed of the data stored in the second wear leveling target area. The control unit 312' refers to the entry of the address translation table based on the acquired two logical addresses and swaps the physical addresses. That is, in step S74, the address translation table is updated such that the physical addresses associated with the respective first and second wear leveling target areas are swapped.

After the process of step S74 is executed, the processes of steps S75 and S76 corresponding to the processes of steps S50 and S51 illustrated in FIG. 13 are executed.

Incidentally, the above-described processes of steps S73, S75, and S76 correspond to the process of reading the data written to the two wear leveling target areas (i.e., first and second wear leveling target areas) from the SCM 32' and writing the data to the SCM 32'.

However, there are some cases where the latest data is buffered. In this case, the Read Modify Write process is executed as needed. Incidentally, as described in the non-volatilization process illustrated in FIG. 13, for example, when the data with the same logical address as that of the data written to the first wear leveling target area is written to the buffer 314', the data written to the buffer 314' (i.e., the latest data) is written to the second wear leveling target area. Similarly, for example, when the data having the logical address common to that of the data written to the second wear leveling target area is written to the buffer 314', the data written to the buffer 314' (i.e., the latest data) is written to the first wear leveling target area.

After the process of step S76 is executed, the control unit 312' writes the address translation table to the SCM 32' to non-volatilize the address translation table updated (changed) in the DRAM 33 in step S74 (step S77).

According to the above-described wear leveling process, for example, the physical address (Page) where the write count of being accessed in accordance with a specific logical address is large can be swapped for the physical address (Page) where the write count is small. Therefore, avoiding storage of further weariness to the physical address where the write count is large can be expected. In addition, as a result, extension of the product lifetime of the SCM module 30' can also be expected.

In addition, it is assumed that, for example, after the process of step S75 is executed, a new write command designating the same logical address with the wear leveling target area received from the CPU 10 is processed and then the process of step S76 is executed. In this case, the data designated in the new write command is stored in the buffer 314'. However, the data stored in the buffer 314' (latest data) is lost by executing the process of step S76. For this reason, the logical address to access the data stored in the wear leveling target area is managed in advance. When the write command in which the logical address is designated is received, the process of the write command is set to be awaited. More specifically, when the write command is received during the wear leveling process, the data designated in the write command is stored in the buffer 314' but the registration in the second buffer management table is awaited. According to this, registration to the second buffer management table can be executed after ending the wear leveling process, and losing the data designated in the write command by the process of step S76 can be avoided.

When the memory cell included in the specific Page of the SCM 32' where the data write is repeated at a high frequency as described above wears, the data written to the memory cell (Page) cannot be read correctly. Similarly, after the data is written to the SCM 32', the data cannot be read correctly when the SCM 32' is left for a long time in a state in which the data is written.

For this reason, in the comparative example of the embodiment, the data written to the Page can be read correctly by reading the data from the Page at predetermined timing and writing the data again to the same Page. This process is referred to as a patrol and refresh process.

An example of the processing procedure of the patrol and refresh process will be described below with reference to a flowchart of FIG. 18.

The patrol and refresh process is executed in the SCM module 30' at predetermined timing, for example, irrespective of the command (access request) from the CPU 10.

First, the control unit 312' determines Page that is the target of the patrol and refresh process (hereinafter referred to as patrol and refresh target Page) (step S81).

Next, processes of steps S82 to S85 are executed in the SCM controller 31'. The processes correspond to the processes of steps S72, S73, S75, and S76 illustrated in FIG. 17 and detailed descriptions are omitted.

Incidentally, the above processes of steps S82 to S85 correspond to the processes of reading the data written to the patrol and refresh target Page from the SCM 32' and writing the data to the SCM 32'. In the processes of steps S82 to S85, the Read Modify Write process is executed as needed.

Although omitted in FIG. 18, the patrol and refresh process is repeated until reading and rewriting the data for all Pages of the SCM 32' are completed. That is, when the process of step S85 is executed but the processes illustrated in FIG. 18 are not executed for all the Pages, the flow returns to step S81 and the processes are repeated. When the processes illustrated in FIG. 18 are repeated, the patrol and refresh target Pages may be sequentially determined from among, for example, Pages (physical addresses) of the SCM 32' in step S81. Incidentally, the patrol and refresh target Page may be determined to patrol all of the other system management information after sequentially patrolling the logical addresses.

In addition, it is assumed that, for example, after the process of step S84 is executed, a new write command designating the same logical address with the patrol and refresh target Page received from the CPU 10 is processed and then the process of step S85 is executed. In this case, the data designated in the new write command is stored in the buffer 314'. However, the data stored in the buffer 314' (latest data) is lost by executing the process of step S85. For this reason, the logical address to access the data stored in the patrol and refresh target Page is managed in advance. When the write command in which the logical address is designated is received, the process of the write command is set to be awaited. More specifically, when the write command is received during the patrol and refresh process, the data designated in the write command is stored in the buffer 314' but the registration in the second buffer management table is awaited. According to this, registration to the second buffer management table can be executed after ending the patrol and refresh process, and losing the data designated in the write command by the process of step 385 can be avoided.

Incidentally, the patrol and refresh process handles not only the area where the data designated by the CPU 10 in the write command is written, but also the area where the system management information is stored.

For example, the data designated in the write command is once stored in the buffer 314' and is written to the SCM 32' at predetermined timing of being non-volatilized as described above. Since the buffer 314' is a volatilized memory device, the data stored in the buffer 314' may be lost when the data is written to, for example, the buffer 314' and then the power loss to the SCM module 30' occurs.

For this reason, in the comparative example of the embodiment, to avoid losing the data stored in the buffer 314', when the power loss occurs, supply of the power from the battery 35' is started and a process of non-volatilizing the data stored in the buffer 314' (i.e., the data whose non-volatilization is incomplete) (hereinafter referred to as a power loss detection process) is set to be further executed.

An example of the processing procedure of the power loss detection process will be described below with reference to a flowchart of FIG. 19.

It is assumed that the power loss to the SCM module 30' (or the computer system 1) (i.e., an unexpected shutdown) occurs. In this case, the power loss detector 34' can detect the power loss.

For this reason, the control unit 312' discriminates whether the power loss occurs or not based on the detection result of the power loss detector 34' (step S91).

When it is discriminated that the power loss occurs (YES in step S91), the control unit 312' supplies the power from the battery 35' to the SCM module 30' (step S92). The SCM module 30' can continue the operation with the power from the battery 35'.

Next, the control unit 312' sets the SCM module 30' to a state of not receiving the command from the CPU 10 (command unreception state) (step S93).

After the process of step S93 is executed, a process of step S94 corresponding to the process of step S16 illustrated in FIG. 11 is executed. In the process of step S94, all the data stored in the buffer 314' are written to the SCM 32' (i.e., non-volatilized) while executing the Read Modify Write process as needed.

Next, the control unit 312' arranges the system management information that needs to be non-volatilized to form ECC frame (step S95). Incidentally, the system management information generated in step S95 includes, for example, the above-described write count management table and the like.

After the process of step S95 is executed, the control unit 312' writes the system management information generated in step S95 to the SCM 32' (step S96). Incidentally, the system management information is written to the SCM 32' after executing the ECC encoding process, similarly to the data from the CPU 10'. In addition, the physical address of the SCM 32' to which the system management information is written may be, for example, a fixed address or the like. After the process of step S96 is executed, the SCM module 30' is shut down.

According to the above power loss detection process, when the power loss occurs, all the data stored in the buffer 314' can be written to the SCM 32' (i.e., non-volatilized). Losing the data can be therefore avoided.

Incidentally, when it is discriminated in step S91 that the power loss does not occur (NO in step S91), the processes of steps S92 to S96 are not executed and the power loss detection process is ended.

FIG. 20 illustrates an outline of an operation of the SCM module 30' according to the above-described comparative example of the embodiment. In FIG. 20, a simpler configuration is illustrated for convenience as compared with FIG. 2.

In FIG. 20, it is illustrated that the SCM module 30' includes the SCM controller 31' connected to the CPU 10 via the CPU interface 311' and the SCM 32' connected to the SCM controller 31' via the SCM interface 319'. In addition, the SCM controller 31 includes the buffer 314' and the address translation table. In addition, a large number of data of the ECC frames illustrated in FIG. 6 are stored in the SCM 32'. It is illustrated in FIG. 20 that one of the ECC frames is composed of the four 64-byte data in which alignments starting with the logical address "@0x08" are arranged, metadata, and ECC parity.

As illustrated in FIG. 20, in the comparative example of the embodiment, for example, when the write command designating 64-byte data and the logical address (for example, "@0x09") is received from the CPU 10, the data is once stored (buffered) in the buffer 314' and then written to the SCM 32'. An expression "@0x numerical value" illustrated in FIG. 20 is indicative of the logical address designated in the command from the CPU 10 or the logical address of the data.

Incidentally, in the comparative example of the embodiment, the correspondences between the logical addresses and physical addresses are managed in the unit of 256 bytes. The four 64-byte data are arranged to form 256-byte alignment and are written to the SCM 32' as the ECC frame.

For this reason, when the 64-byte data stored in the buffer 314' is written to the SCM 32' as described above, it is necessary to perform Read Modify Write process, that is, read 256-byte data configuring the ECC frame from the SCM 32', execute the ECC decoding process, rewrite a part of the 256-byte data to the latest 64-byte data from the CPU 10, reconfigure the ECC frame (update the metadata and the ECC parity), and write the data to the SCM 32'.

According to this, for example, the Read Modify Write process is executed for the SCM 32' based on each of the write commands in which 64-byte data included in different ECC frames are designated, and the write performance (random write performance) for the SCM 32' is low.

Furthermore, when the Bank corresponding to the physical address (Page) inside the SCM 32' to which the data designated by CPU 10 is written is in the Busy state, it is required to stand by until the Bank becomes Ready state (i.e., the state transitions to the Ready state) and the write performance of the SCM module 30' is degraded.

In addition, when the power loss occurs in the comparative example of the embodiment, all the data stored in the buffer 314' need to be non-volatilized while the power is supplied from the battery 35'. Since the Read Modify Write process is executed in the non-volatilization, too, the time required for the non-volatilization becomes longer and much battery capacity needs to be reserved.

Thus, the SCM module 30 (memory system) according to the embodiment adopts a configuration of partitioning the memory area in the SCM 32 into a first memory area 32a and a second memory area 32b and dynamically changing the memory area which is to be the write destination and the write method of writing the data to the memory area as illustrated in FIG. 21.

More specifically, in the embodiment, the In-Place Update method is applied when the data is written to the first memory area 32a, and the Append Write method is applied when the data is written to the second memory area 32b. Incidentally, the In-Place Update method is a method of writing (overwriting) the data to a physical address associated with a logical address designated in the write command at the time when the data based on the write command are written to the first memory area 32a as described above. In contrast, the Append Write method is a method of writing (i.e., appending) the data to the physical address specified by the controller 31 as the data write destination, irrespective of the logical address designated in the write command at the time when the data based on the write command are written to the second memory area 32b. The Append Write method enables the data to be written to the SCM 32 (second memory area 32b) without executing the Read Modify Write process described in the comparative example of the embodiment.

Incidentally, although described later in detail, the data written to the second memory area 32b are written back to the first memory area 32a at the predetermined timing. Thus, a free area can be allocated in the second memory area 32b to prepare for subsequent write commands from the CPU 10.

In the embodiment, the above-described configuration attempts improving the write performance in the SCM module 30 (memory system).

Incidentally, as illustrated in FIG. 21, the ECC frame composed of the 256-byte data is written to the first memory area 32a, and the ECC frame composed of the 256-byte data (data formed by packing the four 64-byte data) is also written to the second memory area 32b. Differences between the data (ECC frames) written to the first memory area 32a and the second memory area 32b will be described later.

The SCM module 30 according to the embodiment will be described below in detail. First, FIG. 22 is the block diagram illustrating an example of a configuration of the SCM module 30 according to the embodiment.

Figure 22:
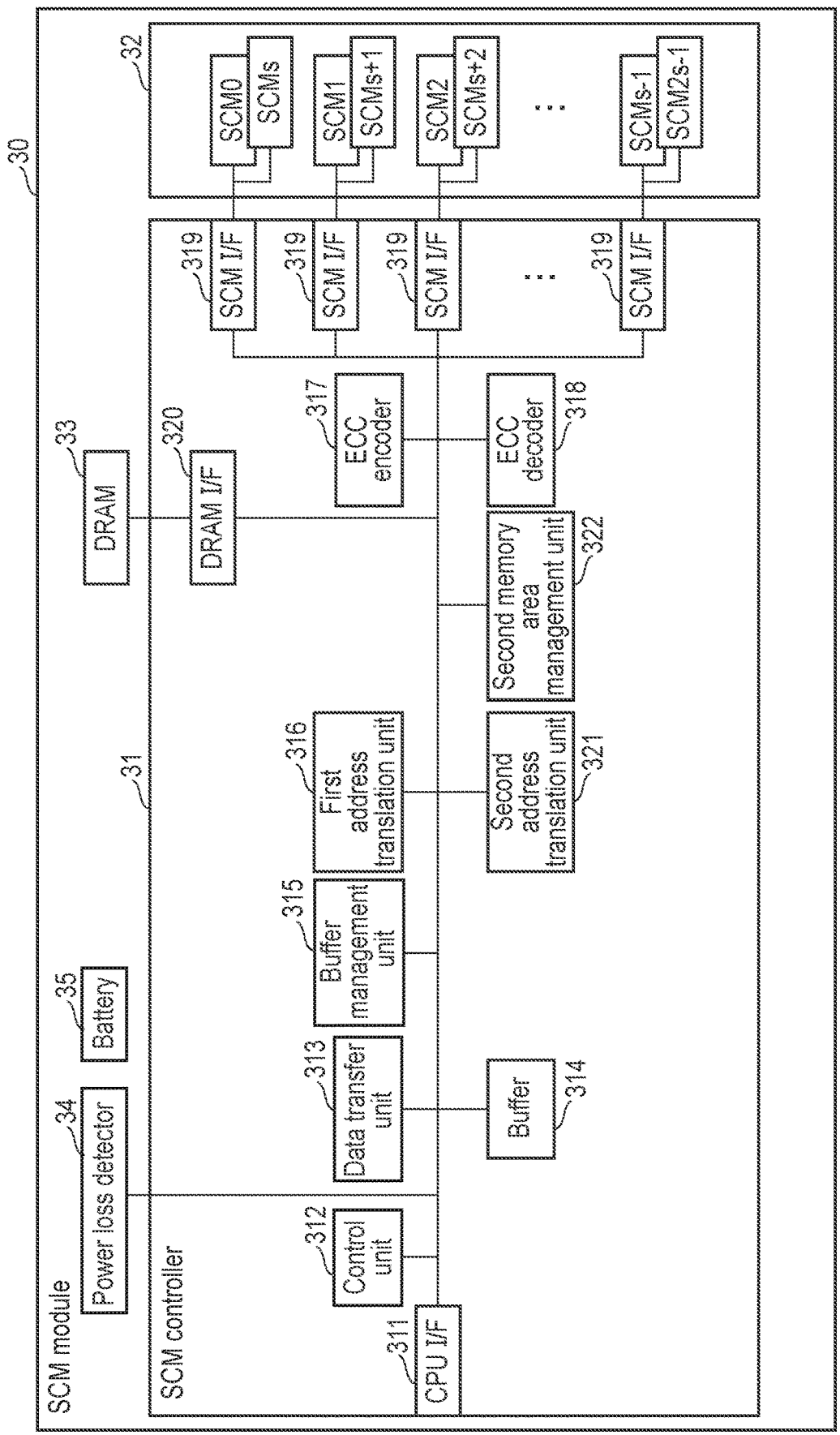
FIG. 22 is a block diagram illustrating an example of a configuration of the SCM module according to the embodiment.

As illustrated in FIG. 22, the SCM module 30 includes the SCM controller 31, the SCM 32, and the DRAM 33. The SCM controller 31, the SCM 32, and the DRAM 33 in the SCM module 30 correspond to the SCM controller 31', the SCM 32, and DRAM 33 illustrated in FIG. 2.

In addition, the SCM controller 31 includes a CPU interface (I/F) 311, a control unit 312, a data transfer unit 313, a buffer (area) 314, a buffer management unit 315, a first address translation unit 316, an ECC encoder 317, an ECC decoder 318, an SCM interface (I/F) 319, a DRAM interface (I/F) 320, a second address translation unit 321, and a second memory area management unit 322.

Incidentally, the CPU interface 311, the control unit 312, the data transfer unit 313, the buffer 314, the buffer management unit 315, the first address translation unit 316, the ECC encoder 317, the ECC decoder 318, the SCM interface 319, and the DRAM interface 320 in the SCM controller 31 respectively correspond to the CPU interface 311', the control unit 312', the data transfer unit 313', the buffer (area) 314', the buffer management unit 315', the address translation unit 316', the ECC encoder 317', the ECC decoder 318', the SCM interface 319', and the DRAM interface 320' in FIG. 2.

Detailed descriptions of the same portions as the SCM module 30' according to the above-described comparative example of the embodiment will be omitted and portions different from the SCM module 30' will be mainly described below.

Similar to the SCM controller 31' according to the comparative example of the embodiment, all or several parts of the function units in the SCM controller 31 according to the embodiment may be implemented by, for example, hardware, software, or a combination of hardware and software.

The first address translation unit 316 translates, for example, the logical address designated by the CPU 10 in the write command or the read command into the physical address within the first memory area by referring to the first address translation table. The SCM module 30 can access the first memory area 32a provided in the SCM 32 based on the physical address translated by the first address translation unit 316.

That is, in the embodiment, the correspondence between the logical address which the CPU 10 uses when accessing the SCM module 30 and the physical address in the first memory area 32a is managed by using the first address translation table.

The second address translation unit 321 translates, for example, the logical address designated by the CPU 10 in the write command or the read command into the physical address within the first memory area by referring to the second address translation table. The SCM module 30 can access the second memory area 32b provided in the SCM 32 based on the physical address translated by the second address translation unit 321.

That is, in the embodiment, the correspondence between the logical address which the CPU 10 uses when accessing the SCM module 30 and the physical address in the second memory area 32b is managed by using the second address translation table.

The second memory area management unit 322 manages a free area of the second memory area 32b provided in the SCM 32.

The SCM 32 of the embodiment is different from the SCM 32' of the comparative example of the embodiment from the viewpoint of including the first memory area 32a and the second memory area 32b (i.e., being partitioned into the first memory area 32a and the second memory area 32b).

Incidentally, in the above-described comparative example of the embodiment, it has been described that the correspondence between the logical address and the physical address in the address translation table is managed in 256-byte units. In the embodiment, the correspondence between the logical address and the physical address (i.e., the physical address in the first memory area 32a) in the first address translation table is managed in 256-byte units, similar to the above-described comparative example of the embodiment. In other words, the first memory area 32a is the memory area where the data is managed in the unit larger than the access unit (64 bytes) of the CPU 10 (i.e., the same memory area as the SCM 32' described in the comparative example of the embodiment).

In contrast, the correspondence between the logical address and the physical address (i.e., the physical address in the second memory area 32b) in the above-described second address translation table is managed in the 64-byte unit equal to the access unit of the CPU 10. In other words, the second memory area 32b is the memory area where the data is managed in the access unit (64 bytes) of the CPU 10.

In the comparative example of the embodiment, it has been described that the SCM module 30' may include the power loss detector 34' and the battery 35'. In the embodiment, the SCM module 30 is assumed to include a power loss detector 34 and a battery 35 corresponding to the power loss detector 34' and the battery 35'.

Figure 23:
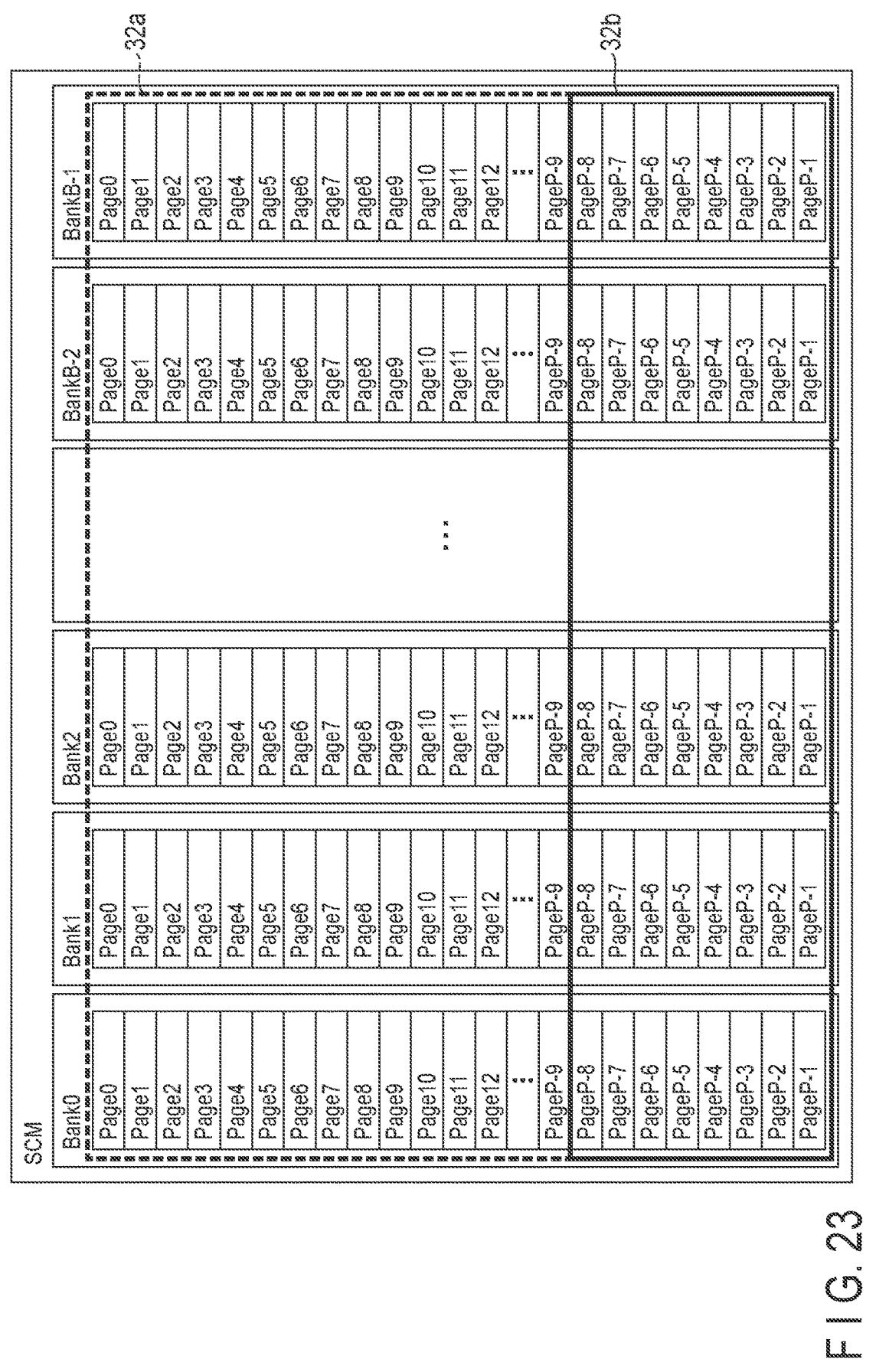

Next, an example of first and second memory areas within a SCM chip illustrated in FIG. 22 will be described with reference to FIG. 23. In FIG. 23, an internal structure of one of the SCM chips provided in the SCM 32 will be described. The other SCM chips have the same internal structure.

Similar to the above-described SCM 32', the SCM 32 includes Banks 0 to B−1. In addition, each of Banks 0 to B−1 provided in the SCM 32 is divided into P pages (Pages 0 to P−1).

The memory area included in the SCM 32 is divided into the first memory area 32a and the second memory area 32b as described above. In the example illustrated in FIG. 23, Pages 0 to P−9 of Banks 0 to B−1 are allocated to the first memory area 32a. In contrast, Pages P−8 to P−1 of Banks 0 to B−1 are allocated to the second memory area 32b.

The first memory area 32a and the second memory area 32b illustrated in FIG. 23 are mere examples. As described, since the correspondence between the logical address and the physical address in the first address translation table (i.e., the first memory area 32a) is managed in 256-byte units and the correspondence between the logical address and the physical address on the second address translation table (i.e., the second memory area 32b) is managed in 64-byte units, the second address translation table is larger in size than the first address translation table when the first memory area 32a and the second memory area 32b have substantially the same size. For this reason, in the embodiment, to suppress the second address table becoming large in size, for example, at least more storage areas than those of the second memory area 32b are allocated to the first memory area 32a.

Incidentally, in the embodiment, the first memory area 32a and the second memory area 32b are described on the assumption that the memory areas are fixed. However, the memory areas may be dynamically changed.

The free area of the above-described second memory area 32b is managed by the second memory area management unit 322. The management of the free area of the second memory area 32b will be described more specifically with reference to FIG. 24.

As described above, the data is appended to the second memory area 32b by the Append Write method. In the embodiment, the free area of the second memory area 32b is managed by the ring buffer method.

More specifically, the free area of the second memory area 32b is managed by using free area management information including a Head pointer 32c and Tail pointer 32d.

The Head pointer 32c points the area (the Page) where next data is to be written, of the free area of the second memory area 32b. Incidentally, the Head pointer 32c includes, for example, the Bank number and the Page number. When the data is written to the second memory area 32b, the Head pointer 32c is moved (updated) to indicate a Page where next data is to be written.

Figure 24:
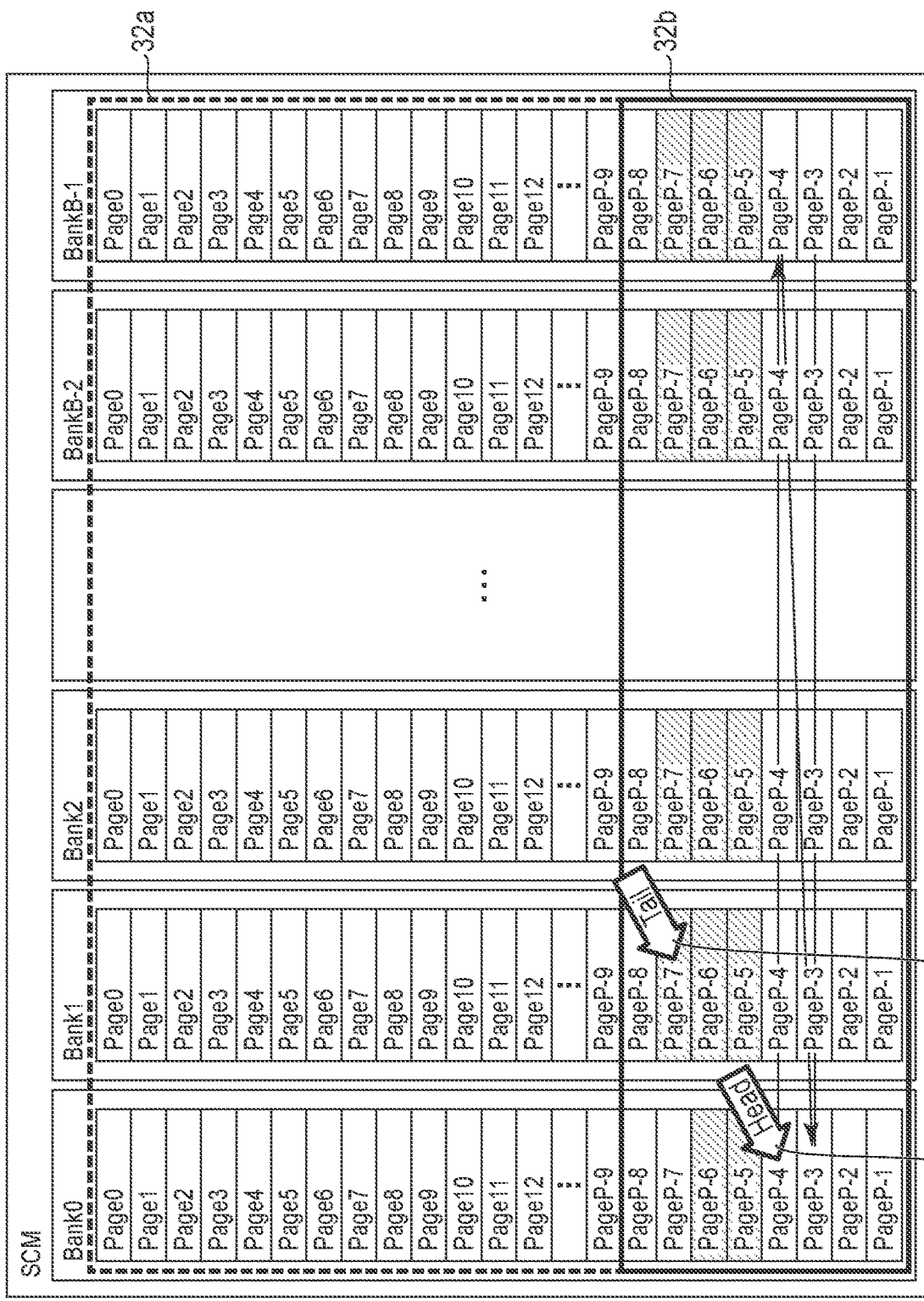
FIG. 24 is a diagram specifically illustrating management of a free area of a second memory area in the embodiment.

In this case, the Head pointer 32c is moved in a direction of crossing Banks similar to an arrow illustrated in FIG. 24. When data is written to (a Page of) the same Page number of all Banks, the Head pointer 32c returns to the initial Bank such that data is written to a next Page number. More specifically, as illustrated in FIG. 24, for example, the Head pointer 32c points Page P-4. When it is assumed that data is written to Page P-4 of the Bank 0, the Head pointer 32c is moved to Page P-4 of Bank 1. The Head pointer 32c is moved sequentially. For example, when the data is written to Page P-4 of Bank B-1, the Head pointer 32c is moved to Page P-3 of Bank 0.

Incidentally, for example, when the data is written to Page indicated by the Head pointer 32c and the Bank is in the Busy state, writing the data to the Page may be skipped and the data may be written to a Page to which the Head pointer 32c is to be moved next.

The data written to the second memory area 32b is written back to the first memory area 32a as described above. The Tail pointer 32d points an area (Page) where the data to be next written back to the first memory area 32a, of the data written to the second memory area 32b, is written. Incidentally, the Tail pointer 32d includes the Bank number and the Page number, similar to the Head pointer 32c.

When the data written to the second memory area 32b is written back to the first memory area 32a, the Tail pointer 32d is moved (updated) to point a Page where the data to be next written back to the first memory area 32a is written. Incidentally, the direction of movement of the Tail pointer 32d is the same as that of the Head pointer 32c. In addition, since the Tail pointer 32d is indicative of the Page where the data of the second memory area 32b is written, the Tail pointer 32d cannot overtake the Head pointer 32c. That is, when all the data written to the second memory area 32b are written back to the first memory area 32a, the Head pointer 32c and the Tail pointer 32d point the same Page.

According to the Head pointer 32c and the Tail pointer 32d, the free area of the second memory area 32b can be appropriately managed. In the example illustrated in FIG. 24, the Head pointer 32c points Page P-4 of Bank 0. In contrast, the Tail pointer 32d points Page P-7 of Bank 1. According to this, it can be recognized that in FIG. 24, Page represented by no hatching is a free area while an area represented by hatching is the area where valid data (i.e., the data to be written back to the first memory area 32a) is written.

Incidentally, in the SCM module 30 (SCM controller 31) according to the embodiment, (elements of the free area management information including) the Head pointer 32c and the Tail pointer 32d are set to be managed in, for example, the free area management table (ring buffer management table) illustrated in FIG. 25. The Head pointer 32c and the Tail pointer 32d are shared by, for example, SCM0 to SCMn illustrated in FIG. 7. Since the ECC frame is arranged over SCM0 to SCMn, the Head pointer 32c and the Tail pointer 32d move in the same manner in all the SCMs.

Next, the address translation tables used in the embodiment will be described. The first address translation table for managing the correspondence between the logical address and the physical address of the data written to the first memory area 32a has been described in the comparative example of the embodiment. Detailed descriptions are therefore omitted here. The second address translation table will be mainly described here.

FIG. 26 illustrates an example of the data structure of the second address translation table for managing the correspondence between the logical address and the physical address of the data written to the second memory area 32b. In the embodiment, a set associative management method is adopted for the management of the correspondence between the logical addresses and the physical addresses in the second address translation table.

In this case, the second address translation table includes a plurality of entries in association with indexes. Each of the plurality of entries includes Valid, a tag, and a physical address (SCM physical address). In the second address translation table, one 64-byte data can be managed with one entry (Valid, tag, and physical address).

Valid indicates whether the entry is valid or invalid. Incidentally, Valid "1" indicates that the entry (i.e., the correspondence between the logical address and the physical address) is valid and Valid "0" indicates that the entry is invalid.

It has been described that in the address translation table described above in the comparative example of the embodiment (i.e., the first address translation table), the higher-order bits of the logical address designated by the CPU 10 are used as the index. In the second address translation table, however, lower-order bits of the logical address designated by the CPU 10 are used as an index while the higher-order bits of the logical address are used as a tag as illustrated in FIG. 27.

In addition, the physical address stored in the first address translation table corresponds to the physical address at which 256-byte data is stored. However, since the physical address in the second address translation table needs to be indicative of the location where 64-byte data is stored, the physical address is an address larger by 2 bits than the physical address stored in the first address translation table.

In addition, the number of registrations is stored in association with the index, in the second address translation table. The number of registrations is indicative of the number of entries in which Valid associated with the index is "1".

The basic operation of the second address translation table will be described here. First, when 64-byte data is written to the second memory area 32b, the information of correspondence (relationship) between the logical address used when accessing the data and the physical address in the second memory area 32b where the data is written is registered in the second memory area 32b. Incidentally, when the data of the same logical address is written to the second memory area 32b, the correspondence information of the logical address and the physical address is updated.

In contrast, when the 64-byte data written to the second memory area 32b is invalidated, the corresponding entry is erased from the second address translation table. Incidentally, data invalidation is executed when the latest 64-byte data is written from the CPU 10 to the first memory area 32a and when the data is written back from the second memory area 32b to the first memory area 32a.

According to the second address translation table, for example, the logical address designated in the write command or the read command from the CPU 10 can be translated into the corresponding physical address.

More specifically, the index is referred to based on the lower-order bits of the logical address designated in the write command or the read command from the CPU 10. The tag registered in each of the plurality of entries associated with the index referred to is compared with the higher-order bits of the logical address. When the tag matching the higher-order bits of the logical address is present, hit is discriminated and the SCM physical address of the entry including the registered tag is acquired. Translation of the logical address into the physical address is thereby completed.

Incidentally, the second address translation table includes a plurality of entries for each index. When a large number of data are written for the logical address of a specific index, deviation occurs at the registration to the specific index in the second address translation table. There are cases where a new correspondence cannot be registered to the second address translation table, when the index is full (i.e., all Valids in the entries in the index are "1") due to the deviation among the indexes. To avoid this situation, a measure of increasing the number of entries in the second address translation table, increasing the number of indexes, or the like can be taken. It is assumed here that the number of indexes and the number of entries are fixed.

In addition, in the application programs run on the CPU 10, since the logical addresses close to the boundaries between memory areas allocated and managed by the operating system are frequently accessed, for example, entries of small indexes tend to be registered. For this reason, for example, the deviation among indexes which occurs in a case of merely using the lower-order bits of the logical address as the index may be solved by calculating a hash value of the logical address to refer the second address translation table using the lower-order bits of the hash value as the index and the higher-order bits of the hash value as the tag (i.e., managing the correspondence between the logical address and the physical address with the hash value). However, the hash values of different logical addresses calculated with the hash function mentioned above are required not to be collided each other. A case where the hash values of logical address "0x01" and "0x02" designated by the CPU 10 are both "0x03", is considered as an example. When the logical addresses "0x01" and "0x02" are translated into the physical addresses, different physical addresses should be acquired. However, since the hash values collide and the same entry in the second address translation table is referred to, the same physical address is acquired and an intended operation cannot be executed. That is, the logical address and the hash value calculated from the logical address need to have a one-on-one relationship. Methods of realizing the one-on-one relationship include, for example, a method of deriving the hash value by changing the bit sequence of the logical address, and the like.

Incidentally, for example, when the deviation among indexes can hardly be solved even with the above hash values, the data written to the physical address of the second memory area 32b registered to the entry associated with the index with the large number of registrations may be written back to the first memory area 32a with high priority.

In addition, the above-described second address translation table is stored in the SCM 32' and is non-volatilized. However, when referring to the second address translation table, the second address translation table is transferred (cached) in, for example, the DRAM 33. In this case, the second address translation table is updated in the DRAM 33 in accordance with, for example, writing data to the second memory area 32b. The updated second address translation table is written to the SCM 32 (i.e., non-volatilized) at predetermined timing, as the system management information.

The operation of the SCM module 30 according to the embodiment will be described below. Detailed descriptions of the same portions as the comparative example of the embodiment will be omitted and portions different from the comparative example of the embodiment will be mainly described below.

When the command is transmitted from the CPU 10, the process illustrated in FIG. 10 is executed in the SCM module 30. The write process and the read process executed in the SCM module 30 according to the embodiment will be described below in detail.

First, an example of the processing procedure of the write process will be described with reference to a flowchart of FIG. 28.

In the write process, processes of steps S101 to S105 corresponding to the processes of steps S11 to S15 illustrated in FIG. 11 are executed.

When it is discriminated that the data stored in the buffer 314 are non-volatilized (YES in step S105), the control unit 312 executes a process of selecting the write destination to which the data is to be written (hereinafter referred to as a write destination selection process) (step S106). Note that the process of step S106 is performed for each of the data stored in the buffer 314. In step S106, for example, one of the first memory area 32a (i.e., the memory area where data is managed in 256-byte units) and the second memory area 32b (i.e., the memory area where data is managed in 64-byte units) is selected as the data write destination, based on the internal state of the controller 31 or the state of the SCM 32.

Incidentally, the data is written to the first memory area 32a by the In-Place Update method while the data is written to the second memory area 32b by the Append Write method. Therefore, selecting the write destination in step S106 corresponds to selecting (determining) the data write method. Details of the write destination selection process will be described later.

Next, it is discriminated whether the second memory area 32b is selected in step S106 or not (step S107).

When it is discriminated that the second memory area 32b is selected (YES in step S107), a process of non-volatilizing the data stored in the buffer 314 for the second memory area 32b (i.e., a non-volatilization process for the second memory area 32b) is executed (step S108). Incidentally, details of the non-volatilization process for the second memory area 32b will be described later.

In contrast, when it is discriminated that the second memory area 32b is not selected (i.e., the first memory area 32a is selected) (NO in step S107), a process of non-volatilizing the data stored in the buffer 314 for the first memory area 32a (i.e., a non-volatilization process for the first memory area 32a) is executed (step S109). Incidentally, in step S109, the data is written to the second address translation table and the corresponding entry is invalidated.

Next, an example of the processing procedure of the above write destination selection process (i.e., the process of S106 illustrated in FIG. 28) will be described with reference to a flowchart of FIG. 29. In the write destination selection process, one of the first memory area 32a and the second memory area 32b is selected as the write destination in accordance with the state of the buffer 314, the state of the SCM 32, and the like.

First, the control unit 312 discriminates whether the data stored in the buffer 314 can be written to the second memory area 32b or not (step S111).

In step S111, for example, when a free area where the data can be written is not present in the second memory area 32b, the control unit 312 discriminates that the data cannot be written to the second memory area 32b. Incidentally, the free area of the second memory area 32b can be recognized based on the Head pointer 32c and the Tail pointer 32d managed in the above-described free area management table.

In addition, the correspondence between the logical address and the physical address in the second memory area 32b is managed in the second address translation table as described above. In step S111, when the data stored in the buffer 314 is written to the second memory area 32*b* but the correspondence between the logical address and the physical address of the data cannot be managed, for example, when a free entry is not present in the second address translation table, it may be discriminated that the data cannot be written to the second memory area 32*b*.

When it is discriminated that the data can be written to the second memory area 32*b* (YES in step S111), the control unit 312 selects the write destination, based on a plurality of predetermined conditions.

More specifically, the control unit 312 discriminates whether the first condition is satisfied or not (step S112).

As described above in the comparative example of the embodiment, the Read Modify Write process to make the data non-volatilized requires much time to write the data. For this reason, when the process of writing to the first memory area 32*a* is executed in a situation that the write commands are issued by the CPU 10 at high frequency (the number of write commands is increased), much time is spent for the Read Modify Write process and the write commands can hardly be processed efficiently.

Thus, in the embodiment, a first condition for selecting the write destination implies that when the Read Modify Write process is executed to write the data to the first memory area 32*a*, generation frequency of the write commands (i.e., write access frequency from the CPU 10) is so high that the write commands cannot be processed efficiently.

Incidentally, whether the Read Modify Write process is necessary or not can be discriminated by executing the process corresponding to step S43 illustrated in FIG. 13. In addition, "generation frequency of the write commands is so high" indicates that the number of write commands issued within a predetermined time is more than or equal to a predetermined value.

When it is discriminated that the first condition is satisfied (YES in step S112), the control unit 312 selects the second memory area 32*b* as the write destination of the data stored in the buffer 314 (i.e., selects the Append Write method as the write method) (step S113).

When it is discriminated that the number of times of generation of the write commands is smaller than a predetermined value and that the first condition is not satisfied (NO in step S112), the control unit 312 discriminates whether the second condition is satisfied or not (step S114).

When the data stored in the buffer 314 are to be written to the first memory area 32*a* but the Bank corresponding to the physical address in the first memory area 32*a* to which the data is to be written is in the Busy state, standing by is required until the Busy state is solved (i.e., the state transitions to the Ready state) and high-speed write process cannot be executed (i.e., the write performance is lowered).

For this reason, in the embodiment, the second condition for selecting the write destination implies that the Bank corresponding to the physical address in the first memory area 32*a* corresponding to the logical address to access the data stored in the buffer 314 is in the Busy state.

When it is discriminated that the second condition is satisfied (YES in step S114), the above-described process of step S113 is executed (i.e., the second memory area 32*b* is selected as the write destination).

When it is discriminated that the second condition is not satisfied (NO in step S114), the control unit 312 discriminates whether the third condition is satisfied or not (step S115).

As described above, for example, when the same logical address is designated in the write commands from the CPU 10 frequently, and the data is written to the physical address corresponding to the logical address frequently, the memory cells at the physical address in the first memory area 32*a* wear.

For this reason, in the embodiment, the third condition for selecting the write destination implies that the data stored in the buffer 314 are the data (Hot data) frequently written in the near past.

Incidentally, in step S115, the third condition is discriminated to be satisfied on the assumption that, for example, when the correspondence between the logical address for accessing the data stored in the buffer 314 and the physical address is stored in the second address translation table, the data accessed with the logical address are written in the near past.

When it is discriminated that the third condition is satisfied (YES in step S115), the above-described process of step S113 is executed (i.e., the second memory area 32*b* is selected as the write destination).

The reason for referring to the second address translation table to discriminate whether the above third condition is satisfied or not is that the writeback process of the data from the second memory area 32*b* to the first memory area 32*a* is executed after a quite long time when the data is once written to the second memory area 32*b*, and until the data is written back, the correspondence between the logical address and the physical address registered to the second address translation table is maintained.

When it is discriminated that the third condition is not satisfied (NO in step S115), the control unit 312 discriminates whether the fourth condition is satisfied or not (step S116).

The first address translation table is stored in the SCM 32 as the system management information in the SCM module 30 according to the embodiment. However, a part of the first address translation table (i.e., the correspondence between the logical address and the physical address) may be cached in, for example, the DRAM 33 or the like in accordance with the logical address designated in the write command or the read command. In this case, when the correspondence between the logical address for accessing the data stored in the buffer 314 and the physical address is cached (i.e., cache hit occurs), the logical address can be translated into the physical address with short latency by referring to the cached correspondence (i.e., a part of the first address translation table). However, when the correspondence between the logical address for accessing the data stored in the buffer 314 and the physical address is not cached (i.e., cache miss occurs), the first address translation table needs to be read from the SCM 32 to translate the logical address into the physical address (i.e., a refilling process is required) and the write performance is lowered.

For this reason, in the embodiment, the fourth condition for selecting the write destination implies that cache miss occurs for the logical address for accessing the data stored in the buffer 314 (i.e., the correspondence between the logical address and the physical address is not cached).

When it is discriminated that the fourth condition is satisfied (YES in step S116), the above-described process of step S113 is executed (i.e., the second memory area 32*b* is selected as the write destination).

When it is discriminated that the fourth condition is not satisfied (NO in step S116), the control unit 312 selects the first memory area 32*a* as the write destination of the data stored in the buffer 314 (i.e., selects the In-Place Update method as the write method) (step S117).

In the above-described write destination selection process, when at least one of the first to the fourth conditions is satisfied, the second memory area 32b is selected as the write destination.

Figure 29:
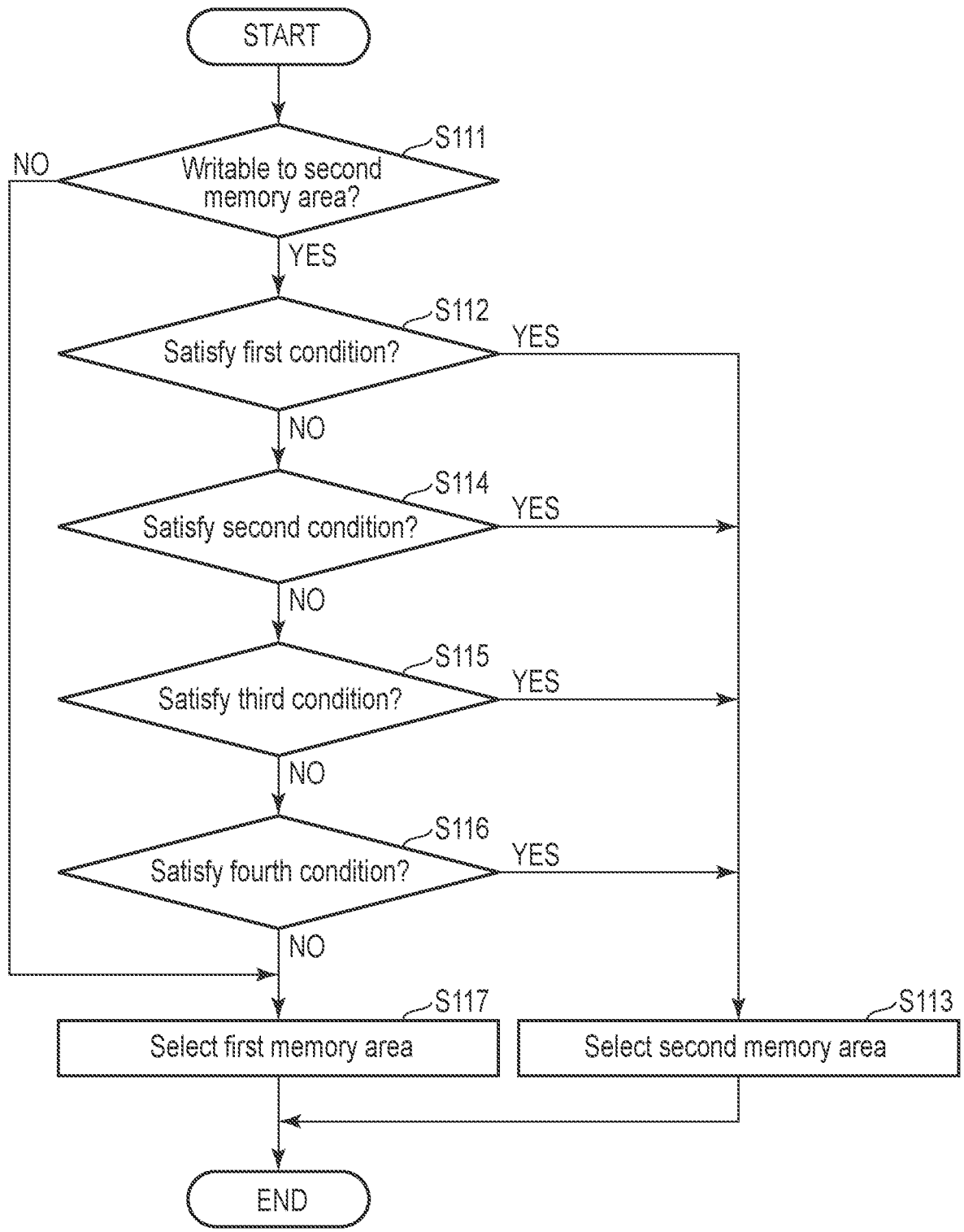
FIG. 29 is a flowchart illustrating an example of a processing procedure of a write destination selection process in the embodiment.

Incidentally, the process illustrated in FIG. 29 may be executed for all the data stored in the buffer 314 or may be executed for only several parts of the data.

In addition, in the example illustrated in FIG. 29, the first to the fourth conditions have been described as the conditions for selecting the write destination. However, at least one of the first to the fourth conditions may be used or the write destination may be selected under a condition other than the first to the fourth conditions. More specifically, for example, when the data stored in the buffer 314 are to be written to the first memory area 32a and the condition that the Read Modify Write process is required is satisfied, the second memory area 32b may be selected as the write destination. In addition, even when the Read Modify Write process is required but the first condition is not satisfied (occurrence frequency of the write commands is not high and high performance for the write commands is not required), the first memory area 32a may be selected as the write destination.

In addition, in the example illustrated in FIG. 29, it has been described that the second memory area 32b is selected as the write destination when at least one of the first to the fourth conditions is satisfied. For example, however, when two or more of the first to the fourth conditions are satisfied, the second memory area 32b may be selected as the write destination. That is, in the embodiment, the write destination may be discriminated by appropriately combining the first to the fourth conditions.

Next, an example of the processing procedure of the non-volatilization process for the second memory area 32b (i.e., the process of S108 illustrated in FIG. 28) will be described with reference to a flowchart of FIG. 30.

First, the buffer management unit 315 selects the data to be non-volatilized (i.e., non-volatilization target data) by referring to the second buffer management table (step S121).

Incidentally, in step S121, for example, the buffer management unit 315 can select the data first stored in the buffer 314 (i.e., the oldest data), of the data stored in the buffer 314, as the non-volatilization target data.

In addition, in step S121, when there is the entry in which the four of the 64-byte data is already buffered, 64-byte data that corresponds to a part of the 256-byte data may be selected as the non-volatilization target data.

Incidentally, in step S121, it is assumed that four 64-byte data are selected as the non-volatilization target data. When the four 64-byte data cannot be selected as the non-volatilization target data (for example, the four 64-byte data cannot be arranged), one of the four 64-byte data may be free data (for example, data in which all bits are 0).

Next, the control unit 312 non-volatilizes the non-volatilization target data selected in step S121 (step S122).

The process of step S122 will be specifically described below. In step S122, the control unit 312 determines (derives) the physical address (Page) in the second memory area 32b to which the non-volatilization target data is written, based on the Head pointer 32c managed in the above ring buffer management table.

Next, the control unit 312 packs the non-volatilization target data (i.e., the four 64-byte data) as (data of) 256 bytes.

The control unit 312 writes the 256-byte data in which the four 64-byte data are packed to the second memory area 32b provided in the SCM 32, with the physical address in the second memory area 32b determined based on the Head pointer 32c as described above.

In this case, the data is written to the SCM via the SCM interface 319. The data is subjected to ECC encoding process by the ECC encoder 317 and transferred from the buffer to (the second memory area 32b provided in) the SCM 32 by the data transfer unit 313, under control of the control unit 312.

As illustrated in FIG. 21, the metadata and the ECC parity are allocated to the 256-byte data written to the second memory area 32b. The ECC frame having the same data structure as the ECC frame described in the comparative example of the embodiment is written to the second memory area 32b.

However, the four 64-byte data included in the 256-byte data configuring the ECC frame described in the comparative example of the embodiment need to be the data accessed with the four contiguous logical addresses. Since the data is managed in 64-byte units in the second memory area 32b of the embodiment and the data is written by the Append Write method, the logical addresses for accessing each of 256-byte data configuring the ECC frame written to the second memory area 32b need not to be contiguous.

That is, when the data is written to the second memory area 32b in the embodiment, any four 64-byte data can be packed and appended to the second memory area 32b after adding the metadata and the ECC parity to the data, without depending on the logical address. Therefore, the write performance can be improved as compared with a case of writing to the first memory area 32a (i.e., executing the Read Modify Write process).

After the process of step S122 is executed, the second address translation table is updated (step S123).

In this case, it is discriminated whether, for example, the correspondence between the logical address for accessing the non-volatilization target data written to the SCM 32 and the physical address is already managed in the second address translation table (i.e., the logical address is hit in the second address translation table) or not.

When it is discriminated that the correspondence between the logical address for accessing the non-volatilization target data and the physical address is already managed in the second address translation table, the control unit 312 updates the physical address, which is already registered in the second address translation table, to the physical address to which the non-volatilization target data selected at S121 is written.

In contrast, when it is discriminated that the correspondence between the logical address for accessing the non-volatilization target data and the physical address is not managed in the second address translation table, the control unit 312 assigns the entry included in the second address translation table, based on the lower-order bits (index) of the logical address. The control unit 312 sets Valid included in the assigned entry to "1", sets the higher-order bits of the logical address to the tag included in the entry, and sets the physical address where the non-volatilization target data is written to the physical address included in the entry. When the latest 64-byte data is stored in the second memory area 32b, the correspondence between the logical address and the physical address is registered in the second address translation table. In other words, it can be recognized that the latest 64-byte data is stored in the second memory area 32b, by referring to the second address translation table. In addition, when the latest 64-byte data is stored in the second memory area 32b, the second address translation table manages the latest correspondence between the logical address and the physical address.

Incidentally, after the process of step S123 is executed, the control unit 312 appends (stores) a log on the second address translation table update (hereinafter referred to as a table update log) to a predetermined area in the SCM controller 31 (hereinafter referred to as a table update log area). The table update log includes, for example, the correspondence between the logical address and the physical address, and a flag (invalidation flag) indicating whether the correspondence is valid or invalid.

After the process of step S123 is executed, a process of step S124 corresponding to the above-described process of step S51 illustrated in FIG. 13 is executed. Incidentally, since any four 64-byte data buffered are the non-volatilization target data, one or more entries of the second buffer management table are freed in step S124.

Next, the second memory area management unit 322 updates the above-described free area management information (step S125). In this case, the second memory area management unit 322 updates the Head pointer 32c managed in the free area management table to indicate a Page next to the Page where the non-volatilized data is written (i.e., a Page where the data is to be next written in the order of writing the data in the above-described second memory area 32b).

The control unit 312 discriminates whether the data written to the second memory area 32b are to be written back to the first memory area 32a or not (step S126).

In step S126, for example, when (the capacity of) the free area of the second memory area 32b is smaller than the predetermined value, it is discriminated that the data written to the second memory area 32b are to be written back to the first memory area 32a. Incidentally, the free area of the second memory area 32b can be specified based on the free area management information (Head pointer 32c and Tail pointer 32d) managed in the above-described free area management table.

When it is discriminated that the data written to the second memory area 32b are to be written back to the first memory area 32a, the writeback process of the data is executed (step S127).

Figure 30:
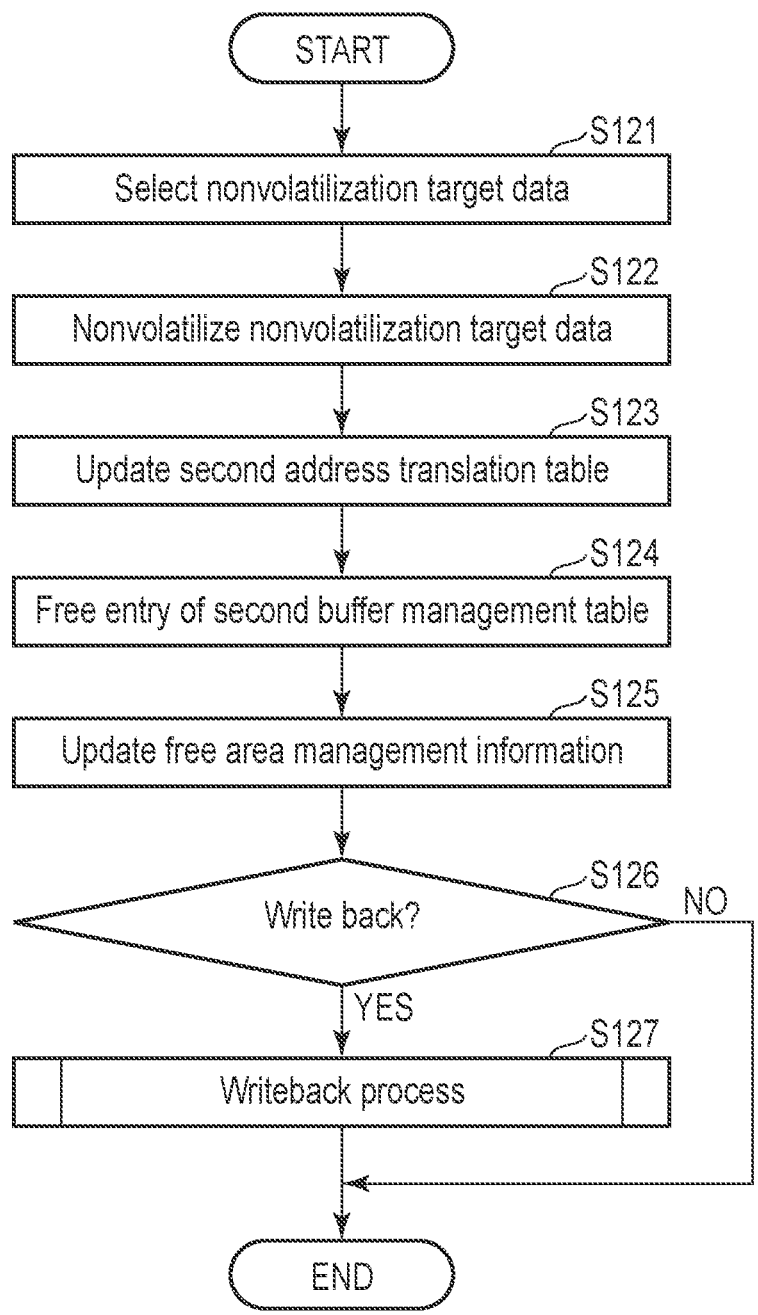
FIG. 30 is a flowchart illustrating an example of a processing procedure of a non-volatilization process in the second memory area in the embodiment.

In contrast, when it is discriminated that the data written to the second memory area 32b are not to be written back to the first memory area 32a, the process of step S127 is not executed and the processes of FIG. 30 are ended.

Next, an example of the processing procedure of the above writeback process (i.e., the process of S127 illustrated in FIG. 30) will be described with reference to a flowchart of FIG. 31.

In the writeback process, for example, 64-byte data written to the second memory area 32b (i.e., the memory area where the data is managed in 64-byte units) is written back to the first memory area 32a (i.e., the memory area where the data is managed in the 256-byte unit). In this case, the Read Modify Write process is executed for the data written back by considering that the data (192-byte data) other than the 64-byte data to be written back to the first memory area 32a of the 256-byte data managed in the first memory area 32a are written to the first memory area 32a, the second memory area 32b, or the buffer 314.

First, the control unit 312 determines the data (hereinafter referred to as writeback target data) to be written back from the second memory area 32b to the first memory area 32a, of the data written to the second memory area 32b (step S131).

The writeback target data is the 256-byte data configuring the same ECC frame written to the second memory area 32b, and is determined based on the Tail pointer 32d included in the free area management information managed in the above-described free area management table.

In addition, when deviation occurs in the registration in the second address translation table illustrated in FIG. 26, the index having a larger number of registrations (i.e., the number of entries) may be selected with high priority as the writeback target data. More specifically, one entry of the index having a larger number of registrations is selected in the second address translation table, and the data managed in the entry is determined as the writeback target data. In this case, the Tail pointer 32d does not need to be updated.

Incidentally, the writeback target data determined in step S131 may be the data of 256 bytes or more. In this case, the 64-byte data indicated by the current Tail pointer 32d is moved, the Tail pointer 32d is made to advance, and a free space is formed in the second memory area.

Next, the buffer management unit 315 allocates the buffer area to the writeback target data (256-byte data) determined in step S131 (step S132).

Incidentally, the process of allocating the buffer area is the same as the above-described process in step S11 illustrated in FIG. 11 and detailed descriptions are omitted.

After the process of step S132 is executed, the control unit 312 reads the writeback target data determined in step S131 from the second memory area 32b (step S133). Incidentally, the process of step S133 is a process corresponding to the above-described process of step S45 illustrated in FIG. 13 and detailed descriptions are omitted.

The writeback target data read from the second memory area 32b in step S133 is stored in the buffer area allocated in step S132.

The processes following step S134 described below are executed for each 64-byte data included in the writeback target data determined in step S131 (i.e., the writeback target data read from the second memory area 32b in step S133). In the following descriptions, the 64-byte data for which the processes following step S134 are executed is referred to as writeback target 64-byte data.

It is assumed here that, for example, 64-byte first data accessed with a specific logical address is written to a first physical address in the second memory area 32b and then 64-byte second data accessed with the specific logical address is written to a second physical address in the second memory area 32b.

In this case, when the first data written to the first physical address is assumed to be the writeback target 64-byte data, the first data is not the latest data to be accessed with the specific logical address (i.e., the first data is not valid but the second data is valid data), and the first data therefore does not need to be written back to the first memory area 32a.

Thus, in the embodiment, to discriminate the validity of the first data, a log (hereinafter referred to as a write log) indicating that the first data is written to the second memory area 32b is prepared when the first data (non-volatilization target data) is non-volatilized for the second memory area 32b in step S122 illustrated in FIG. 30.

The write log includes, for example, the physical address in the second memory area 32b where the first data is written and the logical address for accessing the first data, and is written to the second memory area 32b as the metadata configuring the above-described ECC frame.

In the embodiment, a process (validity discrimination process) of discriminating the validity of the writeback target 64-byte data is executed based on the write log written to the second memory area 32b as the metadata (step S134).

The validity discrimination process executed in step S134 will be described below. First, the control unit 312 acquires the write log (metadata) from the ECC frame composed of the 256-byte data including the writeback target 64-byte data. Incidentally, the write log includes the physical address where the writeback target 64-byte data is written and the logical address for accessing the writeback target 64-byte data.

Next, the second address translation unit 321 translates the logical address for accessing the writeback target data (i.e., the logical address included in the write log) into the physical address by referring to the second address translation table.

The control unit 312 compares the physical address included in the write log with the physical log translated from the logical address by referring to the second address translation table, and discriminates that the writeback target 64-byte data is valid when both of the physical address match. In contrast, when the physical address included in the write log does not match the physical address translated from the logical address by referring to the second address translation table, the control unit 312 discriminates that the writeback target 64-byte data is not valid (i.e., invalid).

Incidentally, when it is discriminated in the above validity discrimination process that the writeback target 64-byte data is valid but that the correspondence (entry) between the logical address for accessing the writeback target 64-byte data and the physical address is invalidated in the second address translation table, it is discriminated that the writeback target 64-byte data is not valid. The expression that "the correspondence between the logical address and the physical address is invalidated" indicates that "0" is set to Valid included in the entry in the second address translation table, which is associated with the lower-order bits (index) of the logical address and which includes the higher-order bits of the logical address.

A concrete example of the validity discrimination process will be described below. First, it is assumed here that the first data (64-byte data) of the logical address=0x1000 is written to the physical address=0xA000 in the second memory area 32b. In this case, the correspondence between the logical address "0x1000" and the physical address "0xA000" is stored in the second address translation table. Furthermore, when the 256-byte data including the first data as described above is written to the second memory area 32b as the ECC frame, the write log including the physical address "0xA000" and the logical address "0x100" is added to the 256-byte data as the metadata.

Next, it is assumed that the second data (64-byte data) of the logical address=0x1000 is written to the physical address=0xB000 in the second memory area 32b. In this case, in the second address translation table, the physical address corresponding to the logical address "0x1000" is changed (updated) from "0xA000" to "0xB000". Furthermore, when the 256-byte data including the second data is written to the second memory area 32b as the ECC frame, the write log including the physical address "0xB000" and the logical address "0x1000" is added to the 256-byte data as the metadata.

In this case, when the first data previously written to the second memory area 32b is assumed to be the writeback target 64-byte data which is selected in step S131 of FIG. 31, the write log is acquired from the ECC frame composed of 256-byte data including the first data. The write log includes the physical address "0xA000" and the logical address "0x1000". In addition, the physical address corresponding to the logical address "0x1000" included in the write log is acquired from the second address translation table. Since the physical address is updated, "0xB000" is acquired as the physical address.

In this case, the physical address "0xA000" included in the write log does not match the physical address "0xB000" acquired from the second address translation table. According to this, it is discriminated that the first data which is the writeback target 64-byte data is not valid.

In contrast, when the second data is the writeback target 64-byte data, the write log is acquired from the ECC frame composed of 256-byte data including the second data. The write log includes the physical address "0xB000" and the logical address "0x1000". In addition, "0xB000" is acquired from the second address translation table as the physical address corresponding to the logical address "0x1000" included in the write log.

In this case, the physical address "0xB000" included in the write log matches the physical address "0xB000" acquired from the second address translation table. According to this, it is discriminated that the second data which is the writeback target 64-byte data is valid.

Next, it is discriminated whether the result of the validity discrimination process executed in step S134 is valid or not (step S135).

When it is discriminated that the result of the validity discrimination process is valid (YES in step S135), the processes of steps S136 to S138 corresponding to the above-described processes of steps S72, S73, and S75 illustrated in FIG. 17 are executed.

Next, the control unit 312 invalidates the entry of the second address translation table (step S139). In step S138, the entry which is associated with the index, i.e., lower-order bits of the logical address for accessing the writeback target 64-byte data and which includes the higher-order bits of the logical address as the tag is searched from the second address translation table, and "0" is set to Valid included in the found entry.

After the process of step S139 is executed, a process of step S140 corresponding to the process of step S51 illustrated in FIG. 13 (or step S76 illustrated in FIG. 17) is executed.

Incidentally, the above-described processes of steps S137 to S138 and S140 correspond to the Read Modify Write process of writing (writing back) the writeback target 64-byte data written to the second memory area 32b to the first memory area 32a.

In contrast, when it is discriminated in step S135 that the result of the validity discrimination process is not valid (NO in step S135), the buffer management unit 315 frees the buffer area where the writeback target 64-byte data is stored (step S141).

When the above-described processes of steps S134 to S141 are executed for each of the 64-byte data included in the writeback target data determined in step S131, the second memory area management unit 322 updates the free area management information (step S142). In this case, the second memory area management unit 322 updates the Tail pointer 32d managed in the free area management table to indicate a Page next to the Page where the writeback target data is written (i.e., a Page where data is to be next written in the order of writing back the data written in the above-described second memory area 32b).

Note that the process shown in FIG. 31 may be performed when the load of the SCM module 30 (for example, the frequency of the write command or the read command) is low.

The non-volatilization process of the second memory area 32b illustrated in FIG. 28 has been described in detail with reference to FIG. 30 and FIG. 31. When it is discriminated in step S107 illustrated in FIG. 28 that the second memory area 32b is not selected, the non-volatilization process of the first memory area 32a is executed. The non-volatilization process for the first memory area 32a is the same process as the non-volatilization process in the comparative example of the embodiment as described above (i.e., the process of step S16 illustrated in FIG. 11). However, for example, when the data (non-volatilization target data) stored in the buffer 314 is non-volatilized for the first memory area 32a and the correspondence between the logical address for accessing the non-volatilization target data and the physical address is managed in the second address translation table, the process of invalidating the correspondence (entry) is further executed in the non-volatilization process for the first memory area 32a.

In this case, it is discriminated whether the correspondence between the logical address for accessing the non-volatilization target data and the physical address is managed in the second address translation table (i.e., the logical address is hit in the second address translation table) or not.

When it is discriminated that the correspondence between the logical address for accessing the non-volatilization target data and the physical address is already managed in the second address translation table, "0" is set to Valid included in the entry.

By invalidating the correspondence between the logical address for accessing the non-volatilization target data and the physical address, in the second address translation table, the logical address designated in the read command, which is transmitted from, for example, the CPU 10, can be translated not into the physical address where the old data is stored, but into the physical address where the latest data is stored.

Furthermore, after the latest data from the CPU 10 (i.e., the data stored in the buffer 314) are written to the first memory area 32a, it is possible to avoid the data being overwritten with the old data written in the second memory area 32b, when the data in the second memory area 32b is written back to the first memory area 32a.

More specifically, when the non-volatilization target data is written to the first memory area 32a in the non-volatilization process for the first memory area 32a, there are some cases where the Read Modify Write process is executed. In this case, the 64-byte data (the latest data) which belongs to the same ECC frame in the first memory as the non-volatilization target data may be already written to the second memory area 32b.

For this reason, when the Read Modify Write process is executed in the non-volatilization process for the first memory area 32a, it is necessary to refer to the second address translation table. Thus, when the logical address used to access the 64-byte data which belongs to the same ECC frame as the non-volatilization target data is hit in the second address translation table, the 64-byte data is acquired from the second memory area 32b with the physical address corresponding to the logical address managed in the second address translation table, and the ECC frame composed of the 64-byte data and the non-volatilization target data is written to the first memory area 32a. In this case, the correspondence between the logical address used to access the 64-byte data written to the first memory area 32a and the physical address is invalidated in the second address translation table.

The second address translation table is updated when the non-volatilization process for the second memory area 32b is executed (i.e., the data is written to the second memory area 32b) as described above. The second address translation table is cached in, for example, the DRAM 33, and the second address translation table update is executed in the DRAM 33. In this case, since the DRAM 33 is a volatile memory, the second address translation table updated in the DRAM 33 needs to be non-volatilized (i.e., written to the SCM 32) at predetermined timing to maintain the state in which the 64-byte data in the second memory area 32b is managed, even after the SCM module is rebooted.

Figure 32:
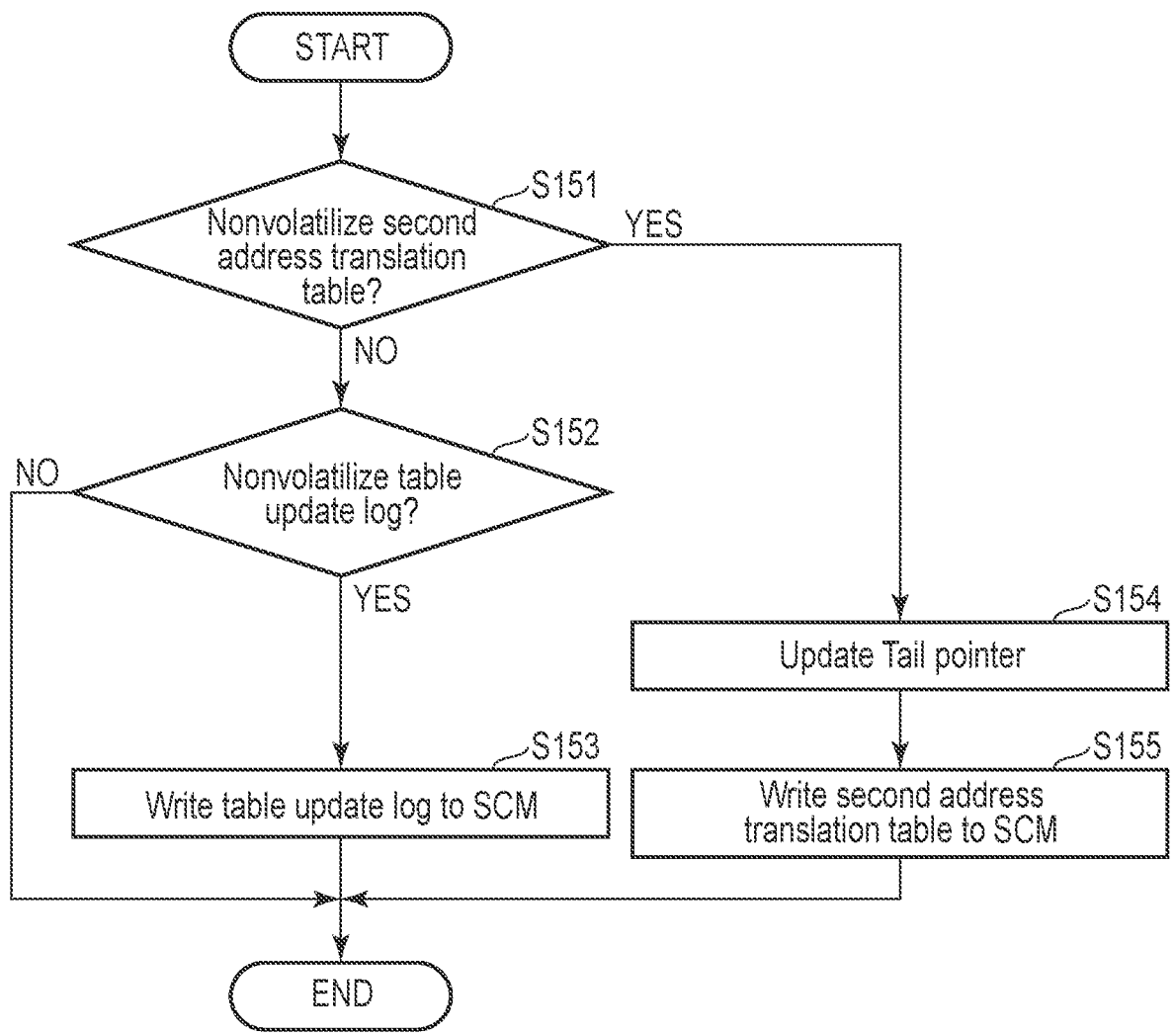
FIG. 32 is a flowchart illustrating an example of a processing procedure of a process of non-volatilizing the second address translation table in the embodiment.

An example of a processing procedure of the process of non-volatilizing the second address translation table will be described below with reference to a flowchart of FIG. 32. The process illustrated in FIG. 32 is executed at predetermined timing.

As the capacity of the second memory area 32b increases, the size of the second address translation table becomes large, and when the second address translation table is non-volatilized frequently, the performance of the SCM module 32' is degraded. However, when the non-volatilization frequency of the second address translation table is lowered to reduce the influence from the non-volatilization of the second address translation table in the SCM module 30 (i.e., to maintain the performance of the SCM module 30), the battery capacity required when, for example, power loss occurs is increased.

Thus, in the embodiment, when the above-described second address translation table is updated, the table update log is appended (stored) in the table update log area and the table update log is used for non-volatilization of the second address translation table.

Incidentally, the table update log includes the correspondence between the logical address and the physical address, and the invalidation flag as illustrated in FIG. 33. The table update log is written to area in the SCM 32. The physical address for the table update log area for writing the table update logs may be, for example, fixed. The table update log is managed by the ring buffer method in the SCM 32, and is appended to the buffer. The table update log is first stored in the buffer provided in the SCM controller 31 and written to the ring buffer in the SCM 32. Such a table update log is managed with the Head pointer indicative of the entry to which a table update log is next appended.

When the second address translation table is non-volatilized, all the table update logs in the ring buffer are unnecessary (i.e., discarded). Therefore, when the table update logs are discarded, the table update log may be written to the starting area of the ring buffer. For this reason, the Tail pointer for management of the table update log is not definitely necessary. In this case, however, since the starting area of the ring buffer wears (i.e., deviation occurs in weariness), the Tail pointer may be used to avoid the deviation of the weariness.

In the embodiment, the table update log is managed with the Head pointer and the Tail pointer described above. That is, in the embodiment, the difference (information) from the non-volatilized second address translation table can be recognized by referring to the table update log managed by the Head pointer and the Tail pointer. Incidentally, for example, when the entire portion of the second address translation table is non-volatilized, the difference (information) may be wholly discarded.

First, the control unit 312 discriminates whether the second address translation table is non-volatilized or not (step S151). In step S151, for example, when the number of times of the second address translation table update is more than or equal to a predetermined number after the second address translation table is non-volatilized, it is discriminated that the second address translation table is non-volatilized. Incidentally, the number of times of the second address translation table update can be specified by referring to the above-described table update log. The process of step S151 may be executed based on, for example, the number of entries updated (i.e., number of updated entries) in the second address translation table.

When it is determined that the second address translation table is not non-volatilized (NO in step S151), the control unit 312 discriminates whether the table update log is non-volatilized or not (step S152). In step S152, when a predetermined amount (for example, 256-byte) of the table update log is stored, it is discriminated that the table update logs are non-volatilized.

After the process of step S152 is executed, the control unit 312 writes the table update logs to the SCM 32 (step S153). The non-volatilization of the table update logs are thereby completed.

In contrast, when it is discriminated that the table update log is not non-volatilized (NO in step S152), the process of step S153 is not executed and the processes illustrated in FIG. 32 are ended.

In addition, when it is determined in step S151 that the second address translation table is non-volatilized (YES in step S151), the control unit 312 updates the Tail pointer to manage the table update log (step S154). In step S155, the Tail pointer is updated such that the table update log (entry) to be reflected on the second address translation table is discarded. More specifically, the Tail pointer is updated to represent the same location as the Head pointer.

After the process of step S154 is executed, the control unit 312 writes the second address translation table to the SCM 32 (step S155). The non-volatilization of the second address translation table is thereby completed.

Incidentally, for example, the Head pointer and the Tail pointer may be non-volatilized when the power loss occurs, but may also be written to the SCM 32 when the process of step S153 or S155 illustrated in FIG. 32 is executed.

According to the above-described processes illustrated in FIG. 32, the frequency of non-volatilizing the second address translation table having a large size can be lowered by non-volatilizing the table update logs, and the influence of degradation in the performance of the SCM module 30 can be thereby reduced. In addition, since the table update logs are appended, the second address translation table does not need to be written to the SCM 32 when the unexpected power loss occurs and a necessary battery capacity can be reduced.

When the table update logs are non-volatilized as described above, the second address translation table needs to be updated later based on the table update logs. The second address translation table update using the table update logs may be executed when, for example, the SCM module 30 (or the computer system 1) is rebooted.

FIG. 34 illustrates an outline of the second address translation table update using the table update logs executed at restart or the like of the SCM module 30. As illustrated in FIG. 34, the second address translation table can be set to the latest state by reflecting the table update logs on the second address translation table (to be updated) while sequentially referring to the table update logs. More specifically, in the example illustrated in FIG. 34, the physical address "0xB000" corresponding to the logical address "0x2000" is once updated to the physical address "0xBBBB" and then updated to the physical address "0xBCDE". In addition, the physical address "0xC000" corresponding to the logical address "0x3000" is invalidated due to the invalidation flag, which is set to "1" in the table update log. This process is executed based on each of the table update logs.

Incidentally, the second address translation table includes the data structure as illustrated in FIG. 26. However, FIG. 34 is simplified for convenience to enable the only correspondence between logical address and the physical address to be understood.

In addition, for example, the second address translation table is stored in the SCM 32 as the system management information. An area where the table update log is to be stored is also allocated in the area where the system management information of the SCM 32 is stored.

It has been described the entire second address translation table is written to the SCM 32 in step S155. However, when the entire second address translation table is written to the SCM 32, processing load for non-volatilization is high and therefore, for example, only a part (i.e., an updated part) of the second address translation table including the entries (hereinafter referred to as updated entries) may be written to the SCM 32, and the correspondence between the logical address and the updated physical address may be updated in each of the entries.

Incidentally, in a configuration of writing not the entire second address translation table, but the updated part to the SCM 32, too, the table update log is written into the ring buffer in the SCM 32. In addition, when the updated part of the second address translation table is written to the SCM 32, the table update log relating to the part can be discarded. Furthermore, the capacity of the ring buffer is limited and, a free space needs to be prepared in the ring buffer to write the table update log. The free space can be prepared by writing the second address translation table to the SCM 32 and setting a state in which the table update log may be discarded. In a configuration of writing the only updated part of the second address translation table to the SCM 32, however, dividing the ring buffer in a unit of writing the second address translation table to the SCM 32 to efficiently prepare the free space in the ring buffer is considered. For example, when the second address translation table is written to the SCM 32 in the unit of the index, the ring buffer is allocated for each index.

In this configuration, for example, when the area for the ring buffer allocated to a specific index may be depleted at high probability, the only entry associated with the specific index may be non-volatilized. In this case, the table update log in the area allocated to the specific index can be discarded. Incidentally, the area in the SCM 32 may be allocated to each single index or to each of the groups of multiple indexes, when a single index or each of the groups of multiple indexes, respectively, is the unit of the second address translation table to be non-volatilization. Furthermore, the single index may be divided into a plurality of subindexes and the area in the SCM 32 may be allocated to each of the divided indexes.

Next, an example of a processing procedure of the read process (i.e., the process in step S5 illustrated in FIG. 10) executed in the SCM module 30 according to the embodiment will be described. The processing procedure will be described for convenience with reference to the flowchart illustrated in FIG. 14.

First, the process of steps S61 illustrated in FIG. 14 is executed. When it is discriminated in step S61 that the target data is not stored in the buffer 314 (NO in step S61), the target logical address (i.e., the logical address designated in the read command) is translated into the physical address (step S62).

In the above-described comparative example of the embodiment, the target logical address is translated into the physical address by referring to the address translation table corresponding to the first address translation table. In the embodiment, however, the target logical address is translated into the physical address by firstly referring to the second address translation table, and to the first address translation table if necessary.

When the target logical address is translated into the physical address by referring to the second address translation table (i.e., the correspondence between the target logical address and the physical address is managed in the second address translation table), the processes following step S63 are executed to read the read target data from the second memory area 32b, with the physical address.

In contrast, when the target logical address is not translated into the physical address by referring to the second address translation table (i.e., the correspondence between the target logical address and the physical address is not managed in the second address translation table), the target logical address is translated into the physical address by referring to the first address translation table. In this case, the processes following step S63 are executed to read the read target data from the first memory area 32a, with the physical address translated from the target logical address by referring to the first address translation table.

That is, in the read process executed in the embodiment, it is searched whether the read target data is stored or not in the order of the buffer 314, the second memory area 32b, and the first memory area 32a, and the operation of returning the first found read target data to the CPU 10 is executed.

In the embodiment, it has been described that the second address translation table and the first address translation table are sequentially referred to as needed to acquire the physical address corresponding to the target logical address. However, the second address translation table and the first address translation table may be referred to in parallel. In such a configuration, the read target data can be read from the second memory area 32b, with the physical address acquired from the second address translation table in a case where hit occurs in the second address translation table, and the read target data can be read from the first memory area 32a, with the physical address acquired from the first address translation table in a case where miss occurs in the second address translation table. According to this, latency in the address translation process in step S62 can be reduced and, consequently, latency of the read command from the CPU 10 can be reduced.

Incidentally, the read process executed in the embodiment is the same as that described with reference to FIG. 14 except the above-described process of step S62 and detailed descriptions are omitted here.

Next, an example of the processing procedure of the wear leveling process executed in the embodiment will be described with reference to a flowchart of FIG. 35. Differences from the wear leveling process executed in the comparative example of the embodiment will be mainly described. In the wear leveling process of the embodiment, all Pages in the second memory area 32b are exchanged with the Pages in the first memory area 32a.

First, a process of step S161 corresponding to the above-described process of step S71 illustrated in FIG. 17 is executed. In step S161, the first and second wear leveling target areas are assumed to be determined.

Since the second memory area 32b is a memory area to which data is appended (i.e., data is written by the Append Write method), one of the wear leveling target areas (for example, the first wear leveling target area) is at least an area in the first memory area 32a.

When it is assumed that the first wear leveling target area is the area in the first memory area 32a as described above, the control unit 312 discriminates whether the second wear leveling target area determined in step S161 is the area in the second memory area 32b or not (step S162). That is, in step S162, it is discriminated whether the first and second wear leveling target areas are a combination of the area in the first memory area 32a and the area in the second memory area 32b or not.

When it is discriminated that the second wear leveling target area is the area in the second memory area 32b (YES in step S162), a process of step S163 corresponding to the process of step S127 illustrated in FIG. 30 (i.e., the process illustrated in FIG. 31) is executed. In the process of step S163, it is assumed that all of the data written to the second memory area 32b are written back to the first memory area 32a.

After the process of step S163 is executed, a Page exchange process is executed (step S164). The Page exchange process corresponds to the processes of steps S72 to S77 illustrated in FIG. 17. Thus, for example, the first wear leveling target area (Page) in the first memory area 32a which is frequently accessed by designating a specific logical address can be exchanged with the second wear leveling target area in the second memory area 32b. In this case, the data stored in the first wear leveling target area (first memory area 32a) are written to the second wear leveling target area (second memory area 32b). In contrast, the data stored in the second wear leveling target area are already written back to the first memory area 32a and do not need to be written back to the first wear leveling target area.

After the process of step S164 is executed, the second memory area management unit 322 updates the free area management information (step S165). Since all the data written to the second memory area 32b are written back to the first memory area 32a in step S163 as described above, the free area management information (Head pointer 32c and Tail pointer 32d) is updated such that the entire second memory area 32b is a free area, in step S165.

In contrast, when it is discriminated that the second wear leveling target area is not the area in the second memory area 32b (NO in step S162), the Page exchange process corresponding to the processes of steps S72 to S77 illustrated in FIG. 17 described in the comparative example of the embodiment is executed (step S166).

In the wear leveling process executed in the above-described embodiment, when the first wear leveling target area (Page) in the first memory area 32a is exchanged with the second wear leveling target area (Page) in the second memory area 32b, the exchange is executed after the data written to the second memory area 32b are written back to the first memory area 32a. According to this, the time to optionally execute the writeback process can be saved.

Incidentally, it has been described that the writeback process is executed in the wear leveling process illustrated in FIG. 35. However, the process may be executed such that the first wear leveling target area (Page) in the first memory area 32*a* are exchanged with the second wear leveling target area (Page) in the second memory area 32*b* as they are.

Next, an example of the processing procedure of the patrol and refresh process executed in the embodiment will be described with reference to a flowchart of FIG. 36. Differences from the patrol and refresh process executed in the comparative example of the embodiment will be mainly described.

First, processes of steps S171 to S173 corresponding to the above-described processes of steps S81 to S83 illustrated in FIG. 18 are executed. Incidentally, it is assumed that a patrol and refresh target Page determined in step S171 is the Page in the first memory area 32*a*.

When the Read Modify Write process is executed in the patrol and refresh process, similar to the above-described non-volatilization process for the first memory area 32*a*, the latest data of the data written to the patrol and refresh target Page may be written to the second memory area 32*b*.

For this reason, it is discriminated whether hit occurs at the logical address for accessing the patrol and refresh target Page in the second address translation table (i.e., the correspondence between the logical address and the physical address is managed in the second address translation table) or not (step S174).

When it is discriminated that hit occurs at the logical address in the second address translation table (YES in step S174), processes of steps S175 to S179 corresponding to the processes of steps S137 to S140 and S142 illustrated in FIG. 31 are executed by using the data written to the physical address (Page) associated with the logical address in the second address translation table as the writeback target data. According to the processes of steps S175 to S179, the data written to the second memory area 32*b* (i.e., the data written to the physical address corresponding to the logical address where hit occurs in the second address translation table) can be written back to the first memory area 32*a* as described above.

It has been described that hit occurs at the logical address for accessing the patrol and refresh target Page in the second address translation table. When the 64-byte data which belongs to the same ECC frame in the first memory area 32*a* as the patrol and refresh target Page is already written to the second memory area 32*b*, the 64-byte data is written to the first memory area 32*a*, too.

In contrast, when it is discriminated that hit does not occur at the logical address in the second address translation table (NO in step S174), processes of steps S180 and S181 corresponding to the above-described processes of steps S84 and S85 illustrated in FIG. 18 are executed.

It has been described that the patrol and refresh target Page determined in step S171 is the Page in the first memory area 32*a*. However, the patrol and refresh target Page may be the Page in the second memory area 32*a*.

In this case, it is confirmed whether all of the four 64-byte data, which belong to the same ECC frame in the first memory area 32*a*, are written to the first memory area 32*a*, not to the second memory area 32*b*. If any of the 64-byte data is written to the second memory area 32*b*, the data is read from the second memory area 32*b*. The other data is read from the first memory area 32*a* as needed. According to this, since the ECC frame can be configured from these data (256-byte data), the ECC frame is written back to the first memory area 32*a*.

In the patrol and refresh process executed in the above embodiment, the data written to the second memory area 32*b* in the patrol and refresh process executed in the comparative example of the embodiment can be written to the first memory area 32*a*. According to this, the time to optionally execute the writeback process can be saved.

Incidentally, the operations executed when the write command is received while the patrol and refresh process is being executed in the embodiment are the same as those in the above-described comparative example of the embodiment.

Figure 36:
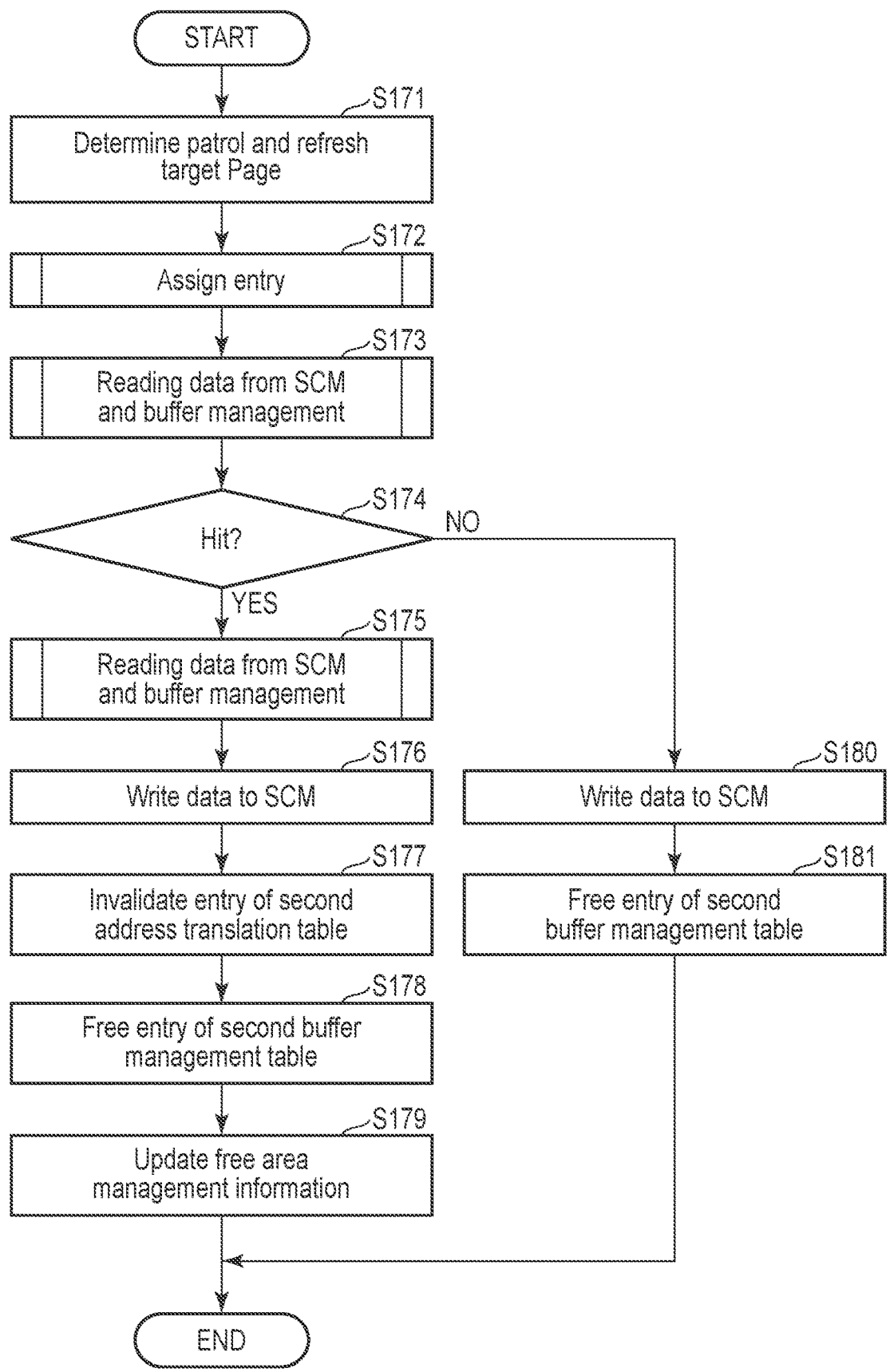
FIG. 36 is a flowchart illustrating an example of a processing procedure of a patrol and refresh process in the embodiment.

It has been described that the writeback process is executed in the wear leveling process illustrated in FIG. 35 and the patrol and refresh process illustrated in FIG. 36. However, the writeback process may be executed when the SCM module 30 is rebooted.

The writeback process executed when the SCM module 30 is rebooted will be described below. First, when the SCM module 30 is rebooted, the second address translation table and the table update log stored in the SCM 32 are read from the SCM 32.

Next, the second address translation table in the SCM controller 31 is updated to the latest state as described with reference to FIG. 34.

The Head pointer 32*c* and the Tail pointer 32*d* for managing the second memory area 32*b* stored in the SCM are read.

Next, the same processes as the processes following step S172 illustrated in FIG. 36 are executed. More specifically, the buffer entry is assigned, the data written to the area indicated by the Tail pointer is read, and it is discriminated whether hit occurs in the second address translation table or not. When it is discriminated that hit occurs in the second address translation table, the data is written back, the entry of the second address translation table is invalidated, and the entry of the second buffer management table (with the buffer area) is freed. In contrast, when it is discriminated that hit does not occur (i.e., miss occurs) in the second address translation table, the data is discarded since the data is invalid.

Incidentally, the process is repeated for all the data in the second memory area 32*b*.

When the above process is completed, valid data is not present in the second memory area 32*b*, and correspondence (correspondence information) between the logical address and the physical address is not registered in the second address translation table. In this case, the free area management information of the second memory area 32*b* is updated and the second memory area 32*b* is in a free state.

Next, an example of the processing procedure of the power loss detection process executed in the embodiment will be described with reference to a flowchart of FIG. 37. Differences from the power loss detection process executed in the comparative example of the embodiment will be mainly described.

Figure 19:
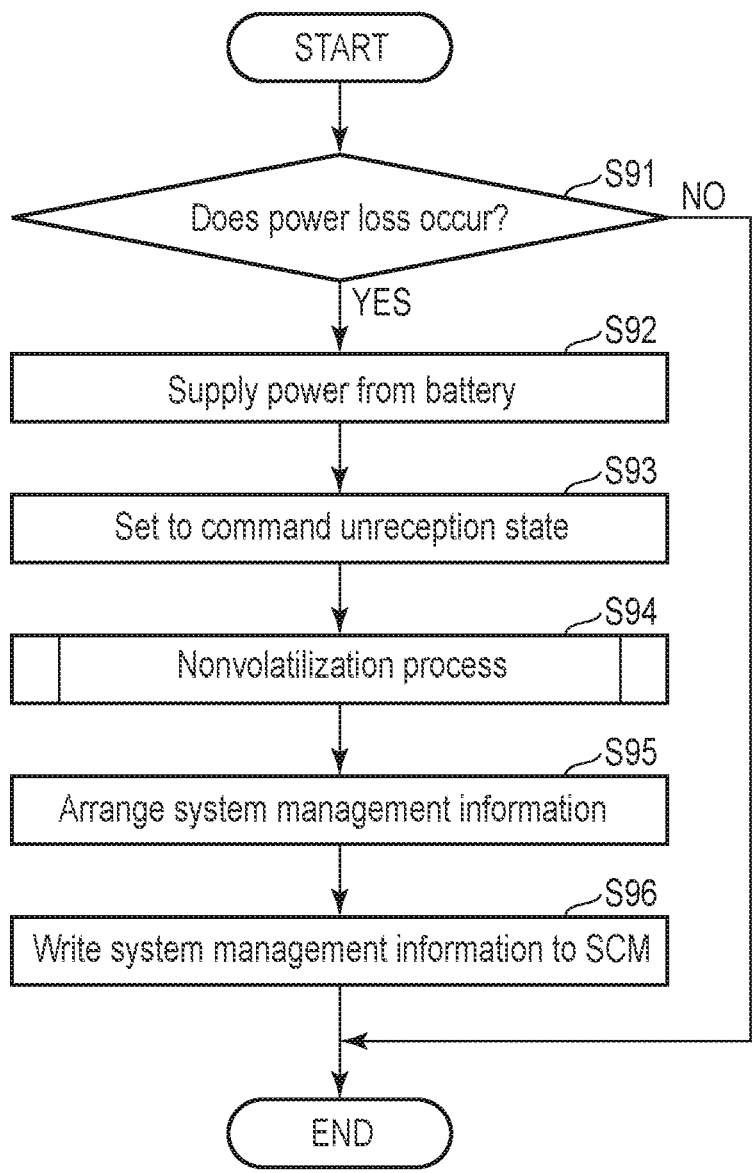
FIG. 19 is a flowchart illustrating an example of a processing procedure of a process after a power loss in the comparative example of the embodiment.

First, processes of steps S191 to S193 corresponding to the above-described processes of steps S91 to S93 illustrated in FIG. 19 are executed.

In the power loss detection process executed in the embodiment, the data stored in the buffer 314 is assumed to be written to the second memory area 32*b* (i.e., the memory area where data is managed in 64-byte unit).

Figure 28:
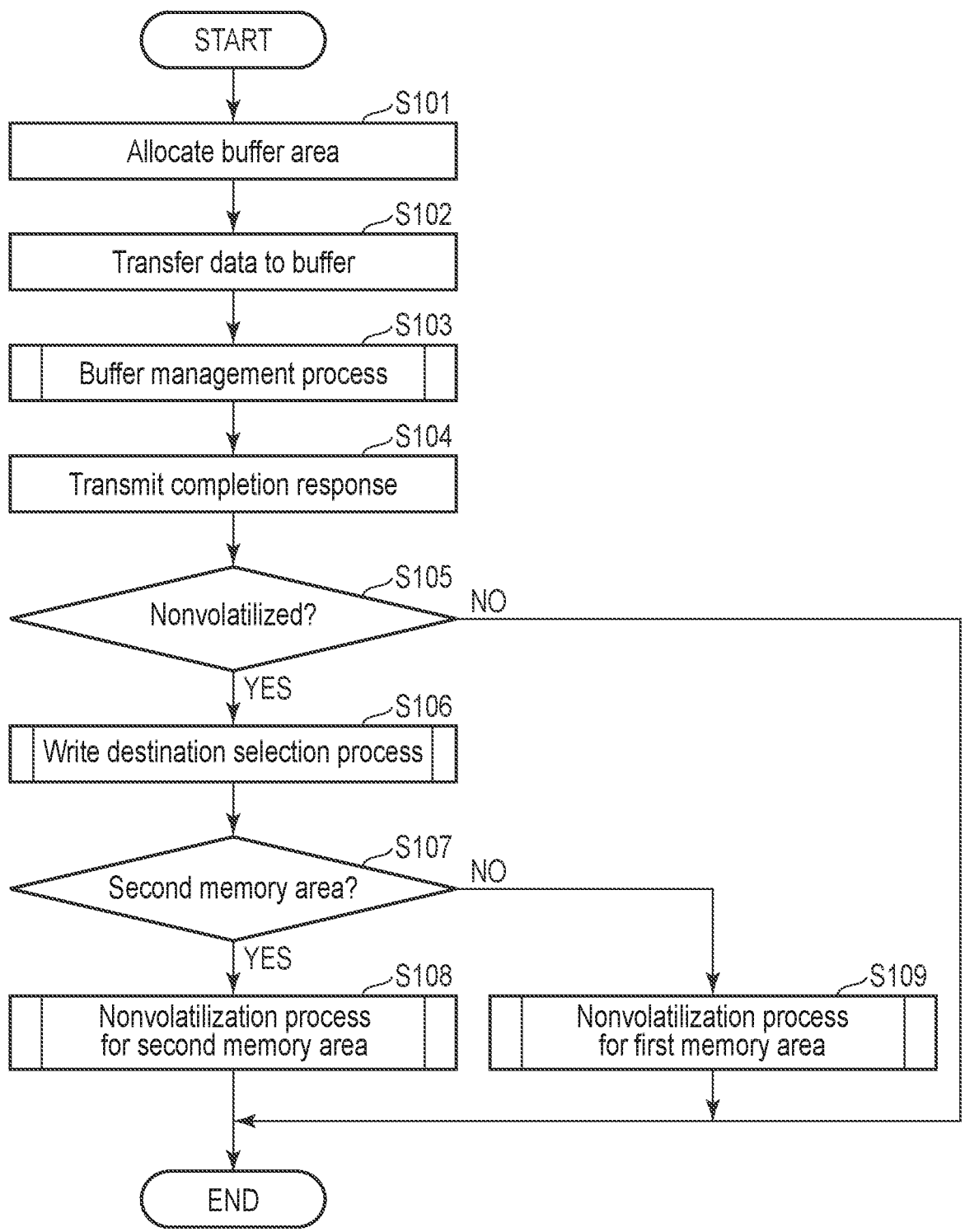
FIG. 28 is a flowchart illustrating an example of a processing procedure of a write process in the embodiment.

In this case, a process of step S194 (i.e., the non-volatilization process for the second memory area 32*b*) corresponding to the above-described process of step S108 illustrated in FIG. 28 is executed. The non-volatilization process for the second memory area 32*b* has been described in detail with reference to FIG. 30. In the non-volatilization process for the second memory area 32*b* executed in step S194, however, the processes of steps S126 and S127 illustrated in FIG. 30 are not executed (i.e., the only processes of steps S121 to S125 are executed). When the process of step S194 is executed, all the data stored in the buffer 314 are written to the second memory area 32b.

After the process of step S194 is executed (i.e., the data is written to the second memory area 32b), the second address translation table is updated. The control unit 312 appends the table update log on the second address translation table update to the table update log area (step S195).

Figure 37:
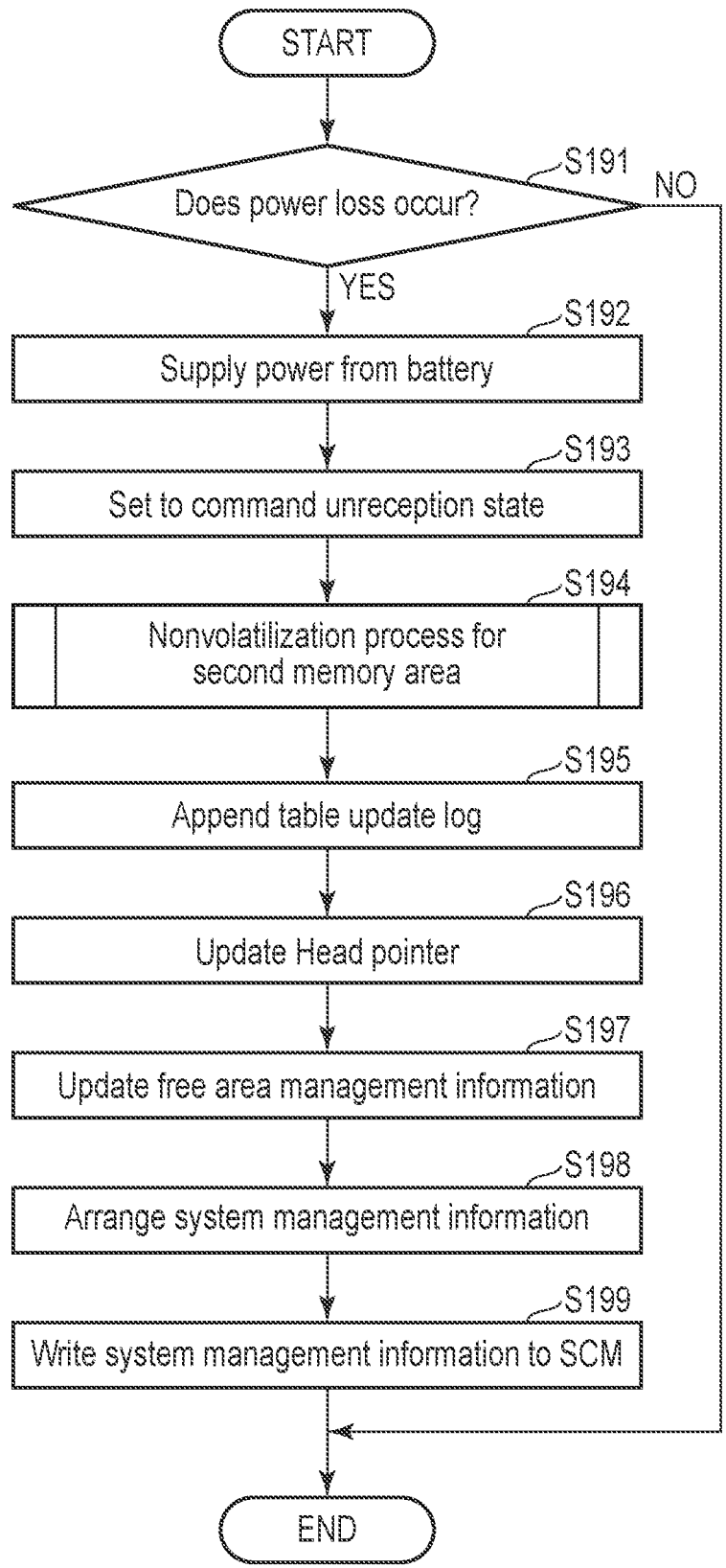
FIG. 37 is a flowchart illustrating an example of a processing procedure of a process after a power loss in the embodiment.

Incidentally, in FIG. 37, the process of step S195 is executed for convenience, after the process of step S194 is executed. However, the process of step S195 is only required to be executed after the second address translation table is updated in step S194.

The table update log appended in step S195 is managed with the Head pointer and the Tail pointer as described above. Since the table update log is newly appended, the control unit 312 updates the Head pointer (step S196).

In addition, the second memory area management unit 322 updates the free area management information (step S197). Since the data stored in the buffer 314 are written to the second memory area 32b in step S194 as described above, the Head pointer 32c included in the free area management information is updated in accordance with the data written to the second memory area 32b in step S197.

Next, the control unit 312 arranges the system management information that needs to be non-volatilized to form ECC frame (step S198). The system management information generated in step S198 includes, for example, the table update log appended in step S195, the Head pointer for managing the table update log updated in step S196, the free area management information updated in step S197, and the like. Incidentally, when the Tail pointer for managing the table update log is not non-volatilized, the Tail pointer is also included in the system management information generated in step S198. In addition, the system management information generated in step S198 may include the other information (for example, a log indicating that power loss occurs, a write count management table, and the like).

After the process of step S198 is executed, the control unit 312 writes the system management information generated in step S198 to the SCM 32 (step S199).

As described above, in the power loss detection process executed in the embodiment, all data whose non-volatilization is incomplete (i.e., the data in the buffer area managed in the second buffer management table) are written to the second memory area 32b. According to the power loss detection process, since the non-volatilization of the data stored in the buffer 314 can be implemented without executing the Read Modify Write process that needs to be executed when the data is written to the first memory area 32a, the time to be spent until the non-volatilization is completed can be reduced and, as the result, the battery capacity can be reduced.

In addition, since the second address translation table is updated in, for example, the DRAM 33 as described above, the second address translation table also needs to be non-volatilized in the power loss detection process executed in the embodiment. In this case, the time required for the non-volatilization can be reduced by not non-volatilizing the second address translation table itself but non-volatilizing the table update log as described above. Incidentally, for example, when the SCM module 30 is next rebooted and the SCM module 30 is next rebooted, the latest second address translation table can be obtained with the second address translation table stored in the SCM 32 and the table update log.

To execute the above-described power loss detection process at an unexpected power loss, free areas corresponding to at least the entire capacity of the buffer 314 (i.e., the free capacity which enables all the data stored in the buffer 314 to be written) need to be allocated in the second memory area 32b. That is, in the embodiment, the data in the second memory area 32b are written back to the first memory area 32a such that free areas corresponding to the entire capacity of the buffer 314 can be allocated in the second memory area 32b.

In addition, occurrence of the unexpected power loss has been described. However, when the SCM module 30 (or the computer system 1) is normally powered off (for example, shut down), the data stored in the buffer 314 and the necessary system management information may be non-volatilized. In this case, the data stored in the buffer 314 may be written to the first memory area 32a or the second memory area 32b. In addition, in this case, not the table update log but the second address translation table may be non-volatilized.

As described above, in the embodiment, the SCM 32 (nonvolatile memory) includes the first memory area 32a and the second memory area 32b. When the write command is received from the CPU 10 (host), the SCM controller 31 determines the write method of writing the data. When the In-Place Update method (first method) is determined as the write method, the SCM controller 31 writes the data to the first memory area 32a in the In-Place Update method. When the Append Write method is determined as the write method, the SCM controller 31 writes the data to the second memory area 32b in the Append Write method. Incidentally, the In-Place Update method is a method of writing the data to the physical address associated with the logical address designated in the write command at the time when the data based on the write command is written to the first memory area 32a. In addition, the Append Write method is a method of writing the data to the physical address specified as the data write destination, irrespective of the logical address designated in the write command at the time when the data based on the write command are written to the second memory area 32b.

In the embodiment, the configuration enables the write performance to the SCM 32 to be improved.

More specifically, when the write commands in which noncontiguous logical addresses are designated in the comparative example of the embodiment are received four times from the CPU 10, the Read Modify Write process needs to be executed for four data designated in the respective write commands. In the embodiment, however, when the write commands in which noncontiguous logical addresses are designated are received four times from the CPU 10, the data designated in the respective write commands may be packed and written one time to the second memory area 32b. According to this, the random write performance can be improved until the second memory area 32b (i.e., the memory area to which the data is written by the Append Write method) is depleted.

In addition, in the comparative example of the embodiment, when the physical address (the Bank) corresponding to the logical address for accessing the data designated in the write command is in the Busy state, it is required to stand by until the Bank becomes Ready state. In the embodiment, however, for example, when the physical address in the first memory area 32a corresponding to the logical address for accessing the data designated in the write command is in the Busy state, the data can be written to the second memory area 32b and the write performance of the SCM module 30 can be thereby improved.

In addition, in the embodiment, the SCM controller 31 manages the correspondence between the logical address used when the CPU 10 accesses the SCM module 30 (memory system) and the physical address in the first memory area 32a with the first address translation table, and manages the correspondence between the logical address and the physical address in the second memory area 32b with the second address translation table. In this case, the correspondence managed in the first address translation table is managed in, for example, the 256-byte unit (first management unit), and the correspondence managed in the second address translation table is managed in, for example, the 64-byte unit (i.e., the second management unit smaller than the first management unit). In addition, the 64-byte unit of managing the data in the second address translation table is the access unit to the SCM module 30 of the CPU 10. It has been described that the correspondence is managed at 64 bytes in the second address translation table. However, the unit of managing the data in the second address translation table may be determined based on the access unit to the SCM module 30 of the CPU 10 (or may be, for example, the divisor of the access unit or the like).

In the embodiment, with such a configuration, it is possible to dynamically select the write process in the In-Place Update method for the first memory area 32a and the write process in the Append Write method for the second memory area 32b, and to improve the write performance.

In addition, in the embodiment, when the write command is received from the CPU 10, the write method (write destination) of writing the data designated in the write command is determined. For example, when the Read Modify Write process needs to be executed for the first memory area 32a to manage the data, the Append Write method is determined as the write method. According to this, since the data is written to the second memory area 32b without executing the Read Modify Write process, the time required for non-volatilization of the data can be reduced and the write performance can be improved.

Incidentally, for example, when the write commands are issued by the CPU 10 at low frequency, the write performance of the SCM module 30 is the same whether either of the In-Place Update method or the Append Write method is selected. However, when the write commands are issued by the CPU 10 at high frequency and the write performance of the SCM module 30 is degraded if the In-Place Update method is selected, since the Read Modify Write process with long latency is required to be proceeded. Thus, for example, when the number of write commands in the predetermined period is larger than or equal to the predetermined value, the Append Write method may be determined as the write method.

It has been described that in the embodiment, when the Read Modify Write process needs to be executed for the first memory area 32a and the number of write commands issued by the CPU 10 in the predetermined period is larger than or equal to a predetermined value, the Append Write method may be determined as the write method.

In addition, in the embodiment, when the first memory area 32a where the data designated in the write command is written (i.e., the Bank corresponding to the physical address in the first memory area 32a) is in the Busy state, the Append Write method may be determined as the write method.

Furthermore, in the embodiment, when the logical address designated in the write command is designated in the other command in near past, the Append Write method may be determined as the write method.

In addition, when the SCM module 30 according to the embodiment is configured to cache a part of the first address translation table and when the logical address designated in the write command is discriminated as cache miss, the Append Write method may be determined as the write method.

Several conditions for determining the write method (write destination) have been described. In the embodiment, the data can be written to an appropriate write destination in accordance with the state of the SCM 32, by determining the write destination under these conditions, and the write performance can be improved.

The described conditions for determining the write method are mere examples. The write method may be determined under the other conditions or can be determined by appropriately combining the conditions.

In addition, when the logical address and the physical address are managed in, for example, 64-byte units as described above, the size of the address translation table becomes larger. In the embodiment, the first memory area 32a and the second memory area 32b may be therefore allocated such that the first memory area 32a becomes a larger memory area than the second memory area 32b. In addition, in the embodiment, a writeback process of writing back the data written to the second memory area 32b to the first memory area 32a at predetermined timing is executed.

Incidentally, when the above-described writeback process is executed, the correspondence between the logical address and the physical address of the written-back data managed in the second address translation table is invalidated. The invalidation of the correspondence between the logical address and the physical address is also executed when the latest data is written from the CPU 10 to the first memory area 32a or the second memory area 32b.

In addition, the writeback process is executed when, for example, the free area of the second memory area 32b is smaller than a predetermined value. The writeback process may be executed in the wear leveling process as described with reference to FIG. 35 or the patrol and refresh process as described with reference to FIG. 36. According to the configuration, since the writeback process does not need to be executed separately from the wear leveling process and the patrol and refresh process, efficient operations of the SCM module 30 can be implemented.

In addition, in the embodiment, the data designated in the write command is once stored in the buffer area (buffer 314). When the power loss of the SCM module 30 is detected before the data is written to the first memory area 32a or the second memory area 32b, the data stored in the buffer area is written to the second memory area 32b by the Append Write method.

In the embodiment, this configuration enables the data to be non-volatilized at a higher speed than writing the data to the first memory area 32a while executing the Read Modify Write process. Therefore, the capacity of the battery 35 supplying the power to the SCM module 30 at occurrence of the power loss can be reduced.

In the embodiment, when the read command in which the logical address for accessing the data to be read from the SCM 32 is designated is received from the CPU 10, the physical address corresponding to the logical address designated in the read command is acquired by referring to the second address translation table, first, for managing the correspondence between the logical address and the physical address in the second memory area 32b. In this case, the data can be read from the second memory area 32b, based on the physical address acquired by referring to the second address translation table.

In the embodiment, when the physical address corresponding to the logical address designated in the read command cannot be acquired by referring to the second address translation table (i.e., the logical address is not stored in the second address translation table or the logical address is invalidated in the second address translation table), the physical address corresponding to the logical address designated in the read command is acquired by referring to the first address translation table for managing the correspondence between the logical address and the physical address in the first memory area 32a. In this case, the data can be read from the first memory area 32a, based on the physical address acquired by referring to the first address translation table.

In the embodiment, the logical address is searched in the order of the second memory area 32b and the first memory area 32a, and the data can be returned from the second memory area 32b or the first memory area 32a in accordance with the search result.

Incidentally, when the data accessed with the logical address designated in the read command is stored in the buffer 314 (or the read cache), the data is returned from the buffer 314 (or the read cache).

Descriptions of the read process in the embodiment have been omitted. However, when the read target data is written to the second memory area 32b by the read process, the writeback process of writing back the read data (i.e., the data written to the second memory area 32b) to the first memory area 32a can be executed.

In the embodiment, as described with reference to FIG. 23, it has been described that the SCM 32 includes a plurality of Banks sectioned by the unit of being accessed in parallel by the CPU 10 and that each of the first memory area 32a and the second memory area 32b is allocated across a plurality of Banks. However, the first memory area 32a and the second memory area 32b may be allocated in a manner different from that illustrated in FIG. 23.

Figure 38:
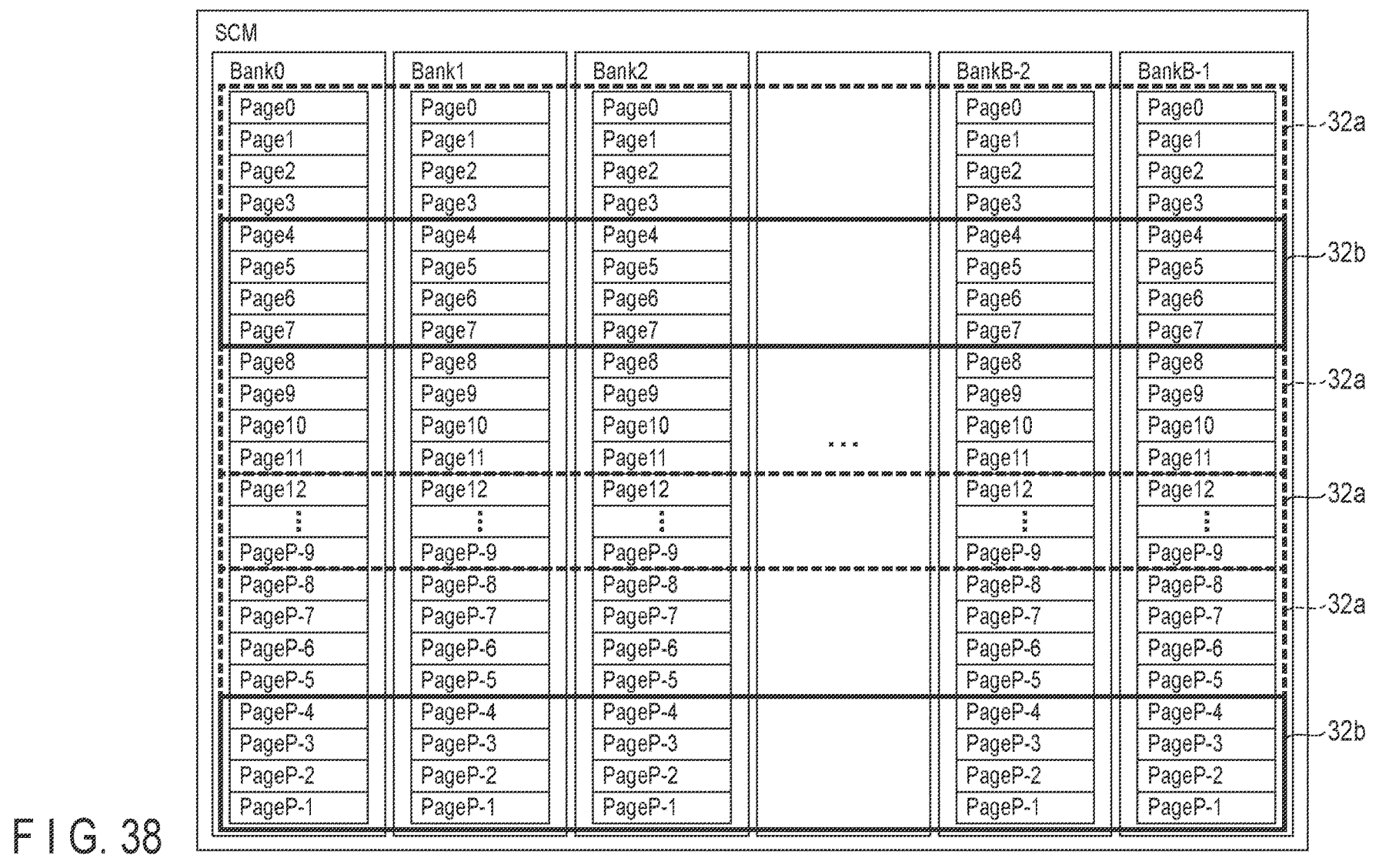

In this case, for example, the second memory area 32b can be allocated at a free location, but may be fixed based on, for example, the unit of wear leveling (hereinafter referred to as a chunk). FIG. 38 illustrates an example that the chunk is composed of four Pages and the second memory area 32b is composed of two chunks. According to the configuration, wear leveling process can be executed for the second memory area 32b at fine-grain size.

Incidentally, even when the second memory area 32b is allocated separately as illustrated in FIG. 38, (the free area of) the second memory area 32b is managed with the Head pointer and the Tail pointer.

In this case, the Head pointer and the Tail pointer are managed in the above-described free area management table illustrated in FIG. 25. Each of the Head pointer and the Tail pointer includes higher-order bits, offset, and Bank number as illustrated in FIG. 39.

In the second memory areas 32b illustrated in FIG. 38, the memory area composed of Pages P−4 to P−1 across Banks 0 to B−1 is referred to as a first sub-memory area, and the memory area composed of Pages 4 to 7 across Banks 0 to B−1 is referred to as a second sub-memory area. In this case, the higher-order bits of each of the Head pointer and the Tail pointer are indicative of the first or second sub-memory area. In contrast, the offset of each of the Head pointer and the Tail pointer is indicative of one of Pages configuring the first or second sub-memory area. Incidentally, when the chunk is composed of four Pages as described above, the offset is 2 bits. When the chunk is composed of one Page, the offset is 0 bits. The Bank number is an identifier (identification number) to identify the Bank.

When the Head pointer and the Tail pointer are made to advance by 1, 1 is added to the Bank number. The Head pointer and the Tail pointer thereby advance to the Bank direction. In contrast, when the Bank number is the number of Banks or more, the Bank number is set to 0 and the offset is incremented by 1. The locations of the Head pointer and the Tail pointer are thereby raised. Furthermore, when the offset is larger than or equal to the Page number of the chunk, the offset is set to 0 and 1 is added to the higher-order bits. The Head pointer and the Tail pointer can be thereby moved to a different chunk. In addition, when the value of the higher-order bits is larger than or equal to the number of chunks, it is set to 0, and the Head pointer and the Tail pointer are thereby retuned to the starting Page of the second memory area 32b.

According to the above-described Head pointer and Tail pointer, the starting Page number of the chunk (first or second sub-memory area) can be acquired by referring to the chunk number matching the higher-order bits of the Head pointer and the Tail pointer in a chunk management table illustrated in FIG. 40. The area indicated by the Head pointer and the Tail pointer (i.e., the physical address to be accessed) can be derived based on the starting Page number acquired, and the offset and Bank number of the Head pointer and the Tail pointer.

More specifically, it is assumed that, for example, the Head pointer has the higher-order bits (chunk number) "0x01", the offset "2", and the Bank number "0". In this case, it can be understood that the starting Page number of the chunk is "Page 4", by referring to the chunk management table illustrated in FIG. 40. When the offset is added to the starting Page number, it is derived that the physical address to be accessed is Page 6 of Bank 0.

When the wear leveling process is executed based on the above chunk, the chunk management table (starting Page number of the chunk) illustrated in FIG. 40 is updated.

Incidentally, the second memory area 32b may be allocated as illustrated in, for example, FIG. 41. That is, the second memory area 32b may not be allocated across a plurality of Banks. According to this configuration, the wear leveling process can be executed while considering the wear of the cell between the Banks. In the chunk management table of this case, the starting Page number of the chunk may be managed for each Bank as illustrated in FIG. 42.

In addition, it has been described that in the embodiment, the Head pointer 32c (with the Tail pointer 32d) manages the free area of the second memory area 32b by ring buffer moving in a direction of crossing the Banks as described with reference to FIG. 24. For example, when the Bank corresponding to the Page indicated by the Head pointer 32c is in the Busy state, and when it is required to stand by until the Bank becomes Ready state, the write performance for the second memory area 32b is lowered. In addition, in this case, a configuration of skipping the Page of the Bank in the Busy state is also considered. In this configuration, however, for example, when the load of access from the CPU 10 is high, the Pages where the data is not written frequently appear and efficient write is blocked.

Thus, in the embodiment, as illustrated in FIG. 43, the Head pointer and the Tail pointer may be prepared for each Bank, and the free area of the second memory area 32b may be managed for each Bank by Ring Buffer. In this case, the Head pointer and the Tail pointer are managed in the free area management table illustrated in FIG. 44. The free area of the second memory area 32b can be managed by moving the Head pointer and the Tail pointer for each Bank as represented by an arrow illustrated in FIG. 43.

In FIG. 43, when the second memory area 32b is allocated as illustrated in FIG. 23, the free area is managed for each Bank. Even when the second memory area 32b is allocated as illustrated in FIG. 38 and FIG. 41, too, the configuration of managing the free area for each Bank can be applied. In addition, in FIG. 43, one ring buffer is provided for each Bank. However, a plurality of ring buffers may be provided in the Bank (i.e., the ring buffer may be provided for each area in the Bank). In this case, the Head pointer and the Tail pointer managed for each Bank as illustrated in FIG. 44 and the starting Page number of the chunk managed for each Bank as illustrated in FIG. 40 or FIG. 42 are managed for each ring buffer of the Bank.

In addition, when the free area is managed for each Bank or each ring buffer as described above, the area (Page) where next data is to be written for each Bank is determined by the Head pointer managed for each Bank. The Bank where the data is to be written (hereinafter referred to as a write location) also needs to be determined. In this case, for example, the Bank including a large number of free areas is determined as the write location. Incidentally, the free area for each Bank is managed by the Head pointer and the Tail pointer. The Bank including a large number of free areas corresponds to a Bank where a difference in location between (the Page indicated by) the Head pointer and (the Page indicated by) the Tail pointer is small. The write location may be determined in a Bank in a non-Busy state.

In addition, a Bank different from the physical address (Bank) in the first memory area 32a where the data is to be written may be selected as the write location. By writing the data to different Banks, the data is read from different Banks in the first memory area 32a and the second memory area 32b when, for example, the data is written back from the second memory area 32b to the first memory area 32a (the Read Modify Write process is executed). Reading the data can be therefore executed in parallel.

More specifically, it is assumed that, for example, of the 256-byte data managed as the same ECC frame in the first memory area 32a, the 64-byte data of logical address "0x0000000" is written to the second memory area 32b, the 64-byte data of each of logical addresses "0x0000001" to "0x0000003" are written to the first memory area 32a, and 64-byte data of logical address "0x0000000" is written back to the first memory area 32a.

In this case, when these data are assumed to be written to the same Bank, (the ECC frame including) the 64-byte data of each of logical addresses "0x0000001" to "0x0000003" written to the first memory area 32a need to be read after reading (the ECC frame including) the 64-byte data of logical address "0x0000000" written to the second memory area 32b (i.e., the read process needs to be executed sequentially two times for the same Bank).

In contrast, when the 64-byte data of logical address "0x0000000" (i.e., the data of the second memory area 32b) and the 64-byte data of each of logical addresses "0x0000001" to "0x0000003" (i.e., the data of the first memory area 32a) are assumed to be written to different Banks, the 64-byte data of logical address "0x0000000" and the 64-byte data of each of logical addresses "0x0000001" to "0x0000003" can be read in parallel from the SCM 32.

In the embodiment, when the above configuration is adopted, latency of the writeback process of the data from the second memory area 32b to the first memory area 32a can be reduced.

Figure 45:
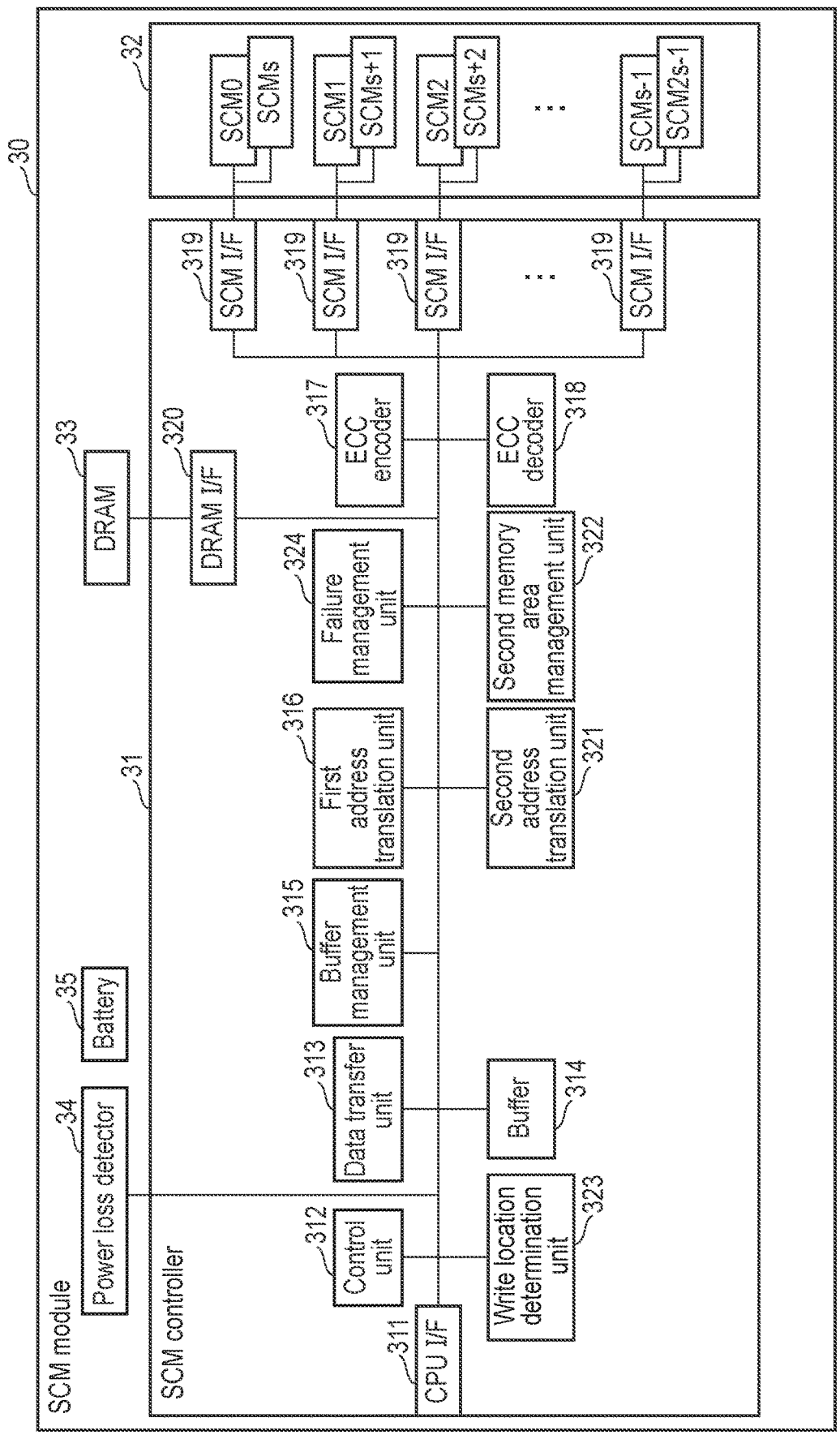
FIG. 45 is a block diagram illustrating another example of a configuration of the SCM module according to the embodiment.

Although omitted in FIG. 22, the SCM controller 31 further includes the write location determination unit 323 as illustrated in FIG. 45. The process of determining the data write location is executed by the write location determination unit 323.

In addition, as illustrated in FIG. 45, the SCM controller 31 may further include a failure management unit 324. The failure management unit 324 manages, for example, locations of failure areas (Pages) where data write or read cannot be executed in the second memory area 32b. Incidentally, the failure areas whose locations are managed by the failure management unit 324 may be the Pages recognized as failure areas at shipment of the SCM module 30 or the Pages which become failure areas due to wear of the memory cells. According to the failure management unit 324, for example, the failure areas can be avoided when the data designated in the write command are written to the second memory area 32b.

In addition, when the free area is managed for each Bank or each ring buffer as described above, a writeback source (i.e., the data written back to be first memory area 32a) needs to be determined. In this case, for example, the ring buffer including a large number of invalid 64-byte data may be selected. The number of invalid data may be managed in advance for each ring buffer. More specifically, the number of invalid data can be managed by subtracting 1 from the number of valid 64-byte data when the data is appended or adding 1 when the data is invalidated. The data amount of the writeback target data can be reduced and the free area of the second memory area 32b can be allocated in a short time by selecting the ring buffer including a large number of invalid data as the writeback source. As a result, the write performance of the SCM module 30 can be improved.

Figure 46:
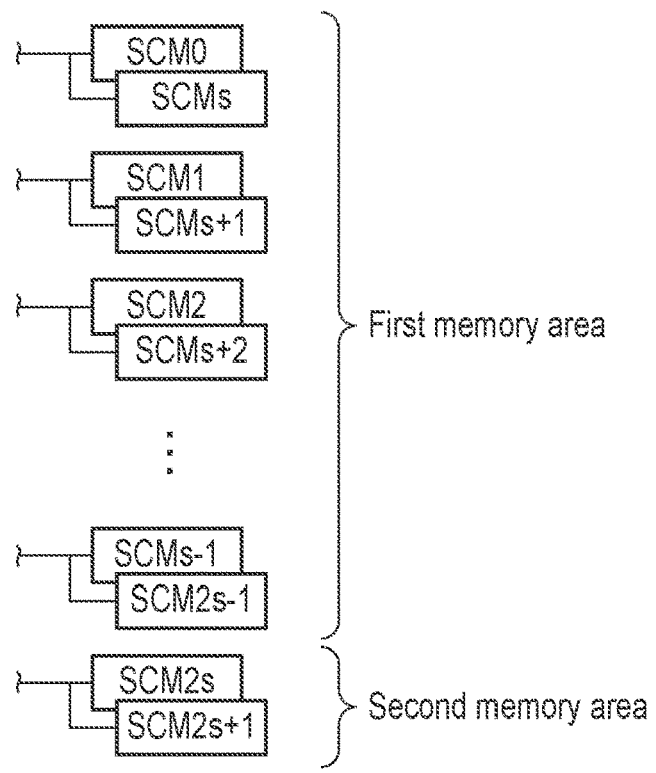
FIG. 46 is a diagram illustrating a configuration of adding SCM chips to secure the second memory area in the embodiment.

Incidentally, in the embodiment, it has been described that, for example, the SCM 32 includes 2s SCM chips SCM0 to SCM2s−1 illustrated in FIG. 22, and partitions the memory area of 2s SCM chips into the first memory area 32a and the second memory area 32b and manages the areas. In this case, however, the memory area (capacity) which can be substantially used by the CPU 10 is reduced. For this reason, for example, when the SCM 32 includes 2s SCM chips, the memory area of 2s SCM chips may be used as the first memory area 32a and SCM chips to allocate the second memory area 32b (for example, SCM 2s and 2s+1) may be added optionally, in the example illustrated in FIG. 46. According to this configuration, reduction in the memory area (capacity) which can be substantially used by the CPU 10 can be avoided. Incidentally, in FIG. 46, the first memory area 32a and the second memory area 32b are allocated to different SCM chips. Even when the SCM chip is added optionally as described above, the first memory area 32a and the second memory area 32b may be allocated into the same SCM chip.

That is, in the above embodiment, the first memory area 32a and the second memory area 32b may be allocated by dividing the memory area included in the same SCM chip or allocated in different SCM chips.

Incidentally, the capacity (size) of (memory area allocated as) the second memory area 32b may be designated by, for example, the outside of the SCM module 30 (for example, the CPU 10). When the capacity of the second memory area 32b is designated by the outside, the capacity of the second memory area 32b may be designated directly or the capacity to be added or reduced may be designated when the capacity is added to the second memory area 32*b* or the capacity of the second memory area 32*b* is reduced. Incidentally, "adding the capacity to the second memory area 32*b*" implies allocating a part of the first memory area 32*a* to the second memory area 32*b*, and "reducing the capacity of the second memory area 32*b*" implies allocating a part of the second memory area 32*b* to the first memory area 32*a*. In addition, partitions or namespaces obtained by partitioning (dividing) the memory area included in the SCM module 30 (SCM 32) may be designated as needed. The process on specifying the capacity of the second memory area 32*b* can be executed in, for example, step S6 illustrated in FIG. 10.

In addition, when the capacity of the second memory area 32*b* is designated by the outside as described above, all the data written to the second memory area 32*b* are written back to the first memory area 32*a*. Thus, the second memory area 32*b* and the second address translation table becomes free state, and the Head pointer 32*c* and the Tail pointer 32*d* become a state indicating that the second memory area 32*b* is free (i.e., data is not written) in the free area management table illustrated in FIG. 25.

Furthermore, when the capacity is added to the second memory area 32*b* or the capacity of the first memory area 32*a* is reduced by the above specification executed by the outside, the number of entries of the first address translation table illustrated in FIG. 4 is reduced in accordance with this. In addition, since the capacity is added to the second memory area 32*b*, a control method of the Head pointer 32*c* and the Tail pointer 32*d* may be updated. More specifically, the control method allows the part (area) added as the second memory area 32*b* to be indicated by the Head pointer 32*c* and the Tail pointer 32*d*. In addition, the number of indexes and the number of entries in the second address translation table illustrated in FIG. 26 are increased. Incidentally, when the number of indexes is increased in the second address translation table, the number of bits of the higher-order bits and lower-order bits illustrated in FIG. 27 are also changed. In the embodiment, the data written to the reduced area of the first memory area 32*a* are not assured. That is, the data cannot be returned even when the CPU 10 issues the read command later for the data of the reduced area. In addition, the write process cannot be executed even when the CPU 10 issues the write command in which the logical address of the reduced area is designated. In this case, the SCM module 30 returns an error response to the CPU 10.

In contrast, when capacity of the second memory area 32*b* is reduced and the capacity of the first memory area 32*a* is added, the number of the entries of the first address translation table illustrated in FIG. 4 is increased in accordance with this. In addition, since the capacity of the second memory area 32*b* is reduced, a control method of the Head pointer 32*c* and the Tail pointer 32*d* may be updated. More specifically, the control method prevents the reduced part (area) of the second memory area 32*b* from being indicated by the Head pointer 32*c* and the Tail pointer 32*d*. In addition, the number of the entries in the second address translation table illustrated in FIG. 26 are reduced. Incidentally, when the number of the indexes is reduced in the second address translation table, the number of bits of the higher-order bits and lower-order bits illustrated in FIG. 27 are also changed.

When the above process is completed, the SCM module 30 returns the completion response to the outside of the SCM module 30 (for example, CPU 10).

Specifying the capacity of the second memory area 32*b* by the outside of the SCM module 30 may be executed when partitions or namespaces are generated with a command from the outside. However, the sum of the capacity of the partitions or the namespaces designated by the outside and the capacity of the second memory area 32*b* designated by the outside may be larger than the sum of the first memory area 32*a* and the second memory area 32*b* included in the SCM module 30. In this case, since specifying the capacity cannot be implemented, an error response is returned to the outside of the SCM module 30.

In addition, in the embodiment, the SCM controller 31 adds the ECC parity (parity for error correction) to the metadata and the four 64-byte data (256-byte data) to form the ECC frame, and then writes the frame to the second memory area 32*b*. In the embodiment, the reliability of the data written to the second memory area 32*b* is maintained compared to the comparative example of the embodiment.

Incidentally, in the embodiment, it has been described that the ECC parity is generated for metadata and 256-byte data obtained by packing the four 64-byte data. However, the ECC parity and the metadata may be generated for each of the 64-byte data managed by the second address translation table.

Figure 47:
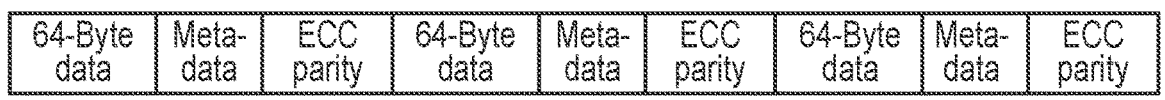
FIG. 47 is a diagram illustrating a configuration of generating an ECC parity for each 64-byte data.

That is, in FIG. 6, the ECC parity is generated for the four 64-byte data and the metadata for the four 64-byte data, and the ECC frame is composed of the four 64-byte data, the metadata, and the ECC parity. As illustrated in FIG. 47, however, the ECC parity may be generated for one 64-byte data and the metadata for the 64-byte data, and the ECC frame may be composed of one 64-byte data, the metadata, and the ECC parity.

According to the configuration, since the ECC frame length becomes shorter than the ECC frame composed of the 256-byte data, the number of accessing SCM chips (or packages) is less than that of the ECC frame composed of the 256-byte data. More specifically, for example, the data needs to be read from Bank 0 of each of SCM0 to SCMn illustrated in FIG. 7 when the ECC frame is composed of the 256-byte data. In the ECC frame illustrated in FIG. 47, for example, SCM0 and SCM1 are only accessed (i.e., the data is read from SCM0 and SCM1). In this case, since Bank 0 of SCM2 to SCMn is not in the Busy state, a subsequent read process for Bank 0 of SCM2 to SCMn can be executed.

Therefore, when the ECC frame is configured as illustrated in FIG. 47, the read performance can be improved. Incidentally, since the ECC frame length of the ECC frame illustrated in FIG. 47 is shorter than that of the ECC frame described with reference to FIG. 6, the ECC correction performance is lowered. In this case, the size of the ECC parity may be made large to maintain the ECC correction performance.

In addition, it has been described that in the embodiment, the physical address corresponding to the logical address is acquired by referring to the second address translation table, which is managed by the set associative method. The lower-order bits and the higher-order bits of the logical address are used as the index and the tag of the second address translation table, respectively. It is assumed that four physical addresses in the second memory area 32*b* for the contiguous logical addresses are acquired, when the CPU 10 issues the access commands for reading the data at the contiguous logical addresses, when the four 64-byte data at the contiguous logical addresses are packed to form the ECC frame and are written back to the first memory area 32*a*, when the wear leveling process or the patrol and refresh process is executed, and the like. Incidentally, in this case, it is assumed that the four contiguous logical addresses in which the alignment is arranged are, for example, "0b110000", "0b110001", "0b110010", and "0b110011". "0bxxxxxx" refers to the logical address in binary notation.

In this case, when the lower-order 2 bits of the logical address are used as indexes as described above, the indexes are "00", "01", "10", and "11", respectively. According to this, to acquire the physical addresses corresponding to the logical addresses "0b110000", "0b110001", "0b110010", and "0b110011", entries associated with different indexes need to be acquired, which is inefficient.

Figure 48:
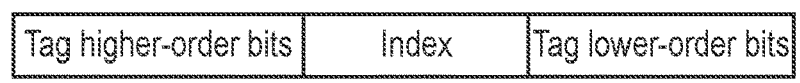
FIG. 48 is a diagram illustrating use of an upper-order bit and a lower-order bit of a logical address as tags and use of a part other than the parts used as tags, as an index, in the embodiment.

Thus, the second address translation table may be configured to use the higher-order bits and the lower-order 2 bits of the logical address as the tag and use the remaining bits as an index, as illustrated in FIG. 48. According to this configuration, entries including the four contiguous logical addresses for the 256-byte-aligned data are associated with the same index in the second address translation table. More specifically, when four contiguous logical addresses are "0b110000", "0b110001", "0b110010", and "0b110011" as described above, and when the higher-order 2 bits and the lower-order 2 bits are used as the tag, all indexes of the logical addresses are "00". According to this, since the physical addresses corresponding to the four contiguous logical addresses can be acquired (found) by only referring to one index "00", the efficiency of access to the second address translation table (for example, the DRAM 33) can be improved.

Incidentally, it has been described that the hash value for the entire logical address may be used as the index in the second address translation table. However, the logical address may be divided into three parts as illustrated in FIG. 48, the hash value of parts other than the tag lower-order bits may be calculated and the second address translation table may be referred to based on the hash value.

In addition, in the embodiment, it has been described that the second address translation table (i.e., the correspondence between the logical address and the physical address in the second memory area 32b) is managed by the set associative method. However, only N entries (64-byte data) can be registered in the same index, for example, when a N-way set associative method is adopted. For example, when the entry cannot be registered (i.e., there is no free entry) in the second address translation table in the above non-volatilization process for the second memory area 32b, the data cannot be written to the second memory area 32b and the write performance in the SCM module 30 cannot be improved.

That is, when the second address translation table is managed by the set associative method described in the embodiment, there are some cases where improvement of the write performance is hindered due to the deviation of the logical addresses for accessing the data written to the second memory area 32b.

Thus, (a list referred to as) the second address translation table according to the embodiment (i.e., the correspondence between the logical address and the physical address in the second memory area 32b) may be managed by a list method as illustrated in FIG. 49. According to this second address translation table, even when deviation occurs among the indexes of the second address translation table, it is possible to respond to the deviation by optionally adding the entries.

Furthermore, it has been described that the data written to the second memory area 32b is written back from the second memory area 32b to the first memory area 32a. For example, even when the data stored in the buffer 314 is written to the second memory area 32b, the data may not be freed from the buffer 314 but may be written back from the buffer 314 to the first memory area 32a. According to the configuration, since the access rate to the buffer 314 is higher than an access rate to the second memory area 32b, the write process can be executed more rapidly.

Figure 51:
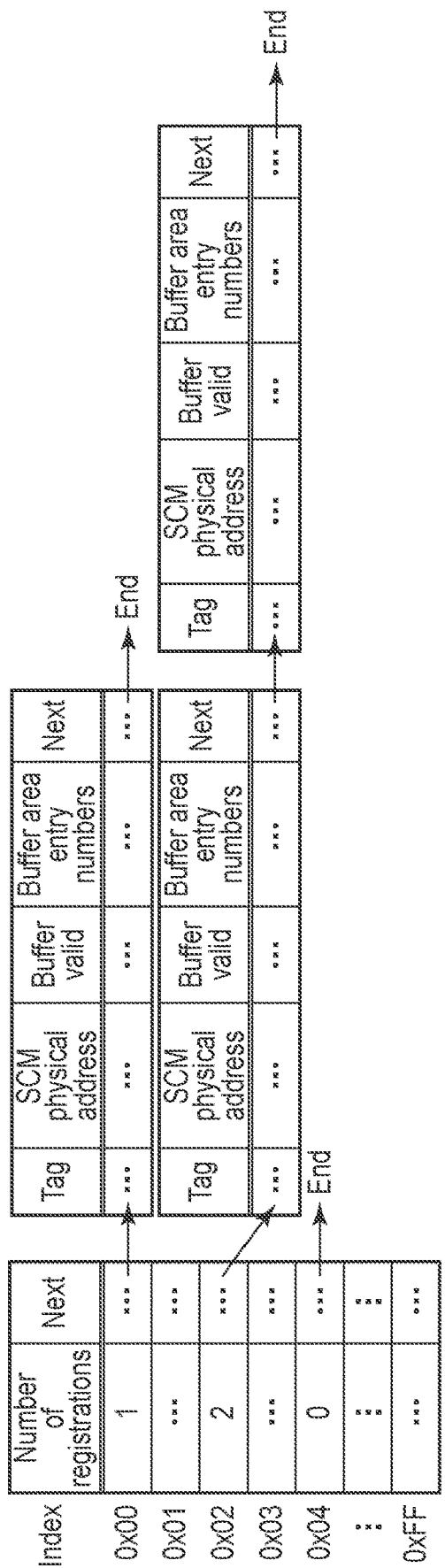
FIG. 51 is a diagram illustrating yet another example of a list referred to as the second address translation table in the embodiment.

In this configuration, the buffer area where the data accessed with the logical address is stored is managed together with the correspondence between the logical address and the physical address, in the second address translation table. In this case, for example, buffer Valid indicating whether (the data stored in) the buffer area is valid or invalid and the buffer area entry number assigned to the buffer area may be added to (a list referred to as) the second address translation table as illustrated in FIG. 50 and FIG. 51. FIG. 50 illustrates an example in which buffer Valid and the buffer area entry number are added to the second address translation table managed by the set associative method illustrated in FIG. 26. FIG. 51 illustrates an example in which buffer Valid and the buffer area entry number are added to the second address translation table managed by the list method illustrated in FIG. 49.

Although not described in detail, when the data written to the second memory area 32b is written back to the first memory area 32a, according to the second address translation table, the buffer area entry number associated with the physical address in the second memory area 32b where the data is written and with the buffer Valid indicating that the data is valid can be acquired and the data stored in the buffer area to which the buffer area entry number is assigned can be transferred to the first memory area 32a (i.e., written to the SCM 32).

Main differences between the SCM module 30 according to the embodiment and the SCM module 30' according to comparative example of the embodiment will be described below in brief.

The SCM module 30 according to the embodiment includes the first memory area 32a (256-byte management area) and the second memory area 32b (64-byte management area), unlike the SCM module 30' according to the comparative example of the embodiment.

For this reason, the SCM module 30 according to the embodiment determines the write method (write destination) in the write process, and updates the second address translation table (64-byte area address translation table) when the data is written to the second memory area 32b by the Append Write method. The updated second address translation table is non-volatilized (written to the SCM 32) at predetermined timing.

In addition, in the SCM module 30' according to the comparative example of the embodiment, the only address translation table for managing the correspondence between the logical address and the physical address in the 256-byte unit is referred to as in the read process. The SCM module 30 according to the embodiment is different from the SCM module 30' from the viewpoint of referring to the second address translation table (i.e., the address translation table for managing the correspondence between the logical address and the physical address in the 64-byte unit) in addition to the first address translation table corresponding to the address translation table.

In addition, the SCM module 30 according to the embodiment executes the writeback process of writing back the data written to the second memory area 32b to the first memory area 32a at predetermined timing, unlike the SCM module 30' according to the comparative example of the embodiment.

The SCM module 30 according to the embodiment is configured to include the differences from the SCM module 30' according to the comparative example of the embodiment, and can thereby implement improvement of the write performance in the SCM 32 in comparison with the SCM module 30'.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectible to a host, the system comprising:
   a non-volatile memory; and
   a controller controlling the non-volatile memory, wherein
   the non-volatile memory comprises first and second memory areas,
   the controller is configured to:
      when receiving a write command in which data to be written to the non-volatile memory and a logical address for the host to access the data are designated, from the host, determine a write method of writing the data based on an internal state of the controller or a state of the non-volatile memory;
      when a first method is determined as the write method, write the data to the first memory area by the first method; and
      when a second method is determined as the write method, write the data to the second memory area by the second method,
   the first method is a write method of writing the data to a physical address associated with the logical address designated in the write command when the data is written to the first memory area, and
   the second method is a write method of writing the data to a physical address specified by the controller as a write destination of the data, irrespective of the logical address, when the data is written to the second memory area.

2. The memory system of claim 1, wherein
   the controller is further configured to manage a correspondence between the logical address used when the host accesses the memory system and the physical address in the first memory area, with first address translation data, and manage a correspondence between the logical address and the physical address in the second memory area, with second address translation data.

3. The memory system of claim 2, wherein
   the correspondence managed with the first address translation data manages the data in a first management unit, and
   the correspondence managed with the second address translation data manages the data in a second management unit smaller than the first management unit.

4. The memory system of claim 3, wherein the second management unit is determined based on an access unit of the host to the memory system.

5. The memory system of claim 1, wherein
   the non-volatile memory comprises a plurality of banks partitioned in units of being accessed in parallel by an outside of the non-volatile memory, and
   each of the first and second memory areas is allocated across the plurality of banks.

6. The memory system of claim 1, wherein
   the non-volatile memory comprises a plurality of non-volatile memory chips, and
   the second memory area is allocated in a non-volatile memory chip, of the plurality of non-volatile memory chips, different from a non-volatile memory chip, of the plurality of non-volatile memory chips, for allocating the first memory area.

7. The memory system of claim 1, wherein
   the second memory area is determined, based on a unit of executing a wear leveling process of changing a correspondence between the logical address and the physical address in the second memory area based on at least one of number of times of writing the data to the physical address in the second memory area and a number of times of reading the data from the physical address in the second memory area.

8. The memory system of claim 1, wherein the controller is further configured to manage the physical address specified by the controller as the write destination of the data in the second memory area, by a ring buffer method.

9. The memory system of claim 8, wherein
   the controller is further configured to set one or more second memory areas in a bank partitioned in units of being accessed in parallel from an outside of the non-volatile memory, and manage a physical address specified by the controller as a write destination of the data in each of the second memory areas, by the ring buffer method.

10. The memory system of claim 1, wherein
    the first memory area and the second memory area comprise banks partitioned in units of being accessed in parallel from an outside of the non-volatile memory, and
    when writing the data designated in the write command to the second memory area, the controller is further configured to select a bank among the banks different from a bank among the banks of the first memory area where the data is written, as the write destination.

11. The memory system of claim 1, wherein when writing the data designated in the write command to the first memory area, where it is determined a Read Modify Write process is executed, the controller is further configured to determine the second method as the write method.

12. The memory system of claim 1, wherein when a number of times of generating write commands within a period is smaller than a predetermined value, the controller is further configured to determine the first method as the write method.

13. The memory system of claim 1, wherein when the first memory area where the data designated in the write command is written is in a busy state, the controller is further configured to determine the second method as the write method.

14. The memory system of claim 1, wherein when a frequency of the logical address in the write command is higher than a predetermined value, the controller is further configured to determine the second method as the write method.

15. The memory system of claim 1, wherein the controller is further configured to:
    cache a part of first address translation data for managing a correspondence between the logical address used when the host accesses the memory system and the physical address in the first memory area; and when it is determined that a cache miss occurs at the logical address designated in the write command, determine the second method as the write method.

16. The memory system of claim 1, wherein the controller is further configured to:
store the data designated in the write command in a buffer area; and
when a power loss to the memory system is detected before the data stored in the buffer area is written to the first or second memory area, write the data stored in the buffer area to the second memory area by the second method.

17. The memory system of claim 1, wherein the controller is further configured to:
manage a location of a failure area where data in the second memory area is unwritable or unreadable; and
when writing the data designated in the write command to the second memory area, avoid the failure area.

18. The memory system of claim 1, wherein the controller comprises an ECC circuit generating a parity for error correction by packing a plurality of data in a second management unit in which a correspondence between the logical address and the physical address in the second memory area is managed.

19. The memory system of claim 1, wherein the controller comprises an ECC circuit generating a parity for error correction for each data in a second management unit in which a correspondence between the logical address and the physical address in the second memory area is managed.

20. The memory system of claim 1, wherein a correspondence between the logical address and the physical address in the second memory area is managed by a set associative method.

21. The memory system of claim 1, wherein a correspondence between the logical address and the physical address in the second memory area is managed by a list method.

22. The memory system of claim 20, wherein correspondences between physical addresses in the second memory area and logical addresses used when the host accesses the data, all of which belong to same data managed in a first unit in the first memory area, are managed in association with a same index.

23. The memory system of claim 20, wherein the correspondence between the logical address and the physical address in the second memory area is managed with a hash value calculated with the logical address.

24. The memory system of claim 20, wherein when a read command in which the logical address for accessing the data to be read from the non-volatile memory is designated is received from the host, the controller is further configured to acquire a physical address corresponding to the logical address designated in the read command by referring to second address translation data for managing the correspondence between the logical address and the physical address in the second memory area.

25. The memory system of claim 24, wherein when the physical address corresponding to the logical address designated in the read command is unable to be acquired by referring to the second address translation data, the controller is configured to acquire the physical address corresponding to the logical address designated in the read command by referring to first address translation data for managing a correspondence between the logical address and the physical address in the first memory area.

26. The memory system of claim 24, wherein the controller is further configured to:
refer to first address translation data managing a correspondence between the logical address and the physical address in the first memory area and the second address translation data, in parallel;
acquire the physical address from the second address translation data when the physical address corresponding to the logical address designated in the read command is managed in the second address translation data; and
acquire the physical address from the first address translation data when the physical address corresponding to the logical address designated in the read command is not managed in the second address translation data.

27. The memory system of claim 1, wherein the controller is further configured to write back the data written to the second memory area, to the first memory area.

28. The memory system of claim 27, wherein the controller is further configured to write back valid data, of the data written to the second memory area, to the first memory area.

29. The memory system of claim 27, wherein
when the data written to the second memory area is written back to the first memory area, the controller is further configured to select data written back to the first memory area, based on a number of invalid data written to a bank partitioned in a unit of being accessed in parallel from an outside of the non-volatile memory or number of invalid data managed by a ring buffer provided in the bank.

30. The memory system of claim 27, wherein the controller is further configured to write back the data written to the second memory area to the first memory area when a patrol and refresh process is executed for the first memory area.

31. The memory system of claim 27, wherein when a read command for reading the data from the non-volatile memory is received from the host, the controller is further configured to write back the data written to the second memory area to the first memory area.

32. The memory system of claim 27, wherein the controller is further configured to write back the data written to the second memory area, to the first memory area, when a wear leveling process of changing a correspondence between the logical address and the physical address in the second memory area is executed based on a number of times of writing the data to the physical address in the second memory area.

33. The memory system of claim 27, wherein when the memory system is rebooted, the controller is further configured to write back the data written to the second memory area to the first memory area.

34. The memory system of claim 1, wherein when a number of times of generating read or write commands within a predetermined period is smaller than a predetermined value, the controller is further configured to write back the data written to the second memory area to the first memory area.

35. The memory system of claim 27, wherein the controller is further configured to:
store the data designated in the write command in a buffer area; and
when the data stored in the buffer area is written to the second memory area, maintain a state in which the data is stored in the buffer area, and write the data stored in the buffer area to the first memory area.

36. The memory system of claim 1, wherein when updating second address translation data for managing a correspondence between the logical address used when the host accesses the memory system and the physical address in the second memory area, the controller is further configured to generate an update log on the updating and write the update log to the non-volatile memory.

37. The memory system of claim 36, wherein the controller is further configured to set a buffer area of the update log for each part of the second address translation data in the non-volatile memory, and write the update log generated when a part of the second address translation data is updated, to the buffer area corresponding to the part of the second address translation data.

38. The memory system of claim 1, wherein the controller is further configured to write to the non-volatile memory at least an updated part of second address translation data for managing a correspondence between the logical address used when the host accesses the memory system and the physical address in the second memory area.

39. The memory system of claim 38, wherein after the updated part of the second address translation data is written to the non-volatile memory, the controller is further configured to discard an update log on the updated part written to the non-volatile memory.

40. The memory system of claim 1, wherein when the memory system is rebooted, the controller is further configured to read from the non-volatile memory second address translation data for managing a correspondence between the logical address used when the host accesses the memory system and the physical address in the second memory area, and an update log generated when a part of the second address translation data is updated, and update the second address translation data, based on the update log.

41. The memory system of claim 1, wherein the controller is further configured to:
   manage a correspondence between the logical address and the physical address in the second memory area, with second address translation data; and
   when data of the same logical address as the data written to the second memory area is written to the first memory area or the second memory area, invalidate the correspondence between the logical address and the physical address in the second memory area, which is managed in the second address translation data.

42. The memory system of claim 1, wherein a size of the second memory area is capable of being designated by an outside of the memory system.

43. The memory system of claim 42, wherein the size of the second memory area capable of being designated from the outside is designated for each partition or namespace.

* * * * *